(12) United States Patent  (10) Patent No.: US 8,763,891 B1
DeLaVergne  (45) Date of Patent: *Jul. 1, 2014

(54) REUSABLE ENVELOPE STRUCTURES AND METHODS

(76) Inventor: Carol A. DeLaVergne, Stillwater, MN (US)

( * ) Notice: Subject to any disclaimer, the term of this patent is extended or adjusted under 35 U.S.C. 154(b) by 180 days.

This patent is subject to a terminal disclaimer.

(21) Appl. No.: 12/791,831

(22) Filed: Jun. 1, 2010

Related U.S. Application Data

(63) Continuation-in-part of application No. 11/064,791, filed on Feb. 24, 2005, now Pat. No. 7,726,548.

(60) Provisional application No. 60/547,531, filed on Feb. 25, 2004.

(51) Int. Cl.
  *B65D 27/06* (2006.01)
  *B65D 27/34* (2006.01)
  *B65D 27/14* (2006.01)

(52) U.S. Cl.
  USPC .............................. 229/301; 383/313; 383/80

(58) Field of Classification Search
  USPC ............................ 229/313–316, 300–306, 80
  See application file for complete search history.

(56) References Cited

U.S. PATENT DOCUMENTS

| | | | |
|---|---|---|---|
| 192,522 A | 6/1877 | Marshall |
| 460,472 A | 9/1891 | Hitt |
| 759,382 A | 5/1904 | Klugh |
| 886,449 A | 5/1908 | West |
| 932,715 A | 8/1909 | Morrison |
| 1,145,935 A | 7/1915 | Steinke |
| 1,173,869 A | 2/1916 | Rougeux |
| 1,187,258 A | 6/1916 | Carr et al. |
| 1,245,447 A | 11/1917 | Felenchak |
| 1,438,122 A | 12/1922 | McCoy |
| 1,953,192 A | 4/1934 | Rossiter |
| 1,957,704 A | 5/1934 | Drachman |
| 1,960,054 A | 5/1934 | Johnson |
| 1,988,908 A | 1/1935 | MacKinnon |
| 2,129,705 A | 9/1938 | Reineman |
| 2,201,538 A | 5/1940 | Holden |
| 2,310,371 A | 2/1943 | Lines et al. |
| 2,340,700 A | 2/1944 | Sawdon |
| 2,350,100 A | 5/1944 | Deutsclutteister et al. |
| 2,363,957 A | 11/1944 | Goff |
| 2,400,406 A | 5/1946 | Godoy |
| 2,417,982 A | 3/1947 | Histed |
| 2,835,512 A | 5/1958 | Whitman |

(Continued)

FOREIGN PATENT DOCUMENTS

| CA | 2075214 A1 | 12/1993 |
|---|---|---|
| CA | 2138361 B1 | 8/1999 |

(Continued)

OTHER PUBLICATIONS

Machine translation of Japanese Document No. 2000-313449.*

*Primary Examiner* — Jes F Pascua
(74) *Attorney, Agent, or Firm* — Albert W. Watkins

(57) ABSTRACT

The present invention provides reusable envelope structures, kits for forming reusable envelope structures, and methods of using envelopes formed from such structures and kits. Reusable envelope structures can be formed and kits can be formed for converting existing envelopes to reusable envelopes in accordance with the present invention. As such, envelopes may advantageously be provided that can be reused one or more times.

15 Claims, 54 Drawing Sheets

(56) References Cited

U.S. PATENT DOCUMENTS

| | | |
|---|---|---|
| 2,928,583 A | 3/1960 | Law |
| 2,941,711 A | 6/1960 | Biek |
| 2,954,154 A | 9/1960 | Stuart |
| 3,062,431 A | 11/1962 | Rabenold |
| 3,086,695 A | 4/1963 | Lillibridge |
| 3,111,257 A | 11/1963 | Peach |
| 3,113,716 A | 12/1963 | Howard |
| 3,152,751 A | 10/1964 | Hiersteiner |
| 3,184,150 A | 5/1965 | Hubbard |
| 3,227,360 A | 1/1966 | Krueger |
| 3,259,304 A | 7/1966 | Tichnor |
| 3,261,623 A | 7/1966 | Kiedrowski |
| 3,276,669 A | 10/1966 | Vilutis |
| 3,330,581 A | 7/1967 | Ivarsson-Wallerstrom |
| 3,374,940 A | 3/1968 | Allison |
| 3,380,648 A | 4/1968 | deLyra |
| 3,411,699 A | 11/1968 | Pine et al. |
| 3,426,961 A | 2/1969 | Allison |
| 3,498,528 A | 3/1970 | Klein |
| 3,525,469 A | 8/1970 | Sawdon |
| 3,531,046 A | 9/1970 | Carrigan |
| 3,537,637 A | 11/1970 | Hiersteiner |
| 3,545,669 A | 12/1970 | Kinkade et al. |
| 3,652,007 A | 3/1972 | Macdougall |
| 3,693,869 A | 9/1972 | Eaves, Jr. |
| 3,718,277 A | 2/1973 | Volkert |
| 3,747,837 A | 7/1973 | Wilson |
| 3,802,618 A | 4/1974 | Wiessner |
| 3,822,492 A | 7/1974 | Crawley |
| 3,874,582 A | 4/1975 | Wang |
| 3,910,410 A | 10/1975 | Shaw |
| 3,941,309 A | 3/1976 | Gendron |
| 3,979,051 A | 9/1976 | Close |
| 3,982,689 A | 9/1976 | Retrum |
| 4,157,759 A | 6/1979 | Dicker |
| 4,159,129 A | 6/1979 | Lockhart |
| 4,180,168 A | 12/1979 | Hiersteiner |
| 4,190,161 A | 2/1980 | Gendron |
| 4,190,162 A | 2/1980 | Buescher |
| 4,194,631 A | 3/1980 | Rangan |
| 4,245,775 A | 1/1981 | Conn |
| 4,288,028 A | 9/1981 | Diaz |
| 4,308,987 A | 1/1982 | Solomon |
| 4,332,346 A | 6/1982 | Kronman |
| 4,354,631 A | 10/1982 | Stevenson |
| 4,379,573 A | 4/1983 | Lomeli et al. |
| 4,382,539 A | 5/1983 | Kronman |
| 4,403,696 A | 9/1983 | Newell |
| 4,436,202 A | 3/1984 | Berkley |
| 4,445,635 A | 5/1984 | Barr |
| 4,487,360 A | 12/1984 | Fisher et al. |
| 4,538,833 A | 9/1985 | Trikilis |
| 4,549,658 A | 10/1985 | Sfikas |
| 4,565,317 A | 1/1986 | Kranz |
| 4,602,736 A | 7/1986 | Barr |
| 4,613,157 A | 9/1986 | Drabish |
| 4,620,630 A | 11/1986 | Moss |
| 4,640,030 A | 2/1987 | Wood et al. |
| 4,651,920 A | 3/1987 | Stenner |
| 4,653,639 A | 3/1987 | Traynor |
| 4,688,715 A | 8/1987 | Barr |
| 4,690,322 A | 9/1987 | Burns |
| 4,715,531 A | 12/1987 | Stewart et al. |
| 4,775,095 A | 10/1988 | Emmott |
| 4,778,100 A | 10/1988 | McGuire et al. |
| 4,778,101 A | 10/1988 | Paquin |
| 4,821,439 A | 4/1989 | Wilck |
| 4,896,823 A | 1/1990 | Taylor |
| 4,899,926 A | 2/1990 | Spaulding |
| 4,917,287 A | 4/1990 | Watson |
| 4,927,072 A | 5/1990 | Jenkins et al. |
| 4,934,536 A | 6/1990 | Mills |
| 4,944,449 A | 7/1990 | Schmidt |
| 4,945,218 A | 7/1990 | Talbott |
| 4,960,237 A | 10/1990 | Bendel |
| 4,981,251 A | 1/1991 | Jenkins et al. |
| 4,993,624 A | 2/1991 | Schlich |
| 5,024,374 A | 6/1991 | Ashby |
| 5,025,980 A | 6/1991 | Blackman |
| 5,039,000 A | 8/1991 | Ashby |
| 5,040,720 A | 8/1991 | Pennock |
| 5,052,613 A | 10/1991 | Lin |
| 5,071,167 A | 12/1991 | O'Brien |
| 5,071,399 A | 12/1991 | Ashby |
| 5,104,036 A | 4/1992 | Rutkowski et al. |
| 5,110,043 A | 5/1992 | Ashby |
| 5,118,030 A | 6/1992 | McNamara et al. |
| 5,118,031 A | 6/1992 | Tighe |
| 5,125,562 A | 6/1992 | Bendel |
| 5,163,612 A | 11/1992 | Ashby |
| 5,197,663 A | 3/1993 | Stude |
| 5,201,464 A | 4/1993 | File |
| 5,209,698 A | 5/1993 | Dolan |
| 5,213,258 A | 5/1993 | Kim |
| 5,224,647 A | 7/1993 | Yanow |
| 5,232,150 A | 8/1993 | Solomons |
| 5,248,032 A | 9/1993 | Sheu et al. |
| 5,251,810 A | 10/1993 | Kim |
| 5,253,803 A | 10/1993 | Chess |
| 5,271,553 A | 12/1993 | Kim |
| 5,277,362 A | 1/1994 | Wilson |
| 5,282,568 A | 2/1994 | File |
| 5,292,062 A | 3/1994 | Chess |
| 5,299,979 A | 4/1994 | Ballard |
| 5,307,989 A | 5/1994 | Dyer |
| 5,318,222 A | 6/1994 | Bartlett |
| 5,324,927 A | 6/1994 | Williams |
| 5,333,909 A | 8/1994 | Hedge, Jr. |
| 5,383,686 A | 1/1995 | Laurash |
| 5,400,957 A | 3/1995 | Stude |
| 5,415,341 A | 5/1995 | Diamond |
| 5,431,337 A | 7/1995 | Bell |
| 5,487,566 A | 1/1996 | Hedge, Jr. |
| 5,487,826 A | 1/1996 | Back et al. |
| 5,501,393 A | 3/1996 | Walz |
| 5,503,328 A | 4/1996 | Roccaforte et al. |
| 5,510,608 A | 4/1996 | Williams |
| 5,514,863 A | 5/1996 | Williams |
| 5,516,040 A | 5/1996 | Lin |
| 5,520,990 A | 5/1996 | Rotermund |
| 5,547,227 A | 8/1996 | Laurash et al. |
| 5,570,835 A | 11/1996 | Sung et al. |
| 5,626,286 A | 5/1997 | Petkovsek |
| 5,626,370 A | 5/1997 | Petkovsek |
| 5,662,420 A | 9/1997 | Sinda et al. |
| 5,683,029 A * | 11/1997 | Lyons .......................... 229/309 |
| 5,687,904 A | 11/1997 | Potter |
| 5,690,220 A | 11/1997 | Swan |
| 5,697,496 A | 12/1997 | Bauer |
| 5,704,543 A | 1/1998 | Pollanen |
| 5,713,511 A | 2/1998 | Diamond |
| 5,722,538 A | 3/1998 | Neely et al. |
| 5,738,274 A | 4/1998 | Stude |
| 5,752,647 A | 5/1998 | Schubert et al. |
| 5,823,423 A | 10/1998 | Murray |
| 5,826,787 A | 10/1998 | Turner |
| 5,875,964 A | 3/1999 | Pham |
| 5,887,780 A | 3/1999 | Popat et al. |
| 5,887,904 A | 3/1999 | Petkovsek |
| 5,901,843 A | 5/1999 | Gambardella et al. |
| 5,901,844 A | 5/1999 | Gambardella et al. |
| 5,909,805 A | 6/1999 | Neely |
| 5,929,415 A | 7/1999 | Berson |
| 5,950,916 A | 9/1999 | Santangelo |
| 5,967,403 A | 10/1999 | Kranz |
| 6,053,855 A | 4/2000 | Stenner |
| 6,059,316 A | 5/2000 | Whittington |
| 6,070,792 A * | 6/2000 | Foushee .......................... 229/302 |
| 6,129,269 A | 10/2000 | Tait |
| 6,155,481 A | 12/2000 | Rawlings |
| 6,170,879 B1 | 1/2001 | Rawlings |
| 6,179,202 B1 | 1/2001 | Alexander et al. |
| 6,196,447 B1 | 3/2001 | Purcell et al. |
| 6,220,504 B1 | 4/2001 | Flynn et al. |

(56) References Cited

U.S. PATENT DOCUMENTS

| | | |
|---|---|---|
| 6,223,977 B1 | 5/2001 | Hill |
| 6,237,844 B1 | 5/2001 | Purcell |
| 6,254,138 B1 | 7/2001 | Rawlings et al. |
| 6,296,179 B1 | 10/2001 | Wortman |
| D451,131 S | 11/2001 | Okah Chegwe-Akigbe |
| 6,343,736 B1 | 2/2002 | Kim |
| 6,361,077 B1 | 3/2002 | Petkovsek |
| 6,435,404 B1 | 8/2002 | Feick |
| 6,612,484 B2 | 9/2003 | Rawlings et al. |
| 6,725,587 B2 | 4/2004 | Collins |
| D510,383 S | 10/2005 | Potter et al. |
| 6,966,484 B2 | 11/2005 | Calonje et al. |
| 6,983,875 B2 | 1/2006 | Emmott |
| D536,375 S | 2/2007 | Potter et al. |
| 7,178,713 B2 | 2/2007 | Stude |
| 7,201,305 B1 | 4/2007 | Correa |
| 7,469,816 B2 | 12/2008 | Rosenkranz et al. |
| 7,549,571 B2 | 6/2009 | DeLaVergne |
| 7,726,548 B2 * | 6/2010 | DeLaVergne ............... 229/80 |
| 7,775,420 B2 | 8/2010 | Emmott |
| 7,815,099 B2 | 10/2010 | DeLaVergne |
| 8,191,763 B2 * | 6/2012 | DeLaVergne ............... 229/301 |
| 2002/0008135 A1 | 1/2002 | Kim |
| 2002/0023948 A1 | 2/2002 | Gillespie, IV |
| 2002/0030093 A1 | 3/2002 | Kim |
| 2002/0130169 A1 | 9/2002 | Purcell |
| 2003/0015581 A1 | 1/2003 | Purcell |
| 2004/0050918 A1 | 3/2004 | DeLaVergne |
| 2004/0112946 A1 * | 6/2004 | Smythe ........................ 229/71 |
| 2005/0045707 A1 | 3/2005 | Stude |
| 2005/0184140 A1 | 8/2005 | DeLaVergne |
| 2006/0113367 A1 | 6/2006 | Emmott |
| 2006/0208053 A1 | 9/2006 | Emmott |
| 2006/0219769 A1 | 10/2006 | DeLaVergne |
| 2006/0266808 A1 | 11/2006 | DeLaVergne |
| 2008/0041928 A1 | 2/2008 | DeLaVergne |
| 2009/0302099 A1 | 12/2009 | DeLaVergne |

FOREIGN PATENT DOCUMENTS

| | | | |
|---|---|---|---|
| CH | 680124 A5 | 6/1992 | |
| EP | 0230796 A1 | 8/1987 | |
| EP | 0611056 A1 | 8/1994 | |
| JP | 6-72446 A1 | 3/1994 | |
| JP | 2000313449 A * | 11/2000 | ............ B65D 27/34 |
| JP | 2001-122287 A1 | 5/2001 | |
| WO | WO 9319991 A2 | 10/1993 | |
| WO | WO 9621598 A1 | 7/1996 | |
| WO | WO 0010885 A1 | 3/2000 | |
| WO | WO 2004076296 A2 | 9/2004 | |
| WO | WO 2007001193 A1 | 1/2007 | |
| WO | WO 2007080395 A1 | 7/2007 | |

* cited by examiner

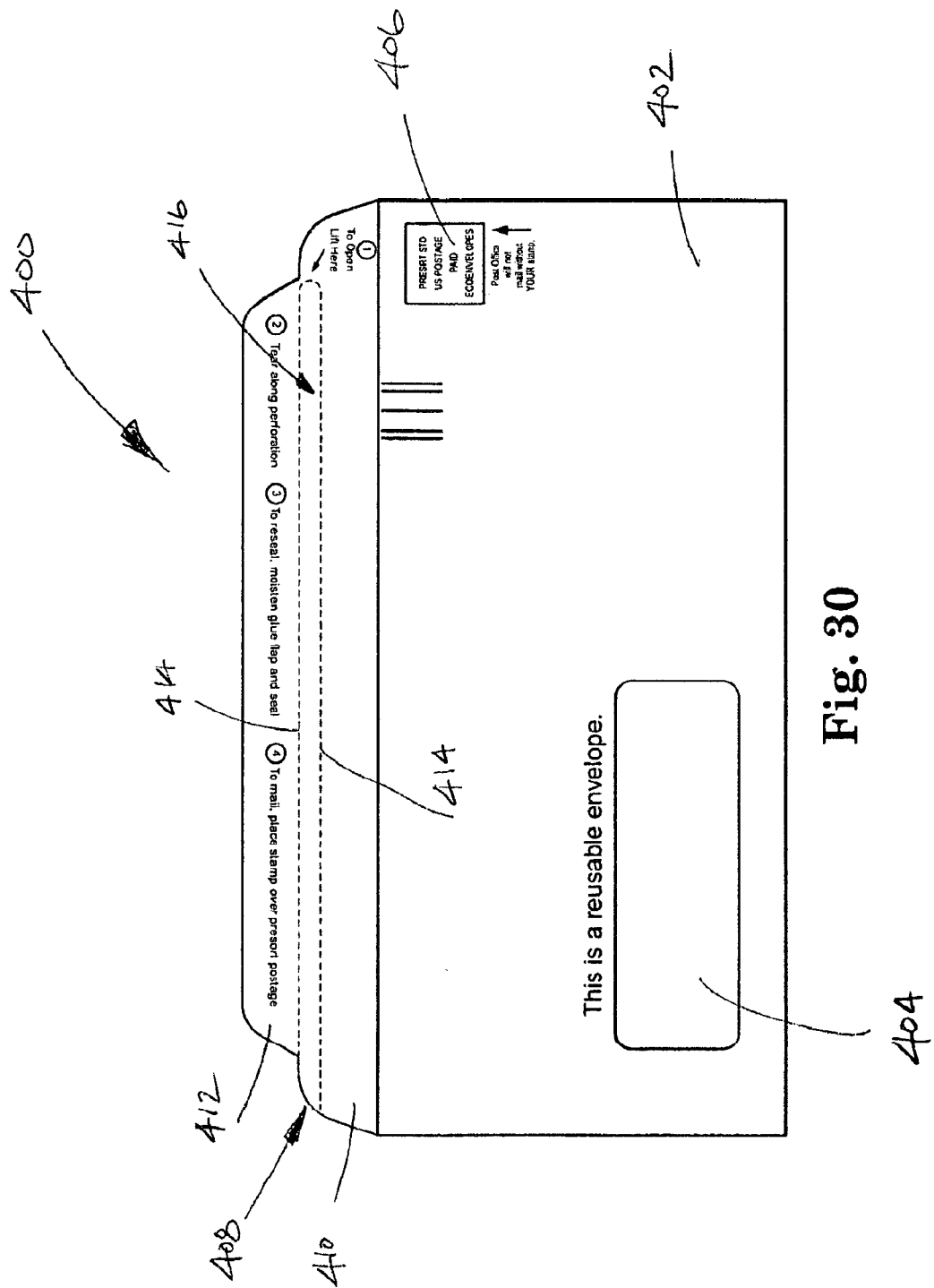

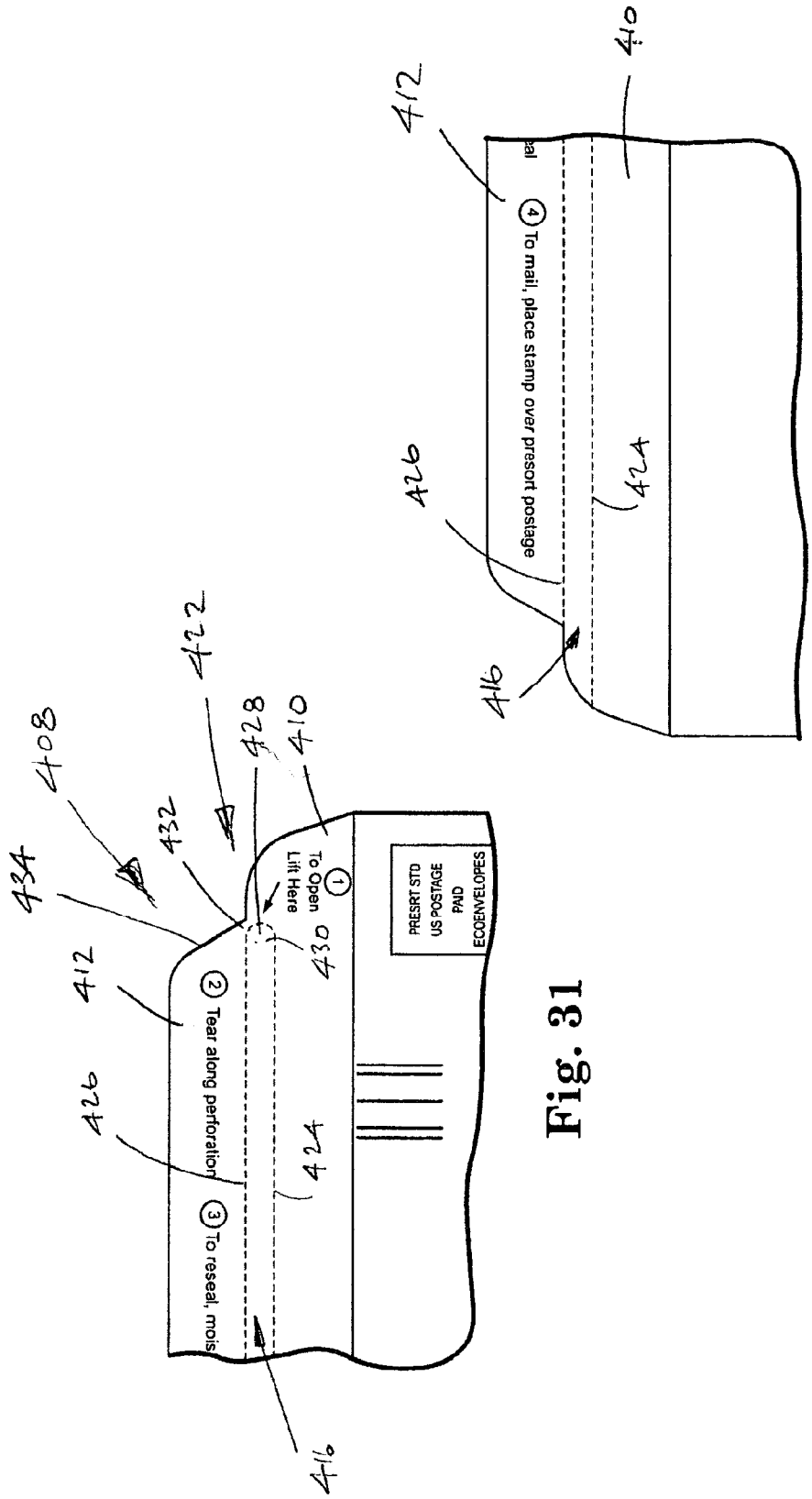

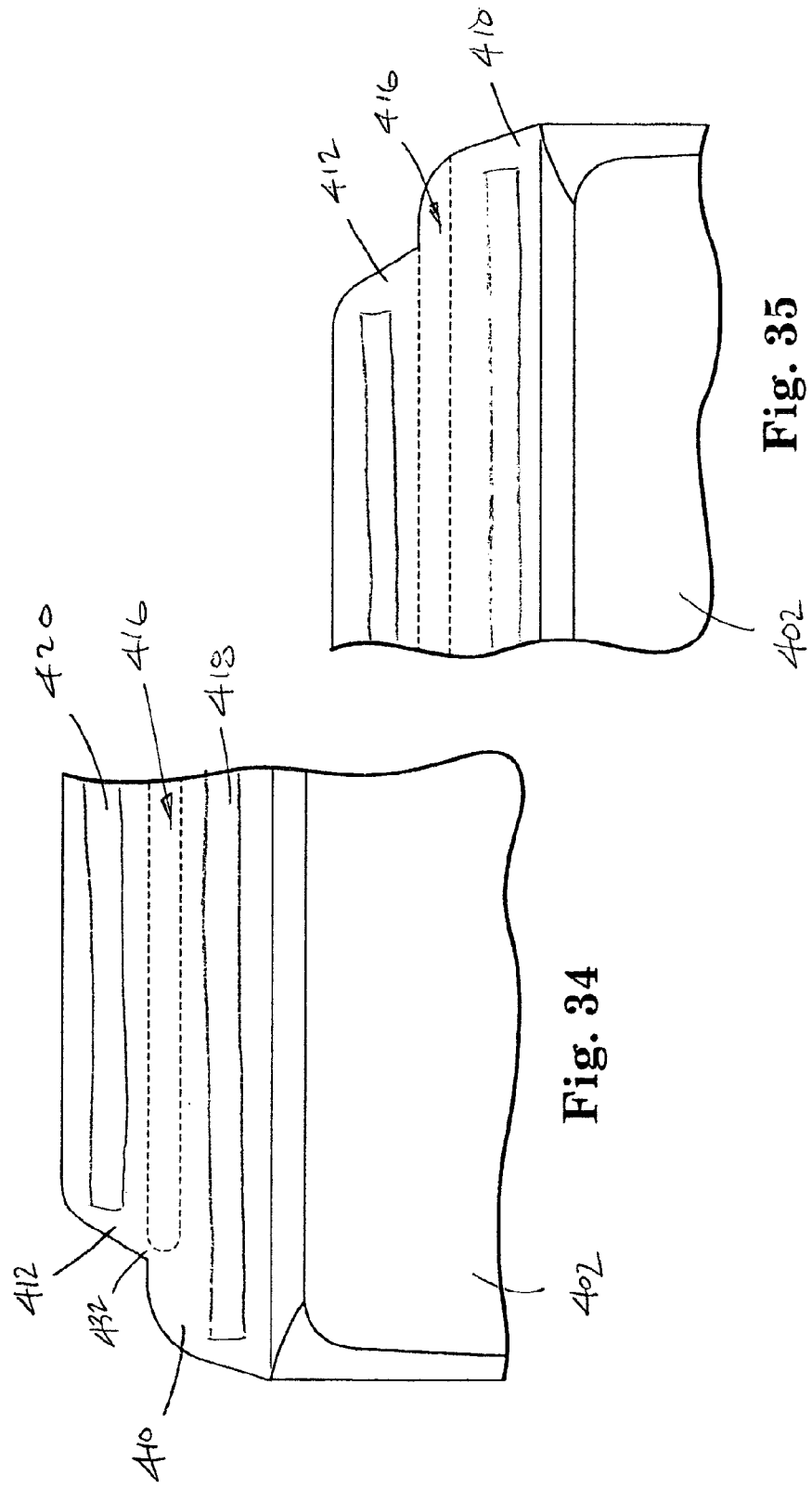

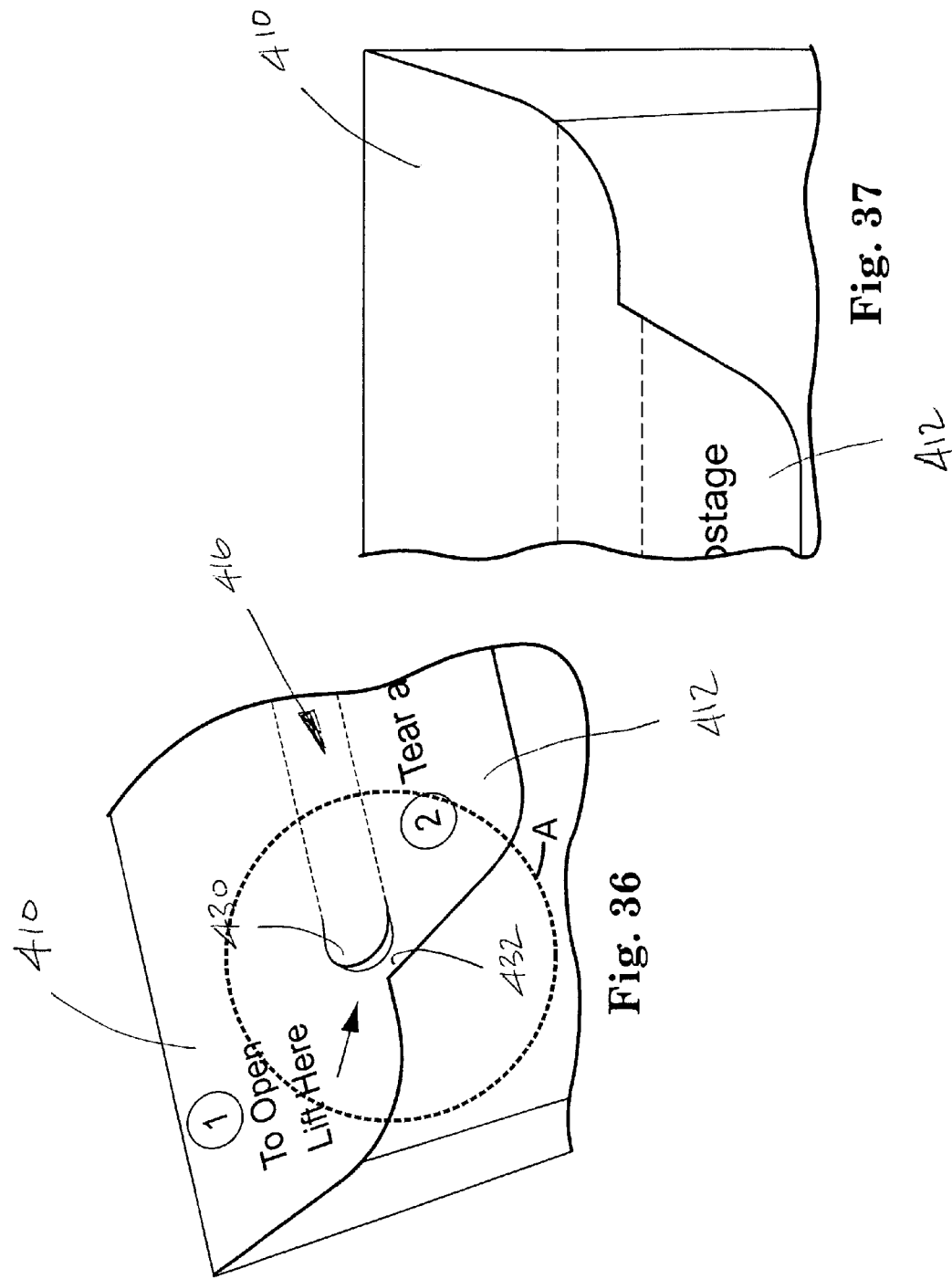

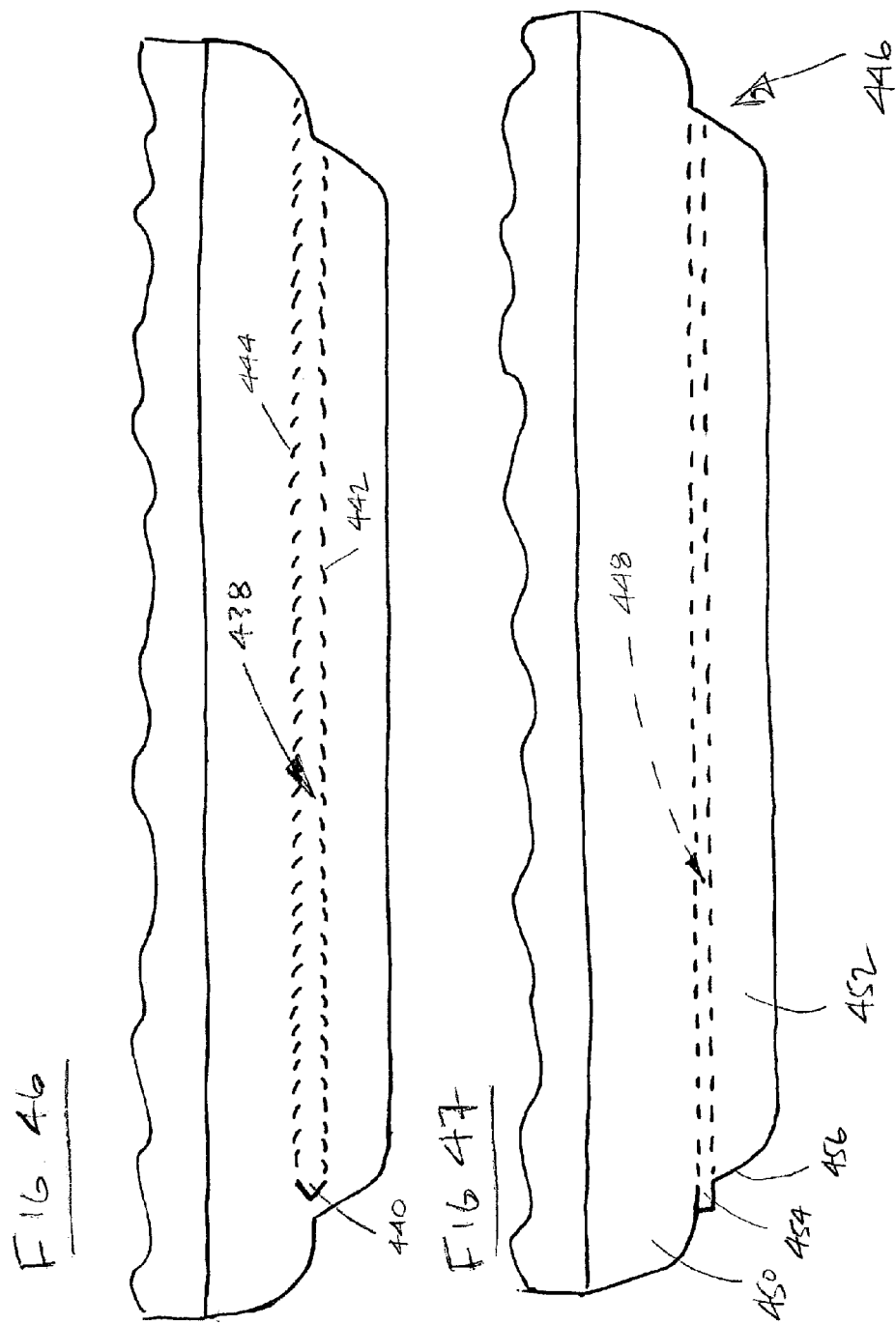

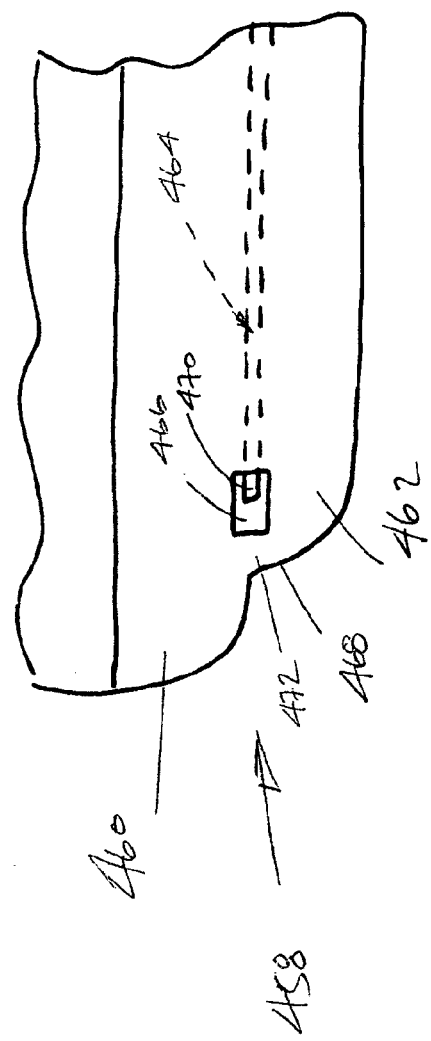

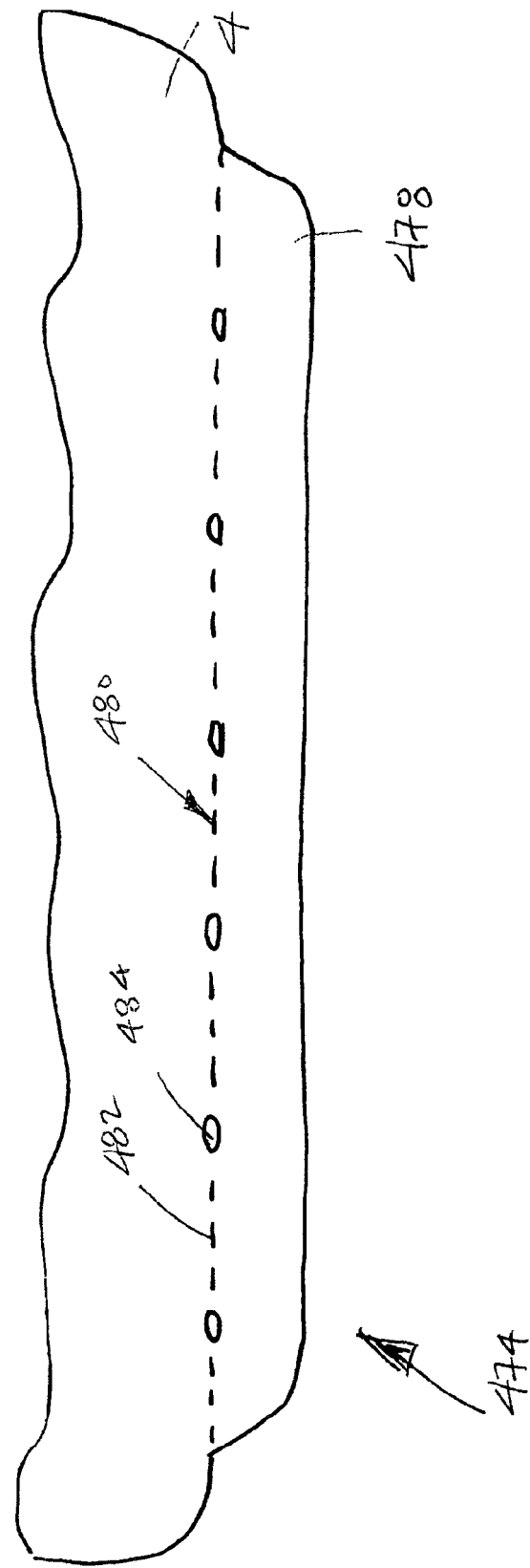

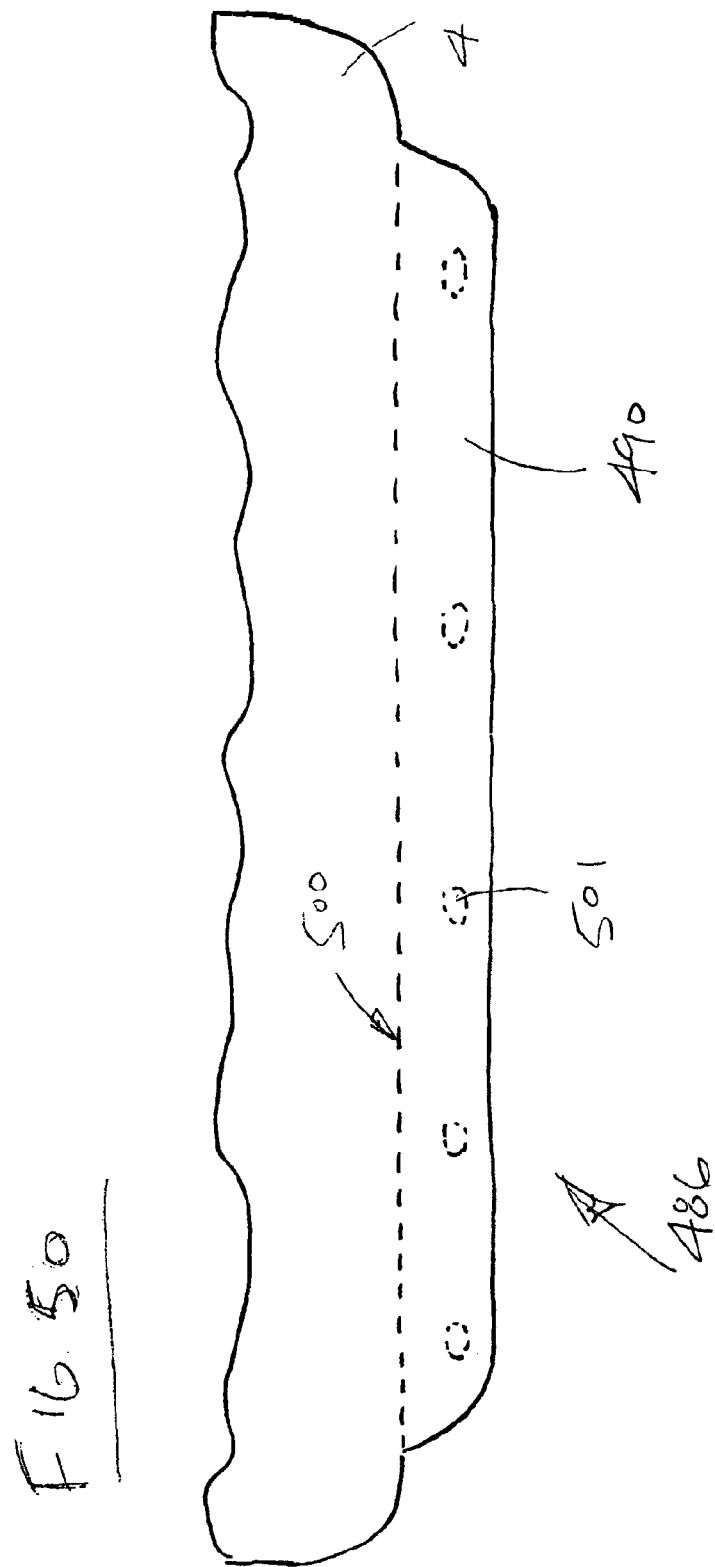

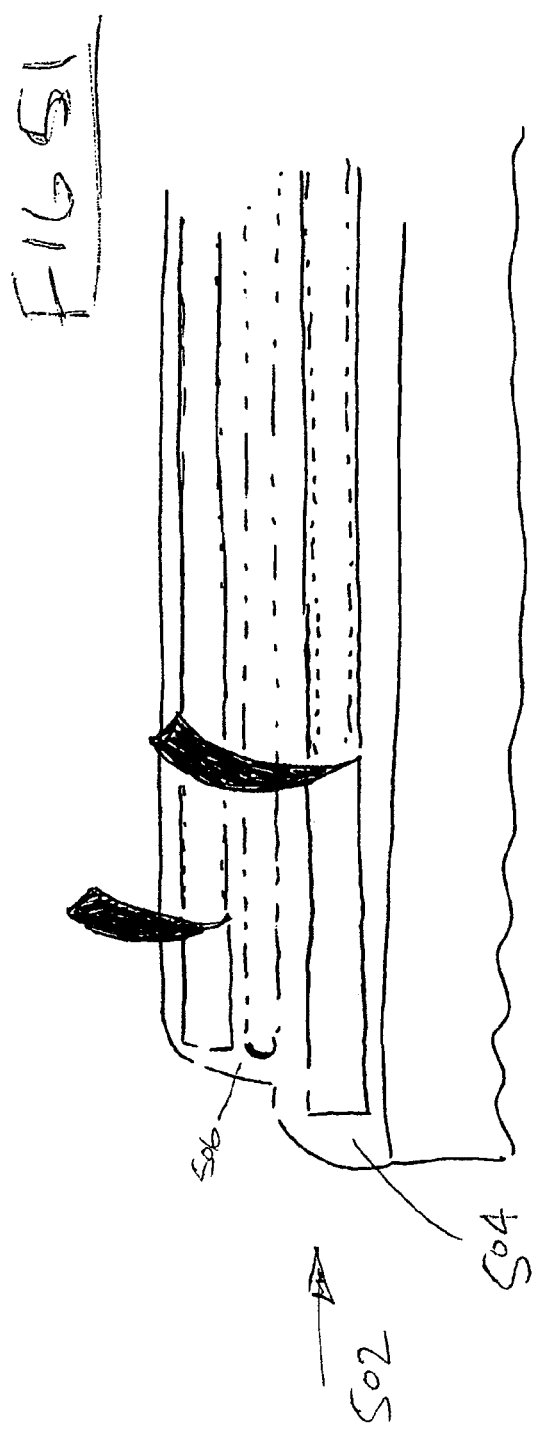

REUSABLE ENVELOPE STRUCTURES AND METHODS

CROSS REFERENCE TO RELATED APPLICATIONS

This application is a continuation-in-part of U.S. application Ser. No. 11/064,791 filed Feb. 24, 2005, entitled "Reusable Envelope Structures and Methods", and scheduled to issue as U.S. Pat. No. 7,726,548 on Jun. 1, 2010, which in turn claims the benefit of U.S. Provisional Application having Ser. No. 60/547,531, filed Feb. 25, 2004, entitled "Reusable Envelope Structures and Methods", the contents of each which are incorporated herein by reference in entirety for all purposes.

BACKGROUND OF THE INVENTION

1. Field of the Invention

The present invention is directed to reusable envelope structures, kits for forming reusable envelopes, and methods of use thereof. In particular, the present invention is directed to reusable envelope structures and kits for forming reusable envelopes, which preferably comprise environmentally friendly structures, materials, and/or methods of use.

2. Description of the Related Art

Many types of envelope structures are, in general, well known. A common disadvantage of many envelope structures is that they can only be used once and are then usually discarded afterwards thereby creating unnecessary waste after a single use. Some envelopes fail to be used even once before being discarded. Moreover, it is common for an otherwise unused envelope structure to be discarded because it has been preaddressed for a particular recipient. For example, certain envelope structures are frequently utilized for mailing invoices and the like. A second envelope, which is often preaddressed and sometimes provided with postage, is usually included with the invoice for returning the invoice to the sender. In the case where the invoice is not returned, such as where a payment or correspondence is made electronically, the second preaddressed envelope is usually discarded. This practice, although not uncommon, is unfortunately wasteful, especially in large volumes. Thus, easily reusable envelope structures are desirable.

Envelopes have been developed that utilize a single structure to form primary and return envelopes such as are described in U.S. Pat. No. 4,194,631 to Rangan and U.S. Pat. No. 4,715,531 to Stewart et al, the teachings and contents which are incorporated herein by reference. These envelopes are directed to small envelopes such as conventional #10 envelopes. Envelopes of this type are convertible from a primary to a return envelope. That is, tearing and folding steps are used to convert a received envelope to an envelope that can be returned to the sender or forwarded to another party. Typically, these structures are quite complex and somewhat costly to produce. Thus, reusable envelopes in general have been limited to small envelopes and large established markets for their use.

Additionally, known reusable envelope structures can be somewhat difficult to utilize because of a requirement for performing complex operations in order to manipulate the envelope. That is, a cumbersome sequence of steps must be followed in order to convert the envelope. Moreover, many envelopes of this type commonly include tags, glue patches, or loose edges being left on the envelope, which can interfere with machine sorting equipment, especially on the return trip. As such, easy to use and cost effective reusable envelope structures are desirable, especially for large envelopes.

In addition to the aforementioned patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a reusable envelope. The envelope body has a width. A reusable sealing flap has at least a first flap portion proximal to the envelope body and extends along the envelope body for a length. A second flap portion extends from the first flap portion distally from the envelope body. A side flap edge at least partially corresponds with at least one of the first and second flap portions. A boundary comprises a tear off portion and a bridge portion. The tear off portion extends partially across the sealing flap so the tear off portion comprises an end spaced inwardly from the side edge of the sealing flap and spaced from an intersection of the first and second edge portions. The bridge portion comprises a region between the inwardly spaced end of the tear off portion and the side flap edge so that the bridge portion at least partially connects the first and second flap portions. The bridge portion is structurally capable of at least partially maintaining the connection between first and second flap portions after the tear off portion is at least partially removed from the reusable sealing flap. First and second adhesive regions are formed on the first and second flap portions, respectively, each spaced apart from the boundary along which the first portion of the sealing flap can be separated from the second flap portion. A stress concentrator is provided through the bridge portion that facilitates severing of the second flap portion from first flap portion, wherein the second adhesive region can be used to seal the envelope a first time, the second portion of the sealing flap can be separated from the first flap portion to open the envelope, and the first flap portion and first adhesive region can together be used to close and seal the envelope a second time.

In a second manifestation, the invention is a method for reusing an envelope. An envelope is provided comprising an envelope body and a reusable sealing flap. The sealing flap comprises at least a first flap portion proximal to the envelope body and extends along the envelope body for a length. A second flap portion extends from the first flap portion. A side edge comprises a first edge portion at least partially corresponding with the first flap portion and intersects a second edge portion at least partially corresponding with the second flap portion. A bridge portion at least partially connects the first and second flap portions. A tear off portion is adjacent to the bridge portion to facilitate partial separation of the first flap portion from the second flap portion, and a stress concentrator facilitates separation of the first flap portion from the second flap portion through the bridge portion. According to the method, the second flap portion of said sealing flap is attached to the envelope body to close the envelope a first time. The tear off portion is removed while the second flap portion of the sealing flap remains attached to the envelope body. The first flap portion is separated from the second flap portion by tearing the bridge portion as influenced by the stress concentrator after the tear off portion has been removed from the sealing flap; and the first flap portion is attached to the envelope body to close the envelope a second time.

In a third manifestation, the invention is an envelope. The envelope has an envelope body having a width. A first flap portion is proximal to the envelope body and extends along the envelope body for a length. A second flap portion extends from the first flap portion distal from the envelope body. First and second side edges are provided, the second side edge comprising a first edge portion at least partially corresponding with the first flap portion and intersecting a second edge portion at least partially corresponding with the second flap portion. A tear off portion is positioned between the first and second flap portions and is at least partially removable to at least partially separate the first and second flap portions during opening of the envelope. The tear off portion extends from the first side edge of the sealing flap across a portion of the sealing flap and ends before intersecting the second side edge of the sealing flap, thereby at least partially defining an end of the tear off portion spaced inwardly from the first and second side edges, wherein the region of the sealing flap between the end of the tear off portion and the second side edge of the sealing flap is configured to protect the sealing flap against unintentional opening during processing of the reusable envelope in automated mail processing equipment. A stress concentrator exists through which the first and second flap portions may be completely separated subsequent to removal of the tear off portion.

The present invention provides reusable envelope structures and methods of use thereof. In preferred aspects, the present invention provides novel envelope structures in which a single envelope structure can provide multiple uses.

The present invention provides reusable envelope structures, kits for forming reusable envelope structures, and methods of using envelopes formed from such structures and kits. Preferably, such envelopes are formed from environmentally friendly materials. Such environmentally friendly materials broadly include, but are not limited to, recycled papers, plant based plastics, and earth friendly glues and adhesives. It has now been discovered that envelopes can be economically formed and used in a way such that waste can be reduced and natural resources conserved. That is, reusable envelope structures can be formed and kits can be formed for converting existing envelopes to reusable envelopes in accordance with the present invention. As such, envelopes may advantageously be provided that can be reused one or more times, which saves time, money, and conserves natural resources. Further, utilizing environmentally friendly materials in the manufacture of such reusable envelopes may allow certain properties of the environmentally friendly materials to be exploited in ways particularly advantageous to individuals and businesses that desire reusable envelopes.

It is believed that any envelope, mailing device, or mailing container can benefit from the application of the inventive concept of the present invention. As a result, the choice of the type of envelope in which to apply the concept is not particularly limited. It is believed, however, that certain aspects of the inventive concept will prove particularly advantageous to large envelopes. Accordingly, envelopes can easily be manufactured to be reused. Moreover, this helps to reduce landfill waste and save natural resources.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which like reference numerals are used to identify the same or similar parts in the several views.

FIG. 30 is a front view of a reusable envelope of the present invention having a reusable flap that includes spaced apart perforation lines to define a tear off portion.

FIG. 31 is a front view of an opening end of the flap of the reusable envelope of FIG. 30.

FIG. 32 is a front view of an opposite end of the flap of the reusable envelope of FIG. 30.

FIG. 34 is a rear view of the opening end of the flap of the reusable envelope of FIG. 33.

FIG. 35 is a rear view of the opposite end of the flap of the reusable envelope of FIG. 33.

FIG. 36 is a rear view of a reusable envelope of the present invention that has been sealed by an outer flap portion for a first use of the envelope and showing in particular and opening end of the flap having a lifting tab of a tear off portion of the flap of the envelope.

FIG. 37 is a rear view of a reusable envelope of the present invention that has been sealed by an outer flap portion for a first use of the envelope and showing in particular an opposite end of the flap of the envelope.

FIG. 46 is a schematic view of another envelope flap of the present invention showing in particular a tear off portion.

FIG. 47 is a schematic view of another envelope flap of the present invention showing in particular a tear strip.

FIG. 48 is a schematic view of another envelope flap of the present invention showing in particular a tear strip having an end positioned within a window.

FIG. 49 is a schematic view of another envelope flap of the present invention showing a line of weakness comprising perforations and open regions.

FIG. 50 is a schematic view of another exemplary flap of the present invention showing an outer flap portion that includes a releasable adhesive.

FIG. 51 is a schematic view of another exemplary flap of the present invention.

DESCRIPTION OF THE PREFERRED EMBODIMENT

The embodiments of the present invention described below are not intended to be exhaustive or to limit the invention to the particular embodiments disclosed in the following detailed description. Rather, the embodiments are described so that others can understand the principles and practices of the present invention.

Figure 1:
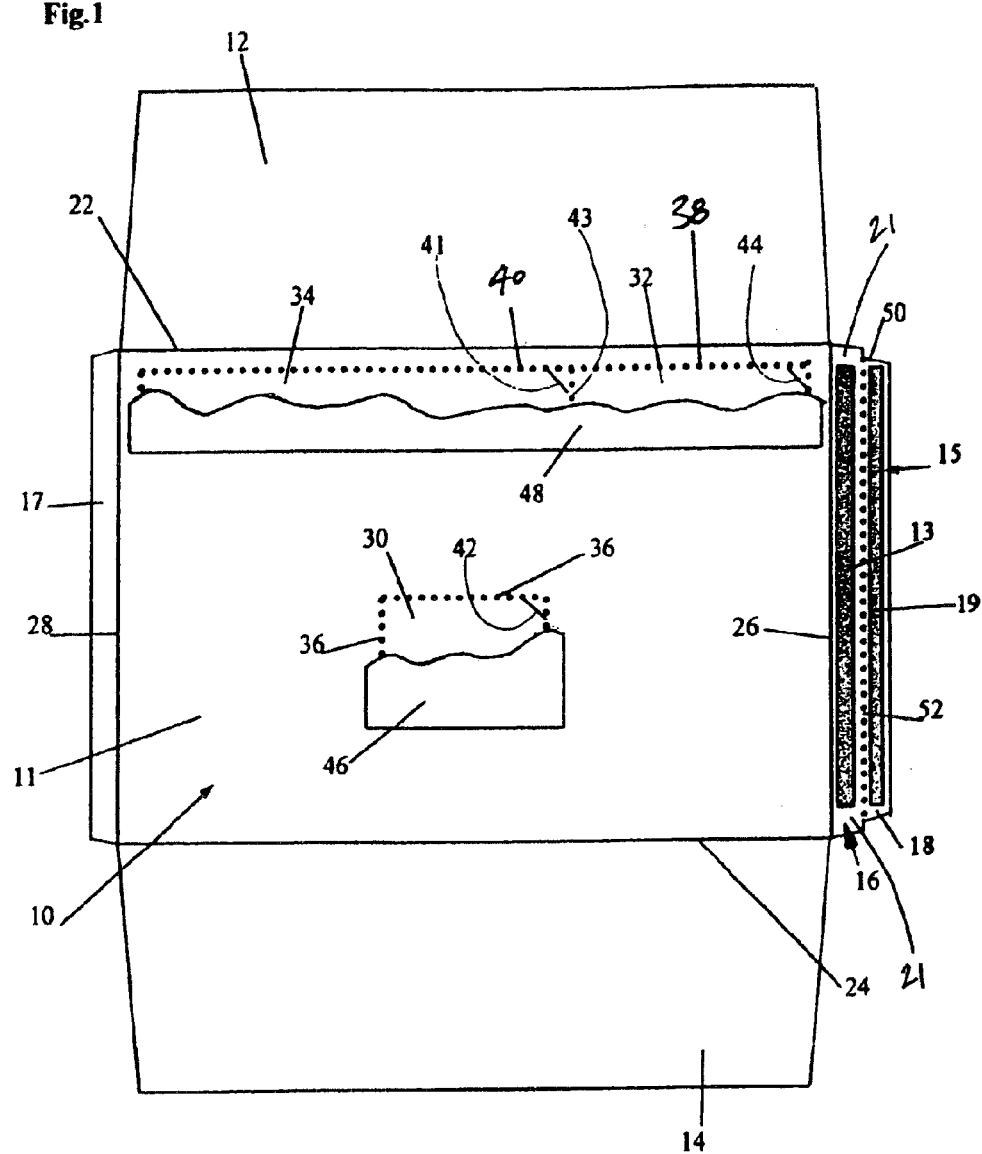
FIG. 1 is an inside view of an envelope blank that can be made in accordance with the present invention showing, in particular, plural tear off portions thereof.

An exemplary envelope blank 10 in accordance with the present invention is shown in FIG. 1. Preferably, the envelope blank 10 is formed from an environmentally friendly material such as tree-free paper, recycled paper, plant based plastics, and the like but can alternatively be made from any material. That is, the envelope blank 10 may be formed from any conventional materials such as, but not limited to, paper, plastic, cloth, cardboard, cellophane, and combinations thereof.

Figure 2:
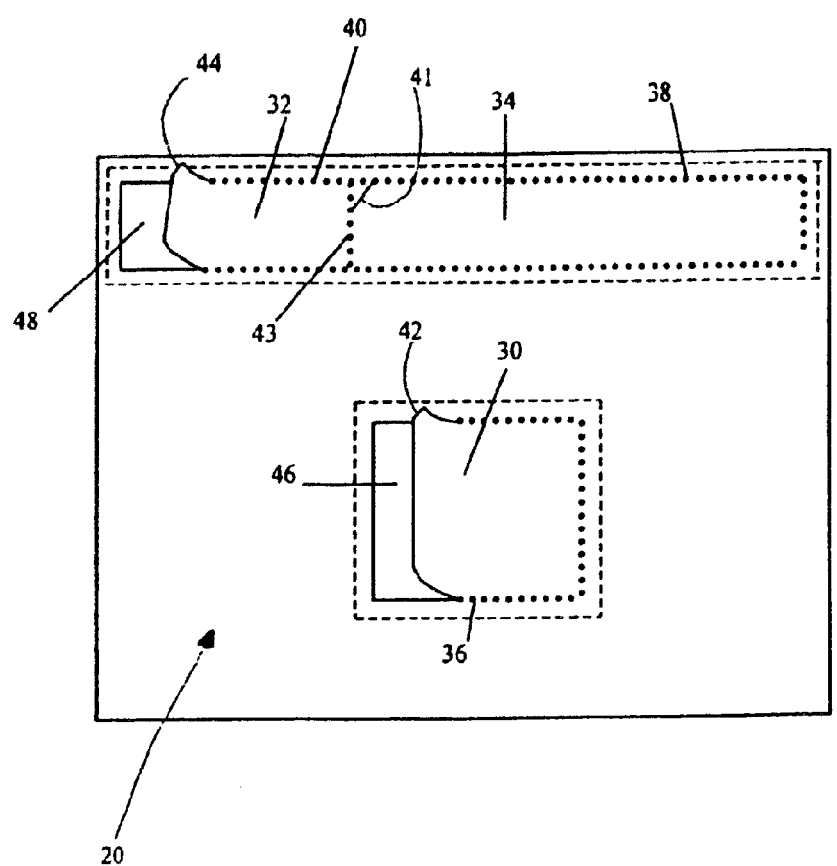
FIG. 2 is a front view of a reusable envelope that can be made in accordance with the present invention from the envelope blank of FIG. 1 and showing the tear off portions thereof partially removed.

Generally, the envelope blank 10 comprises panels 11, 12, 14, and 17, which are capable of forming an envelope structure having a body and a sealing flap such as the envelope 20 illustrated in FIG. 2 by appropriate folding. Preferably the envelope 20 is a large envelope such as 6" by 9" or 10" by 13" envelopes, for example. The envelope 20 may be any size envelope, however, such as a #10 envelope or other conventional envelope. Additionally, the envelope blank 10 preferably includes panel or flap 15, which is preferably foldable along line 26 and which can be used as a closure flap for the envelope 20. As shown, the panel 11 can form a front face of the envelope 20. The panels 12 and 14 are preferably foldable along lines 22 and 24 respectively with respect to the panel 11 and can form a rear face of the envelope 20. The panel 17 is, as shown, foldable along line 28 with respect to the panel 11 so as to complete the envelope structure shown in FIG. 2. In a preferred aspect of the present invention an environmentally friendly adhesive such as Ecostix™ available from Ecosynthetix of Lansing, Mich. may be used to form the envelope 20 by attaching the panels 12, 14, and 17 to each other. Alternatively, any suitable adhesive, known or developed, may be used in accordance with the principle of the present invention.

Further, as shown in FIGS. 1 and 2, the envelope blank 10 preferably includes a first removable portion 30, a second removable portion 32, and a third removable portion 34. Any of these removable or tear off portions can be used in accordance with the present invention, either alone or together. Additionally, panels 46 and 48 are preferably attached to the panel 11 as illustrated so as to form a structure behind removable portions 30, 32, and 34 with respect to the front of the envelope 20. Any number of panels may be used in place of panels 46 and 48. That is, a single panel may be used to form panels 46 and 48 or any number of plural panels may be used accordingly.

Preferably removable portions 30, 32, and 34 are defined by perforations 36, 38, and 40 respectively, which are at least partially cut through the panel 11 so as to form a line of weakness for easy detachment. Perforations 36, 38, and 40 are preferably formed at predetermined intervals such that removable portions 30, 32, and 34 remain intact and an integral part of panel 11 until portions 30, 32, and 40 are removed. Also, as shown, a perforation 43 separates the portions 32 and 34 so that the portions 32 and 34 can be independently removed with respect to each other if desired.

The pattern of perforations 36 around removable portion 30 may comprise any desired pattern including but not limited to oval, circle, triangle, square, rectangle, shapes representative of a business such as aircraft, trucks, trademarks, etc., and puzzle shapes. Perforations 38 and 40 around removable portion 32 and 34 define a rectangle as shown but may be any desired pattern including those described above. Varying widths and lengths as required by the size of the envelope and the needs of the return address and postage requirements may be used.

Perforations 36, 38, and 40 are preferably formed around portions 30, 32, and 34 to allow for the removal of portions 30, 32, and 34 from the face (panel 11) of the envelope. It is contemplated that any line of weakness may be formed in the panel 11 to define the removable portions 30, 32, and 34 so that the portions 30, 32, and 34 can be removed from the panel 11. Preferably, as shown, slits 41, 42, and 44 are positioned at a corner of the removable portions 34, 30, and 32 respectively to provide a means to remove portions 30, 32, and 34. Preferably, the slits 41, 42, and 44 are cut through the panel 11 as a single cut so as to minimize interference with the processing equipment utilized by the post office. The slits 41, 42, and 44 may be located on any corner or at any location along the perforations. Further, multiple slits may be used on a removable portion. Alternatively or additionally tabs, strings, glued tabs, or flaps may be used. Also, it is contemplated that the perforations near a slit may be formed to be slightly weaker than the perforations that define the rest of a removable portion so that a removable portion can be more easily removed.

Removal of any of the portions 30, 32, and 34 reveals panels 46 and 48. By removing any of portions 30, 32, and 34 and exposing panels 46 and 48 a clean surface or a preprinted address, either return or recipient, or a postage mark may be provided thereby allowing the reuse of the envelope. The panels 46 and 48 may comprise blank, printed, cellophane window, or pocket structures. Any of the removable portions 30, 32, and 34, may further comprise an activatable adhesive or an adhesive with a removable liner applied to the back of at least a portion of the removable portions thereby permitting the portions to be reused as labels or the like on another or same envelope or package. In accordance with the present invention, panels 46 and 48 are preferably made from an earth friendly material such as recycled paper but may be formed from any material such as plastic, cloth, paper, and combinations thereof.

Still referring to FIG. 1, the panel 15, which is preferably used as a reusable sealing flap for the envelope 20, is shown in an exemplary embodiment. Panel 15 preferably comprises a first section 16 and a second section 18 separated by a boundary 52. The boundary 52 can be any line or region of weakness that can allow the sections 16 and 18 to be separated from each other to allow controlled opening and reclosure as described below. For example, the boundary may be a perforation or other release device or the like.

Preferably each of the sections 16 and 18 includes one or more respective adhesive regions (13 and 19, respectively) formed on at least a portion of each section 13 and 19. As shown, the adhesive regions 13 and 19 preferably extend along a length of the sections 16 and 18 but may be formed in any pattern or manner such that they can be used to secure the sealing flap 15 in accordance with the present invention as described below. For example, plural areas of adhesive, having any desired shape (regular, random, dots, lines, etc.), may be used as one or both of the adhesive regions 13 and 19.

Preferably, at least one of the adhesive regions 13 and 19 is spaced apart from the boundary 52. This facilitates independent sealing of either section 13 or 19 to the body of the envelope so that one of the sections can be reserved for sealing the envelope as described herein. In one preferred embodiment, both the adhesive region 13 and the adhesive region 19 are spaced apart from the boundary 52 as shown in FIG. 1. That is, the adhesive regions 13 and 19 are spaced apart from each other such that the boundary 52 is positioned generally between them.

Preferably, section 16 includes a tab 21 formed at an end of the section 16. More preferably, section 16 includes a tab 21 formed at each end of the section 16. The tab 21 preferably functions as a lifting tab that can be used to facilitate opening of the envelope when the sealing flap 15 is secured by the adhesive region 19. That is, the tab 21 generally makes it easier to initiate opening of the sealing flap along the boundary 52. For example, if the boundary 52 comprises a perforation or the like, the tab 21 may be lifted such that a tear may easily be initiated along the perforation to open the envelope.

The tab 21 may be formed, in one embodiment, by forming section 18 to be shorter than section 16 as illustrated in FIG. 1. Section 18 may be formed to be shorter than section 16 by including an indent 50 to form an access region indented at one or both ends of section 18. The indent preferably provides access to the tab 21. The indent 50 is preferably sized appropriately, depending on the envelope, so that the tab 21 can be accessed and that section 16 can easily be detached from section 18 when opening the envelope after being sealed by section 18 as described below. The indent 50 may be beveled, straight, curved, or any desired cut to form the indent.

Figure 3:
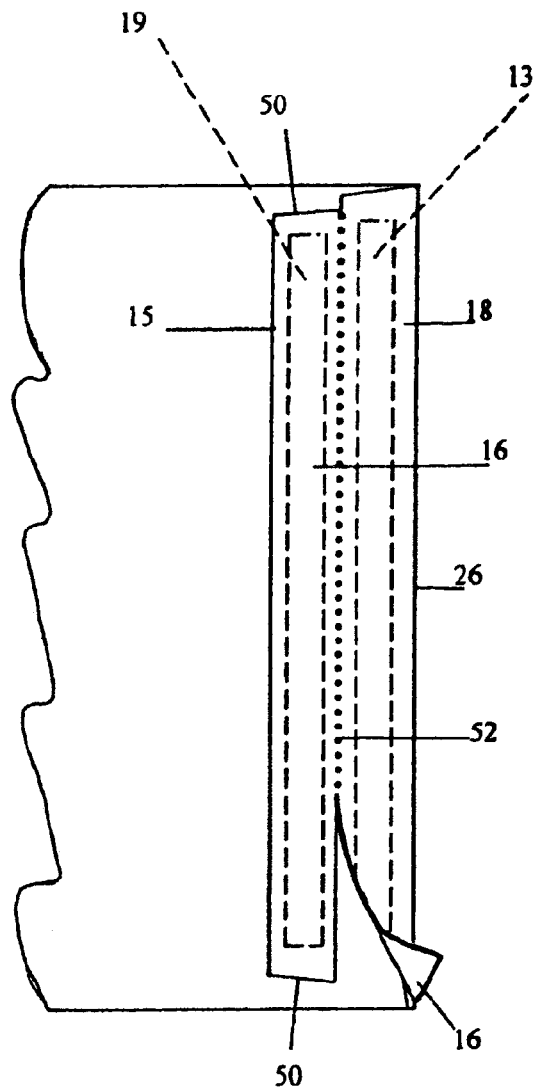
FIG. 3 is a top view of a reusable envelope closure that can be made in accordance with the present invention.

In a representative mode of use of the envelope, the envelope may be closed with seal flap 15, such as by using adhesive region 19 to secure the seal flap 15 to the envelope. Note that adhesive region 13 is not used for this closure and remains available for a subsequent sealing. Referring to FIG. 3, the envelope may be opened by lifting the tab 21, such that a tear can be formed along the length of boundary 52 (such as a perforation) until the section 16 is released. Section 18 thus preferably remains sealed to the envelope. The indent 50 is provided to allow easy access to section 16 thereby making it easy to separate section 16 from section 18 along boundary 52 by using the tab 21. Also, spacing the adhesive formed on one or both of sections 16 and 18 apart from the boundary 52 and apart from each other provides for easy opening of the envelope.

It is contemplated that the boundary 52 need not include a perforation or other actual line of weakness. That is, a boundary such as a perforation may not be needed. A suitable tool, such as a cutting tool may be used to separate the section 16 from section 18 when the adhesive region 19 is sealed to the envelope by controllably cutting between the adhesive regions. For example, the envelope may be sealed by adhesive region 19. A cutting tool, such as a scissors or the like, may be inserted to cut along the unsealed region between the adhesive regions 13 and 19 to open the envelope. Alternatively, a processing machine may be used for high volume applications. If desired, guidelines or markers may be printed or otherwise formed on the envelope to assist in cutting the sealing flap in the correct location. The perforation or other line of weakness is preferred, though, because it aids in opening the envelope.

The envelope may then be reused by activating adhesive 13 to reseal the envelope. It is contemplated that the flap 15 may comprise as many sections as desired in accordance with the functional aspects described herein so that the envelope may be reused multiple times. Additionally, the envelope may include printed instructions for sealing, opening, and/or resealing the envelope if desired.

Figure 4:
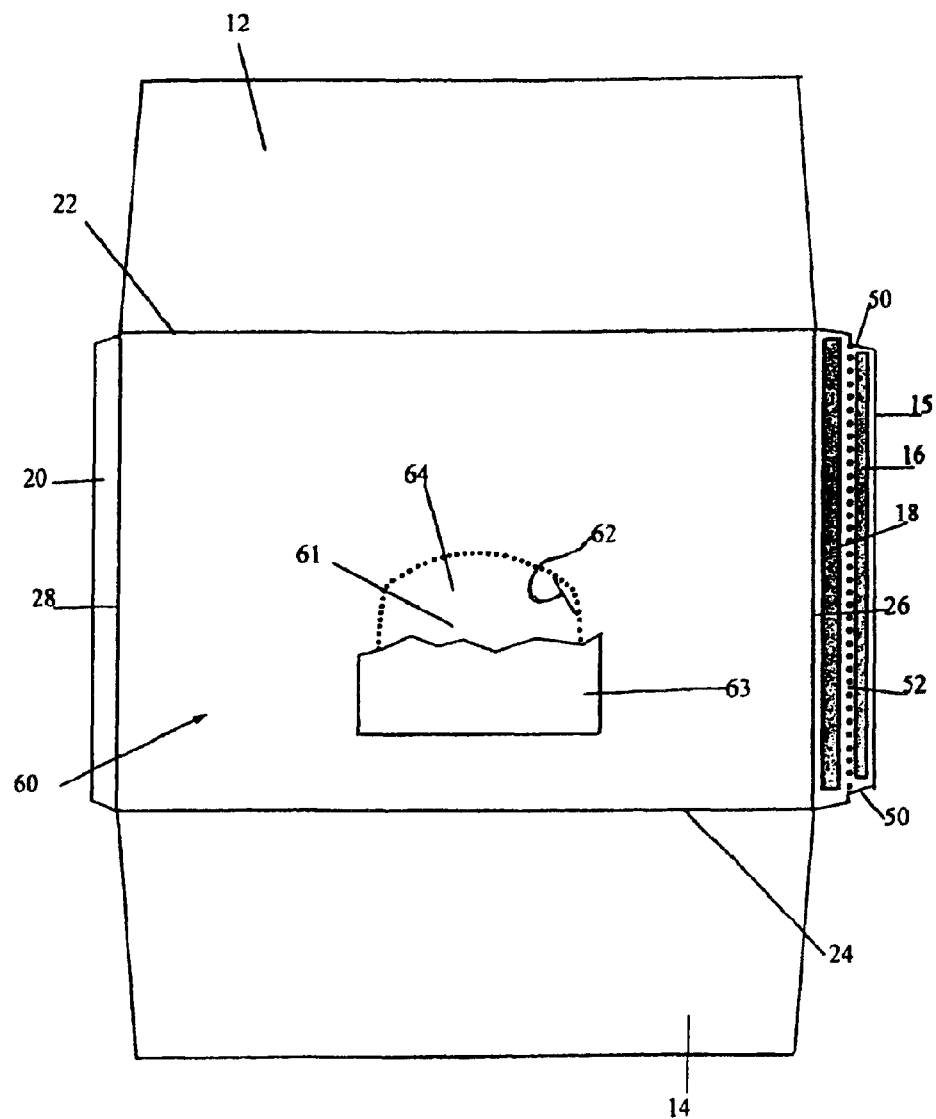
FIG. 4 is an inside view of an envelope blank that can be made in accordance with the present invention showing, in particular, an oval shaped tear off portion thereof.
Figure 5:
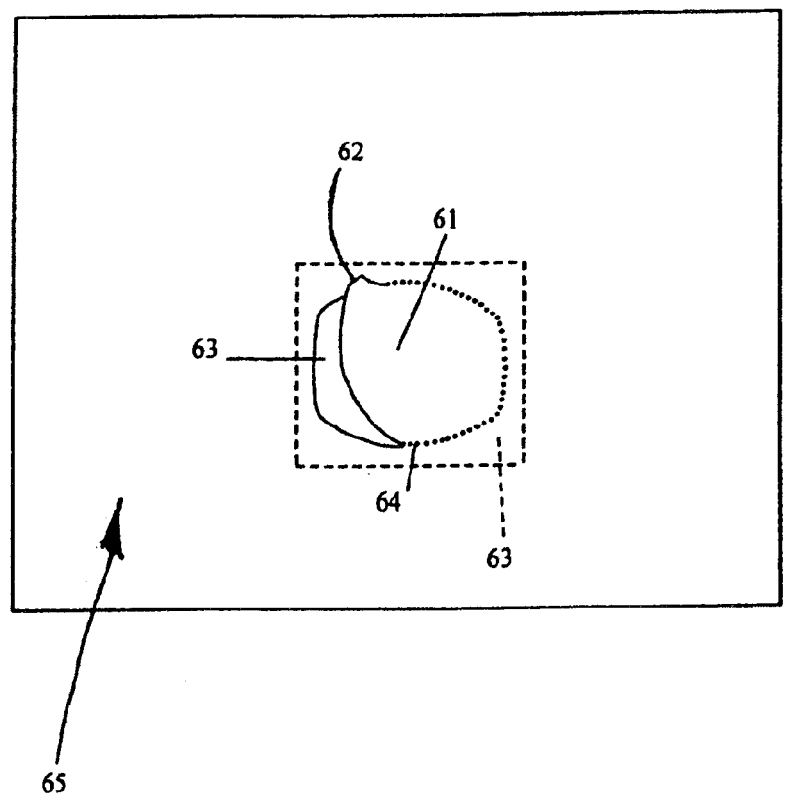
FIG. 5 is a front view of a reusable envelope that can be made in accordance with the present invention from the envelope blank of FIG. 4 and showing the oval shaped tear off portion thereof partially removed.

FIGS. 4 and 5 illustrate an alternative embodiment of an envelope blank 60 for forming an envelope 65. Preferably, the envelope blank 60 is similar to the envelope blank 10 shown in FIG. 1 but includes an oval shaped tear away portion 61 with a tear away perforation 64 defining the portion 61 instead of the rectangular tear away portion 30 of the envelope blank 10. The oval or D-shaped aspect of the tear away portion 61 preferably minimizes corners or flaps that could interfere with post office processing equipment. The envelope blank 60 preferably includes a panel 63 similar to the panel 46 described previously with respect to the envelope blank 10. As such, when the tear away portion 61 is removed, the panel 63 is exposed. The panel 63 may be blank or may be preaddressed or may comprise an additional tear away portion for allowing yet another reuse of the envelope structure thereby providing an envelope that can be reused one or more times. The tear away portion 61 can be used on new envelopes, preprinted envelopes or used envelopes to allow readdressing and/or forwarding of a new or used envelope thus making it easy to reuse envelopes and when finished making it easier to recycle envelopes by using earth friendly papers, and adhesives.

Figure 6:
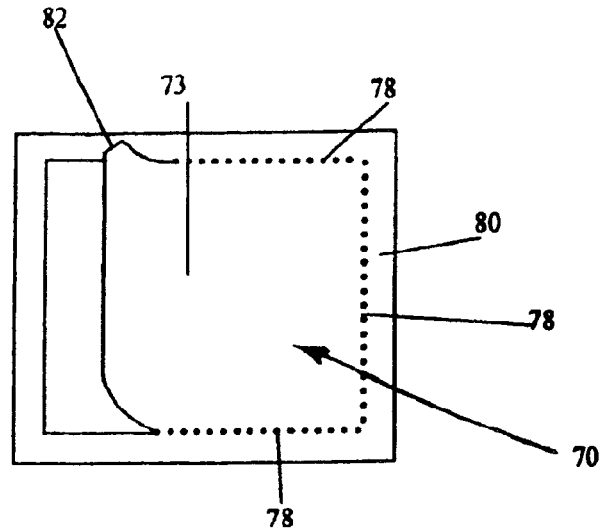
FIG. 6 is a top view of a label structure made in accordance with the present invention for forming a reusable envelope showing, in particular, a removable portion thereof partially removed.
Figure 7:
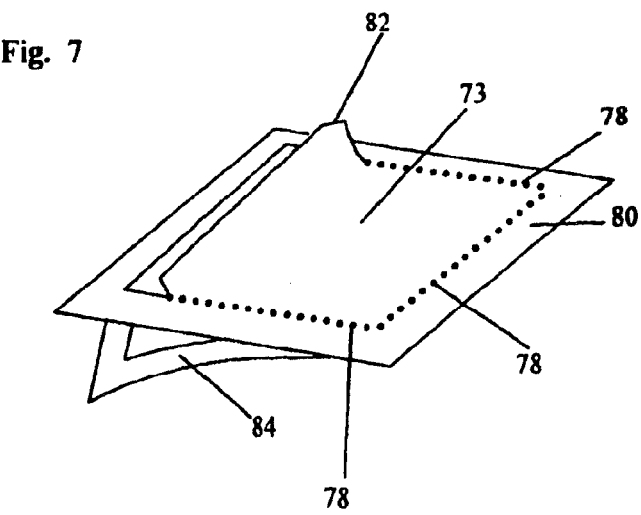
FIG. 7 is a perspective view of the label structure of FIG. 6 showing, in particular, an adhesive liner thereof partially removed.
Figure 8:
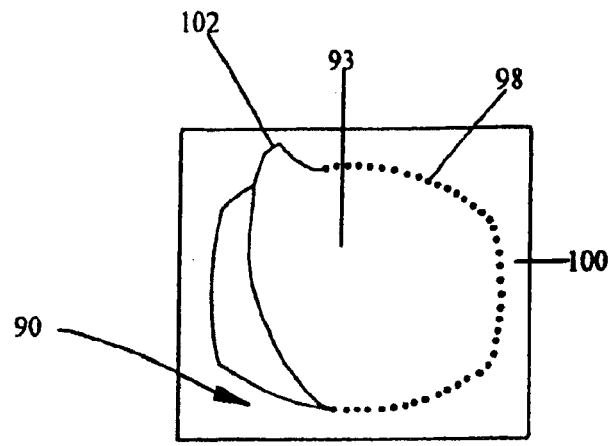
FIG. 8 is a top view of a label structure made in accordance with the present invention for forming a reusable envelope showing, in particular, an oval shaped removable portion thereof partially removed.
Figure 9:
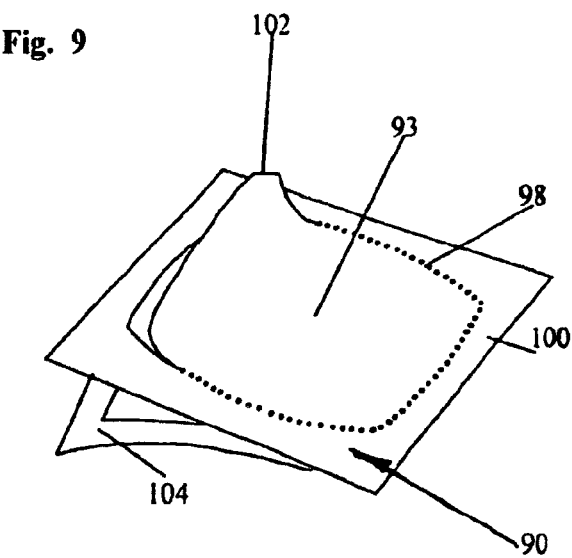
FIG. 9 is a perspective view of the label structure of FIG. 8 showing, in particular, an adhesive liner thereof partially removed.

In FIGS. 6 and 7 a label structure 70 attachable to an envelope, mailing device, or mailing container for forming a reusable or remailable envelope or structure therefrom, is shown. It is contemplated that the label structure 70 may be used with any article or container desired to be reusable or remailable. Also, in FIGS. 8 and 9 a similar label structure 90 is shown. Preferably, the labels 70 and 90 include tear away portions 73 and 93 respectively, border portions 80 and 100 respectively surrounding the tear away portions 73 and 93, and slits 82 and 102 for removing the tear away portions 73 and 93. As shown, the tear away portions 73 and 93 are defined by perforations 78 and 98 respectively. The tear off portion may be any desired shape and one preferred shape comprises an oval or D-shape for minimizing interference with post office processing machines as can be seen in FIGS. 8 and 9. Also, the labels 70 and 90 preferably include an adhesive positioned on border portions 80 and 100 so that the border portions 80 and 100 can be secured to an envelope or the like and so the that the tear away portions 73 and 93 can be removed thereby revealing a clean surface or a preprinted address or the like as described below. Also as shown, the adhesive preferably includes removable liners 84 and 104 covering the adhesive. It is contemplated that any adhesive, such as an earth-friendly activatable adhesive may be used.

The labels 70 and 90 may be applied to an envelope face or panel by removing border adhesive liner 84 or 104 from back of label border 80 or 100 and sticking border 80 or 100 to the envelope face. Alternatively, the labels 70 and 90 may be used with any shipping container desired to be easily reusable or remailable. Tear away labels 73 and 93 can remain in place and function as a primary address or return address or postage mark until desired to be removed by using slits 82 or 102 respectively. Removal of tear away portions 73 and 93 may reveal a blank address area for the envelope to be readdressed and forwarded or a preprinted address for resending the envelope to the originator or other recipient. Tear away labels 73 and 93 may be saved as an address label for later use on another envelope or may be used as the return address when envelope is being forwarded. That is, the tear away portions 73 and 93 preferably include an adhesive on the back of the tear away portions 73 and 93, however, the tear away portions 73 and 93 may be formed without adhesive if desired. The labels 70 and 90 may be any desired shape and size including, but not limited to, standard address and return address label sizes, ovals, circles, squares, triangles, rectangles, trade marks, and puzzle shapes in accordance with the present invention.

By using the labels 70 and/or 90 as a tear away address label and/or a tear away return address label in accordance with the present invention it is possible to create a reply envelope out of any envelope by simply tearing off the respective removable portions of the labels and reapplying, by using the adhesive, the removable portions oppositely. That is, the original return address becomes the new destination address and the original destination address becomes the new return address. It is noted that tape or other means to reseal the envelope might be needed if a resealable envelope is not used.

It is contemplated the labels 70 and 90 may be configured to have the return address tear away label and the destination address tear away label on one large label. It is also contemplated the labels 70 and 90 may be configured to have multiple labels on one sheet of standard size 8.5.times.11 adhesive back paper (preferably with a liner) capable of being printed by a suitable printer such as a laser or ink jet printer for multiple address labeling or mail merge applications. In another aspect of the present invention, the labels 70 and 90 may be stacked in order to reuse an envelope one or more times or to forward an envelope or package one or more times.

Figure 10:
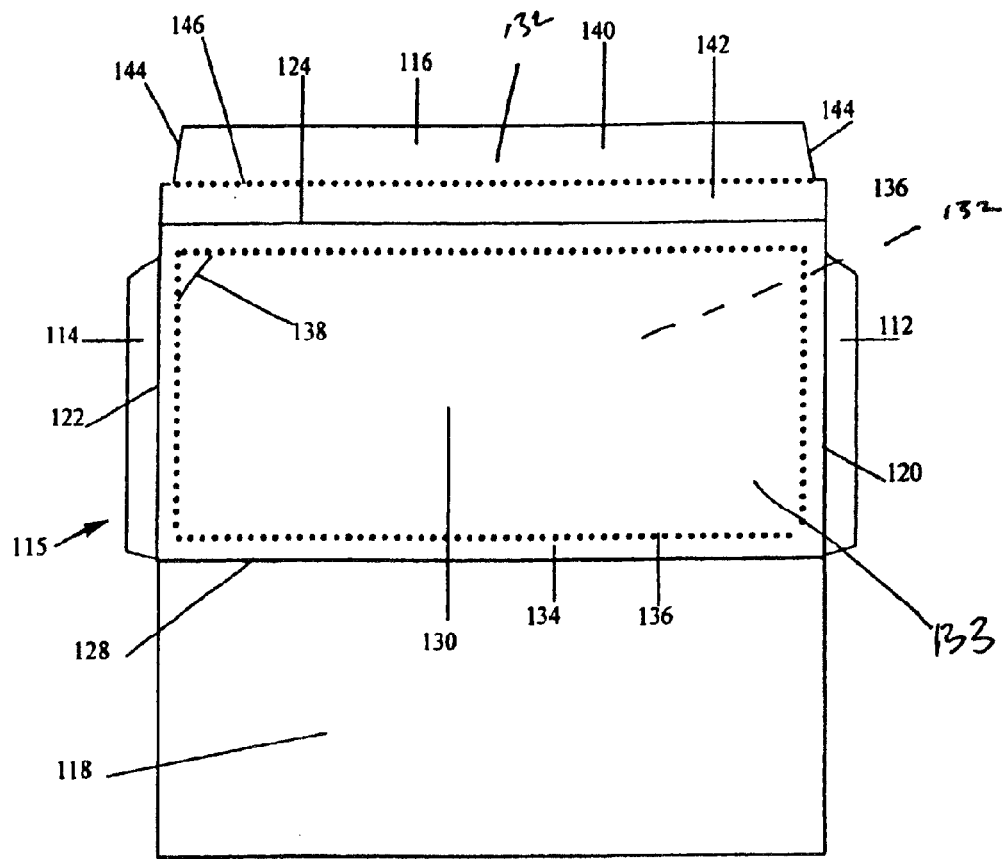
FIG. 10 is an outside view of an envelope blank that can be made in accordance with the present invention showing, in particular, a tear off portion thereof.

In FIG. 10, an envelope blank 115, preferably made of recycled paper, plastic, cloth or other material suitable for the creation of an envelope, is shown. Preferably, the envelope blank 115 includes side flaps 112 and 114, seal flap 116 and bottom flap 118. Flaps 112, 114, 116, and 118 can be folded along lines 120, 122, 124 and 128 respectively to form an envelope such as the envelope 121 shown in FIGS. 11 and 12 and described below.

As illustrated, the envelope blank 115 preferably includes a panel 132 which includes a panel 133 having a tear away portion 130 and a border 134. As shown the border 134 is attached to a panel 132 by securing the border 134 to the panel 132 with an adhesive or the like. Preferably, only the border 134 is attached to the panel 132 so that the tear away portion 130 is removable. It is contemplated however, that the envelope blank 115 may be formed in any way such that it comprises a tear-off face. For example, the envelope blank may be oval or triangular shaped.

The tear away portion 130 of the panel 133 and the border 134 is defined by a perforation 136 inset by a desired amount on all four sides of the panel 133. Preferably, the perforation 136 is cut at predetermined intervals such that the tear away portion 130 and the border 134 may be integral portions of the panel 133. Perforation 136 is preferably formed on all four sides of tear away portion 130 to help ensure that the tear away portion 130 will not be accidentally removed during processing and delivery. Tear away portion 130 and border 134 are preferably the same size as the panel 132 but may be different.

As shown perforation 136 around tear away portion 130 defines the shape of the tear away portion 130. Preferably, the tear away portion 130 is rectangular in shape in accordance with standard envelopes. It is contemplated that the tear away portion 130 and border 134 can be any desired shape and size to fit a multitude of envelopes or other mailing devices or the like.

A means to remove the tear away portion 130 is illustrated as a slit corner or a notched corner 138. To remove the tear away portion 130 the slit or notched corner 138 is used to break the perforation 136 and thereby release the tear away portion 130. Accordingly, the border 134 remains on the envelope. In accordance with the present invention, the tear away portion 130 can be blank or printed with a destination address, return address, or a postage mark. The back side of the tear away portion 130 may be blank or printed as a reply device such as a survey, invoice, notice of acceptance, coupon or other call to action device thereby eliminating the additional weight of a reply device inside the envelope.

Figure 11:
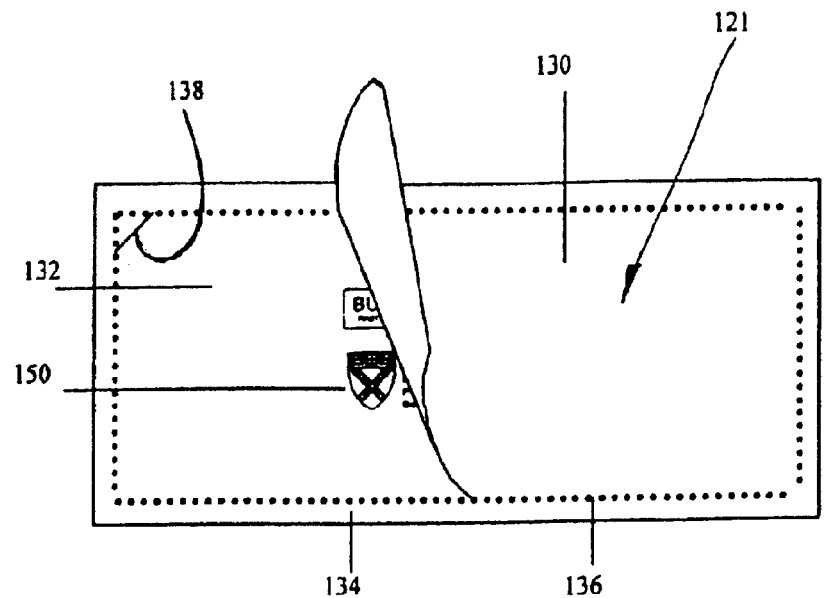
FIG. 11 is a front view of a reusable envelope that can be made in accordance with the present invention from the envelope blank of FIG. 10 and showing the tear off portion thereof partially removed.

As shown in FIG. 11, by removing tear away portion 130, the panel 132 may be revealed. As described above, the border 134 is preferably attached to the panel 132. The panel 132 can be blank thereby allowing the envelope to be reused at another time or can be preprinted with a business reply address 150, 152, indicia 154, bar code 156 or other address information. The panel 132 could also have a window(s) with or without cellophane or a pocket.

In order for the panel 132 to be used as a reply envelope, preprinted reply address 150, 152 indicia 154, and bar code 156 should be correctly positioned for post office electronic scanners for correct delivery. Preferably business reply address 150, 152 indicia 154, bar code 156 are preprinted within the specifications of the post office for acceptable reply mail.

Figure 12:
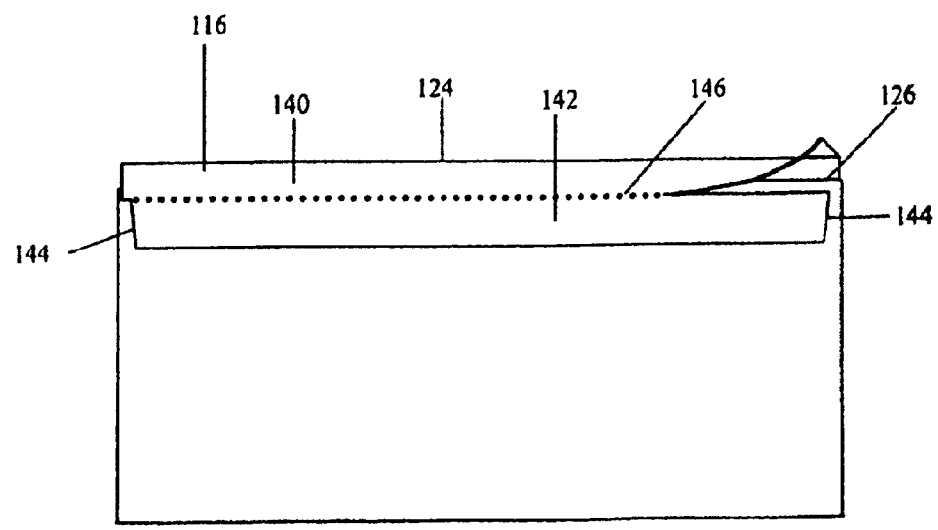
FIG. 12 is a rear view of the reusable envelope of FIG. 11 and showing, in particular, a reusable closure thereof in accordance with the present invention.

As shown in FIG. 12, seal flap 116 comprises perforation 146 and sections 140 and 142. Seal flap 142 may comprise a bevel cut 144 indented at each end of seal flap 142 making seal flap 142 shorter than seal flap 140. Seal flap 116 has two fold lines 124 and 126. Fold line 124 is used when seal flap 142 is secured to the envelope when sent from originator, and fold line 126 is used with seal flap 140 when envelope is returned or forwarded. To open the envelope a finger, thumb, or tool can be inserted under second seal flap 140 and moved along the length of perforation 146 until seal flap 140 is released. For resealing envelope, seal flap 140 is remoistened or liner removed, folded on line 126, and pressed to seal for returning contents. Both seal flaps 140 and 142 preferably utilize earth friendly activatable glue or adhesive with an adhesive liner back for sealing and resealing.

Figure 13:
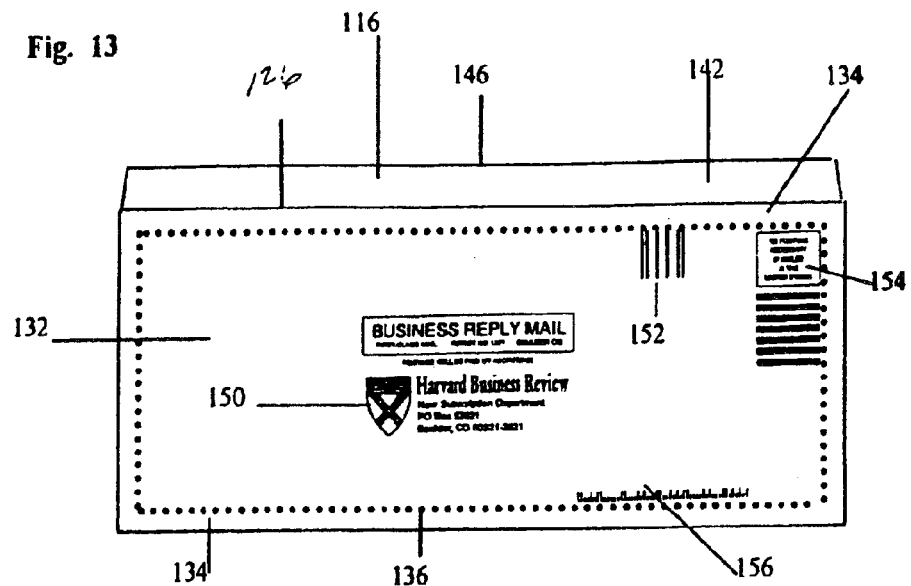
FIG. 13 is a front view of a reusable envelope in accordance with the present invention showing the envelope after being opened by using a reusable closure in accordance with the present invention.
Figure 14:
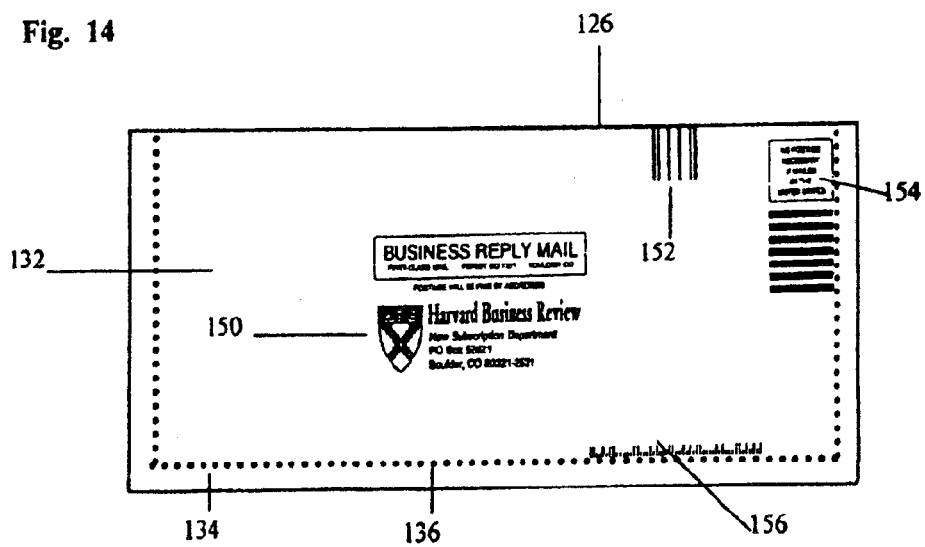
FIG. 14 is a front view of the reusable envelope of FIG. 13 showing, in particular, the envelope after being resealed by a reusable closure in accordance with the present invention.

As illustrated in FIGS. 13 and 14, when the second seal flap 140 is folded on fold line 126 to reuse the envelope, the top portion of border 134 may be folded down, thereby allowing indicia 152 to be positioned on top edge of envelope, thus securely resealing envelope for reply and meeting post office specifications for preprinted business reply envelopes.

Figure 15:
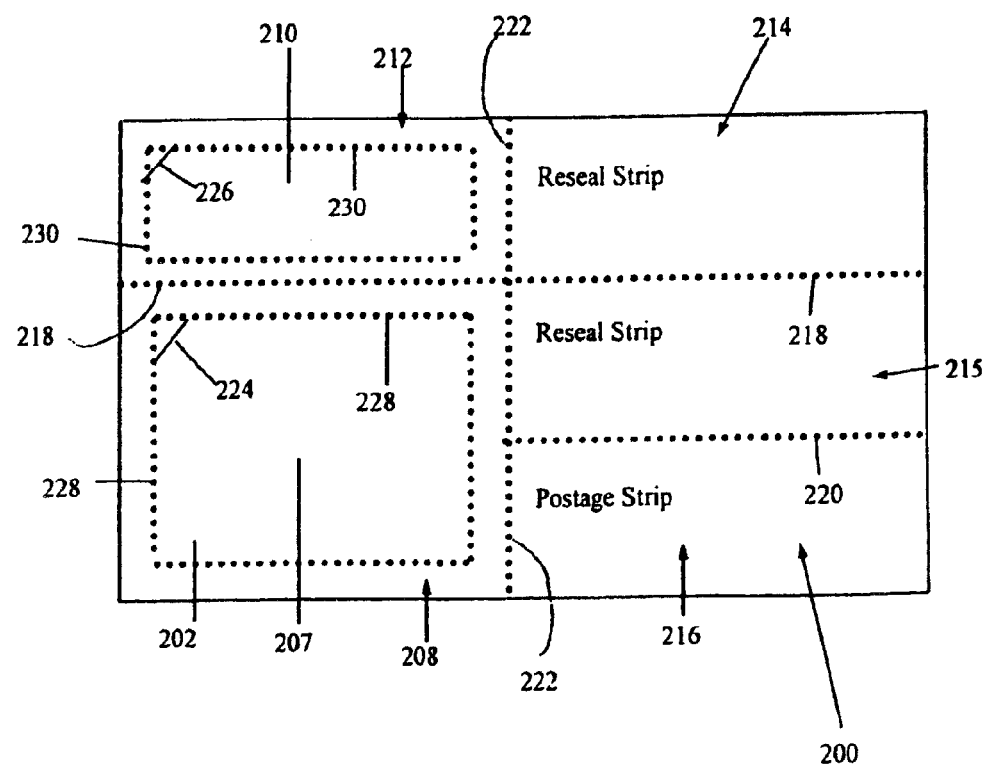
FIG. 15 is a front view of a kit that may be formed in accordance with the present invention for creating a reusable envelope.

In another aspect of the present invention, a self addressed stamped envelope kit or SASE Kit is provided, which may be used to convert an existing envelope, mailing device, shipping container, or the like to an envelope or structure that can be reused one or more times. An exemplary SASE Kit 200 is shown in FIG. 15 and comprises labels 208 and 212 with tear away label portions 207 and 210 formed in accordance with the present invention. The SASE Kit 200 further comprises reseal strips 214 and 215 and a return postage strip 216. An SASE Kit may be used to send contents in an envelope with the intention of the contents and the same envelope being returned. That is, the SASE Kit 200 may be included inside the envelope or may be attached to the envelope as described below. With this method only one envelope is needed to send and return information. Additionally, the SASE Kit 200 may be used to simply make an envelope reusable.

Figure 16:
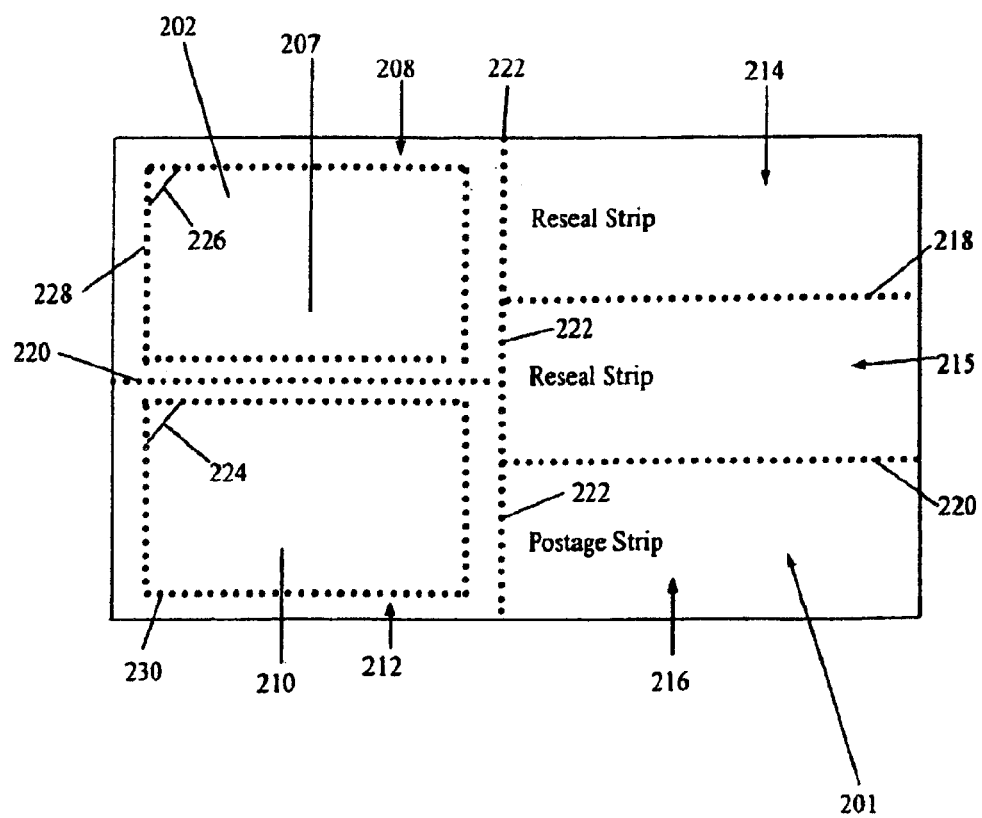
FIG. 16 is a front view of an alternate embodiment of a kit that may be formed in accordance with the present invention for creating a reusable envelope.

Each of the parts of the SASE Kit 200 are preferably formed and defined by perforations 218, 220, and 222. That is, perforations 218 and 222 define reseal strip 214, perforations 218, 220, and 222 define reseal strip 215, perforations 220 and 222 define postage strip 216, perforations 218 and 222 define label portion 210, and perforations 218 and 222 define label portion 208. Perforations 228 and 230, as shown, define tear away portion 207, and tear away portion 210 respectively. A means to remove tear away portions 207 and 210 is provided by slit corner or notched corner 224 and 226 for the tear away portions 207 and 210 respectively. In FIG. 16 an alternative SASE Kit 201 is illustrated in which the portions 207 and 210 are similarly sized and shaped. It is contemplated that the portions 207 and 210 may be any desired size and/or shape and that the reseal strips 214 and 215 may be provided in any size, shape, or quantity. Further, the postage strip 216 may be any desired size and shape, however, it is preferred to be of a size and shape capable of covering at least a portion of a conventional postage mark.

In an aspect of the present invention, SASE Kit 200 may include an adhesive for attaching the SASE Kit 200 to a panel of an envelope or shipping container or the like. For example, SASE Kit 200 may be attached to a rear panel of an envelope rather than being placed inside an envelope. The envelope may be sent, with contents if desired, to a recipient. The recipient can then remove the contents and reuse the envelope by utilizing the SASE Kit 200 attached thereto (or placed inside). The removable portion 207, which may be blank or preaddressed, may be removed and placed over the original destination address and attached by adhesive or tape or similar technique. Removable portion 210 may be similarly utilized with respect to a return address. Also, reseal strips 214 and 215 may be used to reseal the envelope. Postage strip 216 may be preprinted with a postage mark, bar code, or other indicia and utilized accordingly.

Figure 17:
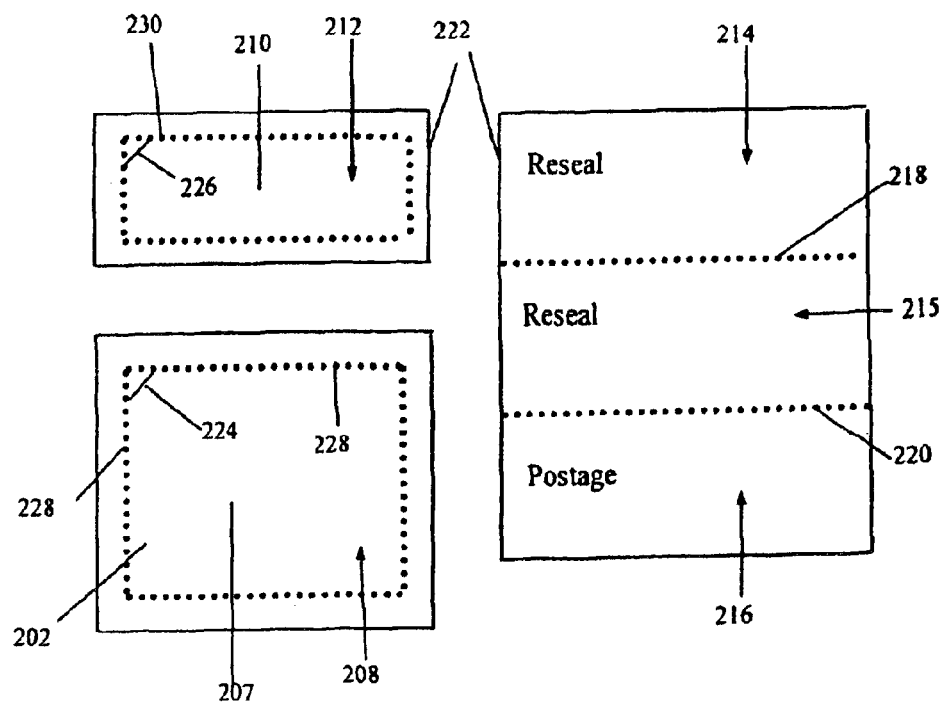
FIG. 17 is a front view of the kit of FIG. 15 showing, in particular, portions of the kit separated along lines of perforation.
Figure 18:
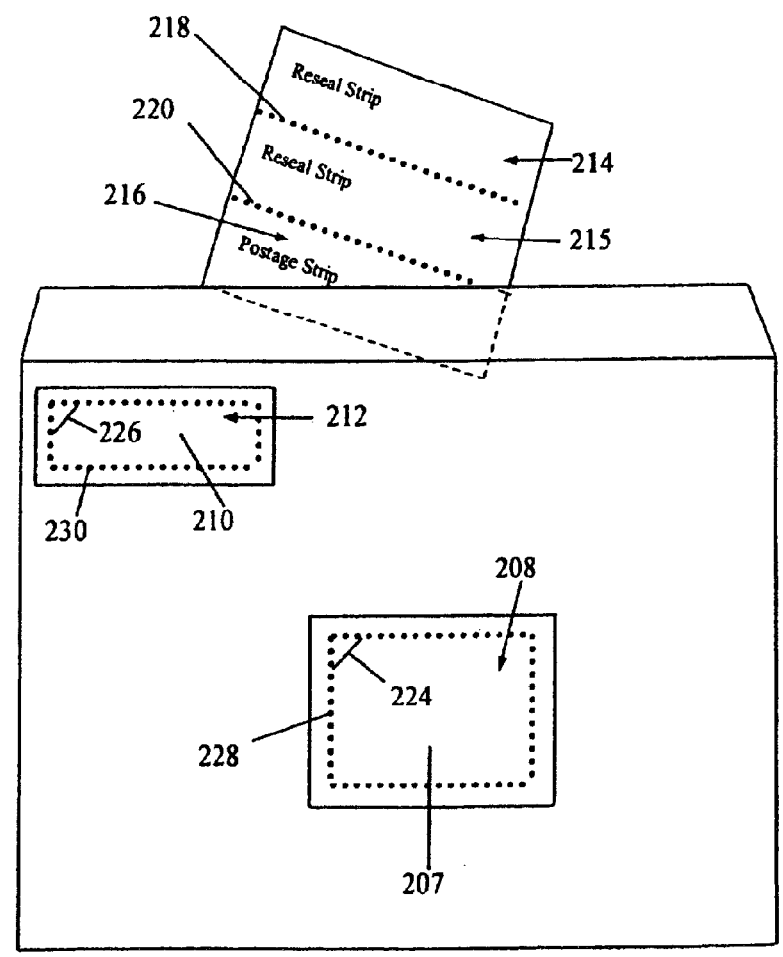
FIG. 18 is a front view of a reusable envelope that can be formed in accordance with the present invention by using the kit of FIG. 17 and showing, in particular, portions of the kit attached to the front of the envelope and portions of the kit being placed within the envelope for future use.

FIGS. 17-20 illustrate various additional aspects of using the SASE Kit 200. In FIG. 17 the portions 208 and 212 are shown separated from each other and from the seal strips 214 and 215 and the postage strip 216. The portion 208 may be attached as a destination address label to an envelope as shown in FIG. 18. Also, the portion 212 may be attached as a return address label as shown in FIG. 18.

In FIG. 18, the envelope is shown ready to be addressed and contents put in the envelope. The reseal strips 214 and 215 and the postage return strip 216 may be included in the envelope with the contents being mailed. If identical articles are to be returned, for example, such as a contract that needs to be signed and returned, then the same postage may be on the face of the envelope and on the return postage strip.

Figure 19:
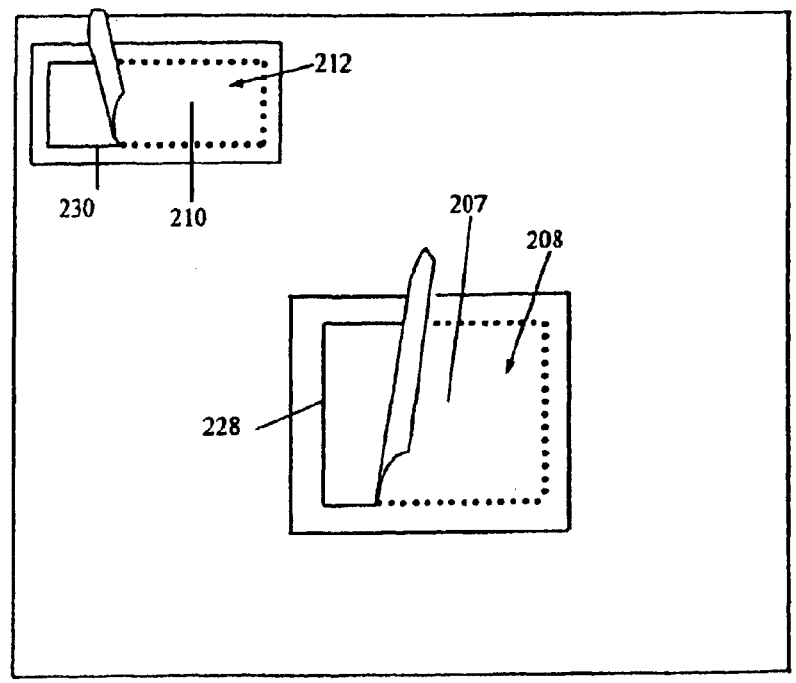
FIG. 19 is front view of the reusable envelope of FIG. 19 showing, in particular, removable portions of the portions of the kit attached to the front of the envelope partially removed.

In FIG. 19, the tear off portions 207 and 210 are shown partially removed. When a recipient receives the envelope, the envelope may be opened and the contents removed and put back into the envelope if desired. Tear away address label 207 and return address label 210 may be removed from the face of the envelope by pulling slit or notched corner 224 and 226 thereby tearing along perforations 228 and 230. Once labels are removed adhesive may be activated and labels switched so original return address label 210 is now the destination address label and original destination address label 207 is now the return address label. Also, the new postage strip 216 may be torn away from reseal strips 214 and 215 along perforation 220 and placed over the cancelled postage.

Figure 20:
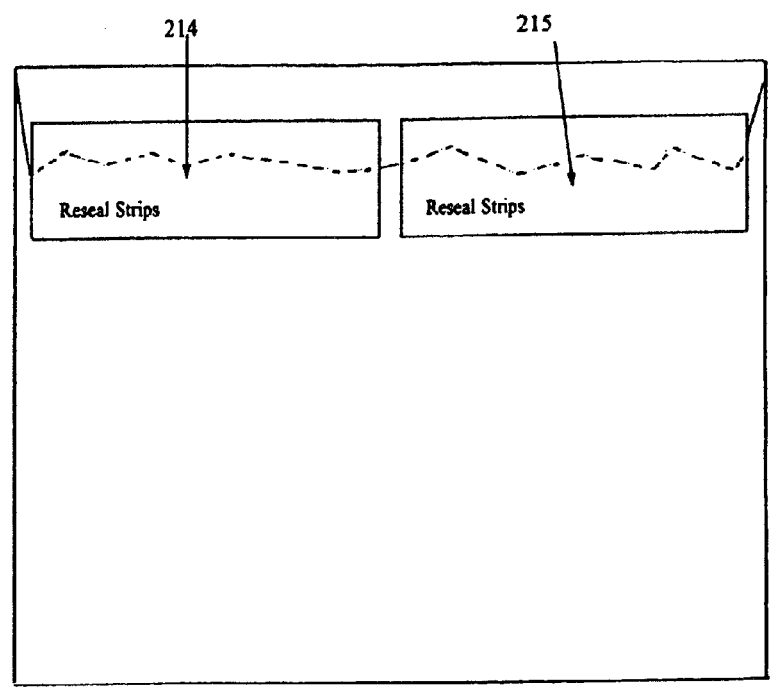
FIG. 20 is a rear view of a reusable envelope that can be formed by using the kit of FIG. 17 and showing, in particular, a closure flap of the envelope being resealed by portions of the kit.

In FIG. 20, reseal strips 214 and 215 are shown separated along perforation 218 and are used to securely reseal the envelope by placing over reseal flap or opening of original envelope as illustrated. It is contemplated that any number of reseal strips may be used.

Figure 21:
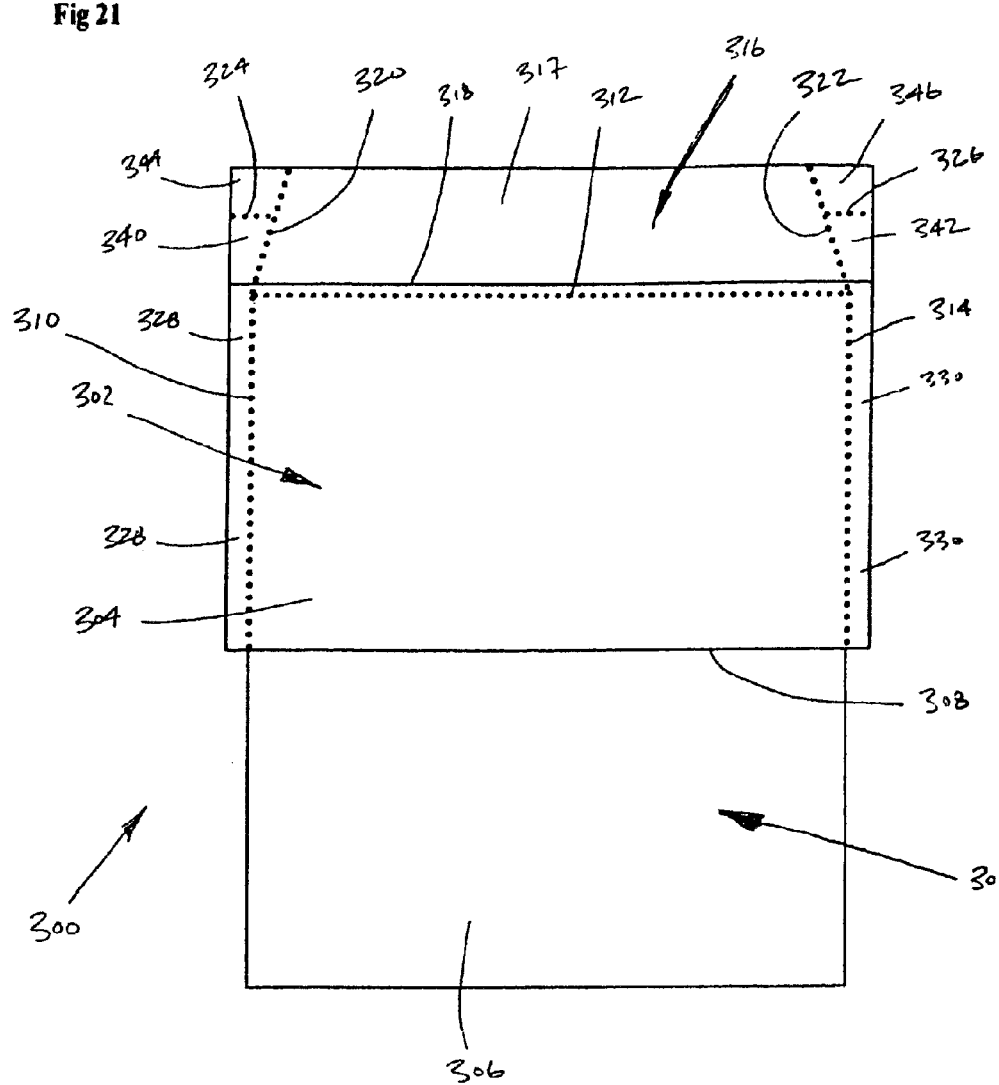
FIG. 21 is a top view of a structure that can be made in accordance with the present invention that can be attached to an envelope for forming a reusable envelope.

In another aspect of the present invention a structure 300 capable of being attached to an existing envelope to form a reusable envelope is provided. An exemplary embodiment of the structure 300 is shown in FIG. 21. Preferably, the structure 300 is formed from paper or any other material suitable for forming an envelope such as tree-free, recycled paper, plastic, etc. Preferably, the structure 300 includes a removable portion 302. As shown, the removable portion 302 includes a first panel 304 and a second panel 306 which are preferably foldable with respect to each other by fold line 308. The removable portion 302 may, however, include any desired number of panels having any desired shape. Preferably, perforations 310, 312, and 314 are provided so that the removable portion 302 may be separated from the structure 300. The perforations 310, 312, and 314 define the first panel 304 as shown and may be any line of weakness or the like such that the removable portion 302 may be separated from the structure 300.

The structure 300 further includes a flap 316, which is preferably foldable along line 318. As described below, the flap 316 may be used as a sealing flap for sealing an envelope structure. Preferably, the flap 316 includes a removable portion 317, which is defined by perforations 312, 320, and 322. As such, the removable portion 317 of the flap 316 may be removable with the removable portion 302 or may be removable independently. Also, as illustrated the flap 316 preferably includes perforations 324 and 326 that may be used with certain envelope structures so that a sealing flap on an envelope to which the structure 300 is attached may be reused as described in detail below.

Further referring to FIG. 21, the structure 300 preferably includes a region 328 and a region 330 capable of attaching the structure 300 to a face of an envelope. Attaching the structure 300 to the face of an envelope may be accomplished by using conventional adhesives or the like. In one aspect of the present invention an earth friendly adhesive may be used.

Figure 22:
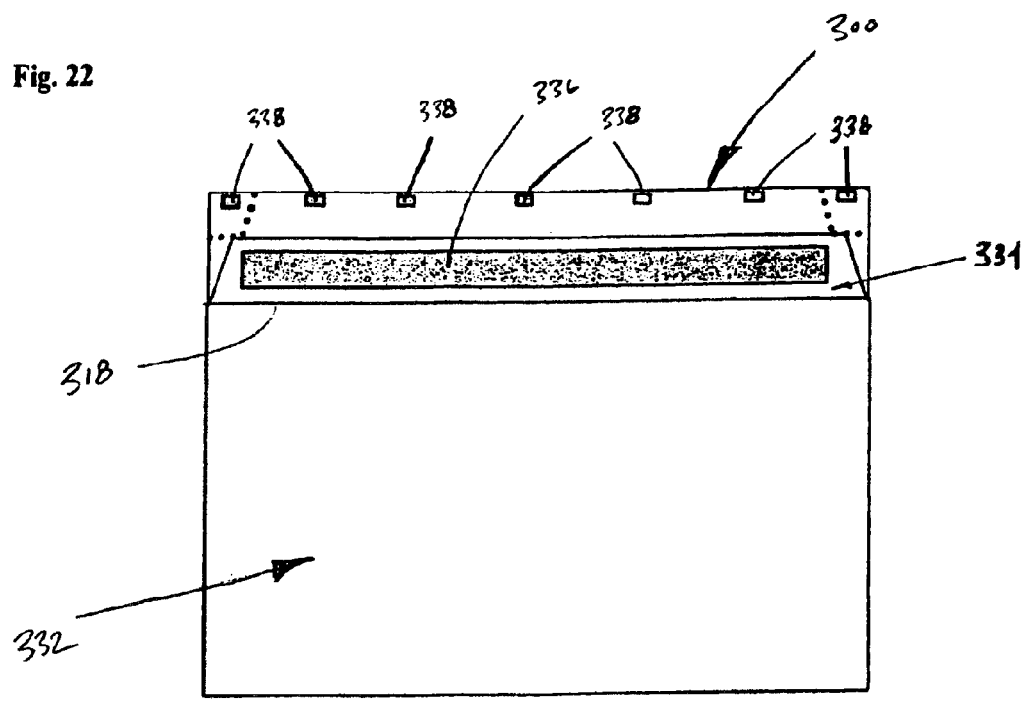
FIG. 22 is a rear view of a reusable envelope that can be formed in accordance with the present invention showing, in particular, the structure of FIG. 21 attached thereto.
Figure 26:
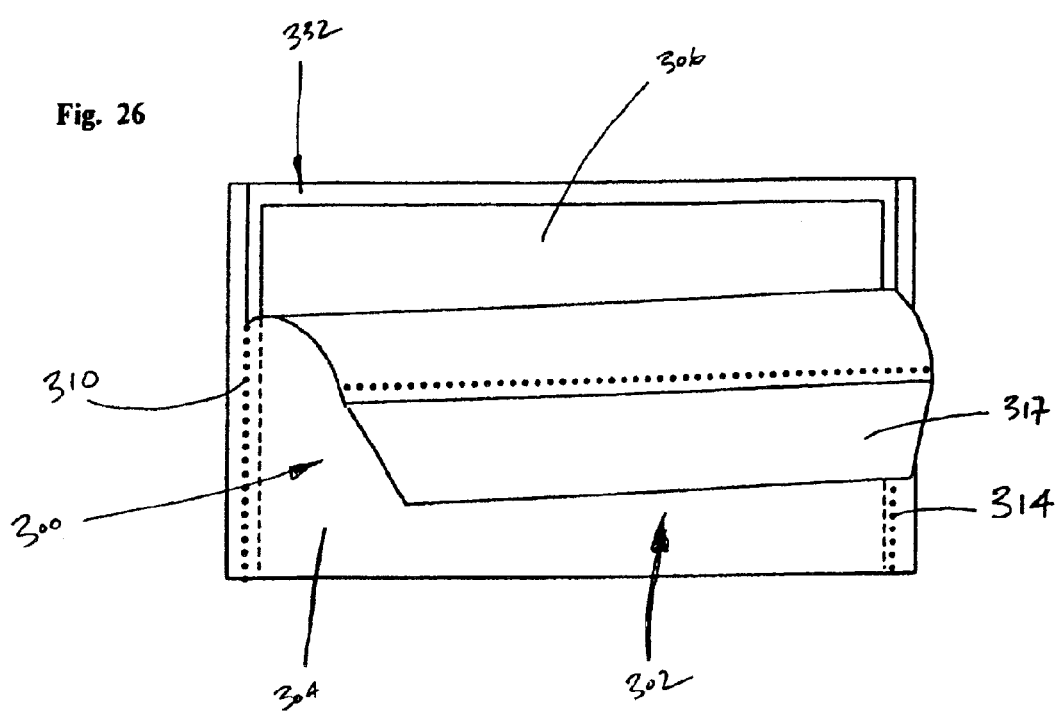
FIG. 26 is a front view of the envelope of FIG. 25 showing the removable portion of the panel of FIG. 21 further detached from the envelope in accordance with the present invention.

Referring to FIG. 22, the structure 300 is shown attached to the face of an envelope 332 and is illustrated from the rear side of the envelope 332. As illustrated, the envelope 332 includes a sealing flap 334, which is foldable along fold line 318 and includes an adhesive region 336. It is contemplated that any size and shape of envelope may be used in conjunction with the structure 300 such that the functional aspects of the present invention are accomplished. Preferably, the structure 300 is attached to the face of the envelope 332 by using an adhesive positioned on region 328 and 330 and such that the second panel 306 is folded along the fold line 308 so that the second panel 306 generally coincides with the first panel 304 and is positioned between the face of the envelope 332 and the first panel 304 as can be seen in FIG. 26. In an aspect of the present invention a releasable adhesive may be placed on a desired portion of the second panel 306 so as to attach the second panel 306 to the face of the envelope 332. Preferably, the second panel 306 is attached to the face of the envelope 332 near the fold line 308.

Figure 23:
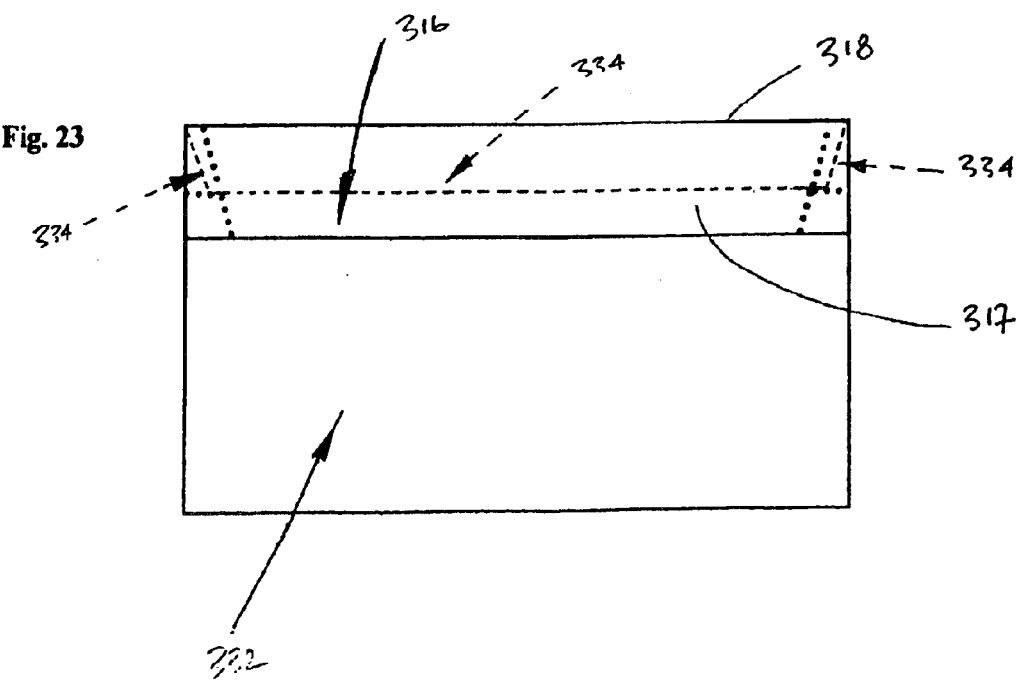
FIG. 23 is a rear view of the envelope of FIG. 22 showing, in particular, a closure flap of the envelope in a closed position in accordance with the present invention.

Further referring to FIG. 22, the flap 316 preferably includes adhesive regions 338 formed on the flap 316 so that the flap is capable of being folded along fold line 318 and sealed to the rear side of the envelope 332 as is illustrated in FIG. 23. Preferably, the sealing flap 334 of the envelope 332 is not sealed thereby making it reusable. That is, the seal of the envelope is formed by the flap 316 of the structure 300.

In a preferred aspect of the present invention the envelope 332 may be preaddressed and may also included a postage mark. By attaching the structure 300 to the face of a preaddressed envelope as described above, the address and any postage mark formed thereon can be hidden so that it may function as a return address after the removable portion 302 of the structure 300 is removed. That is, after the removable portion 302 is removed a preaddressed envelope remains that can be used to send certain contents to the addressee. For example, a business may form personalized correspondence for a customer such as an invoice or bill or the like on the removable portion 302 of the structure 300 and then attach the structure 300 to the face of an envelope that already has a desired address such as the businesses address preprinted thereon. The customer's address can be placed on the opposite side of the first panel 304 and the correspondence can be mailed to the customer. When the customer receives the envelope 332 having the structure 300 attached thereto, the removable portion 302 containing the invoice or the like may be removed and, if desired may be placed within the envelope 332 and returned to the business with a payment for example.

Figure 24:
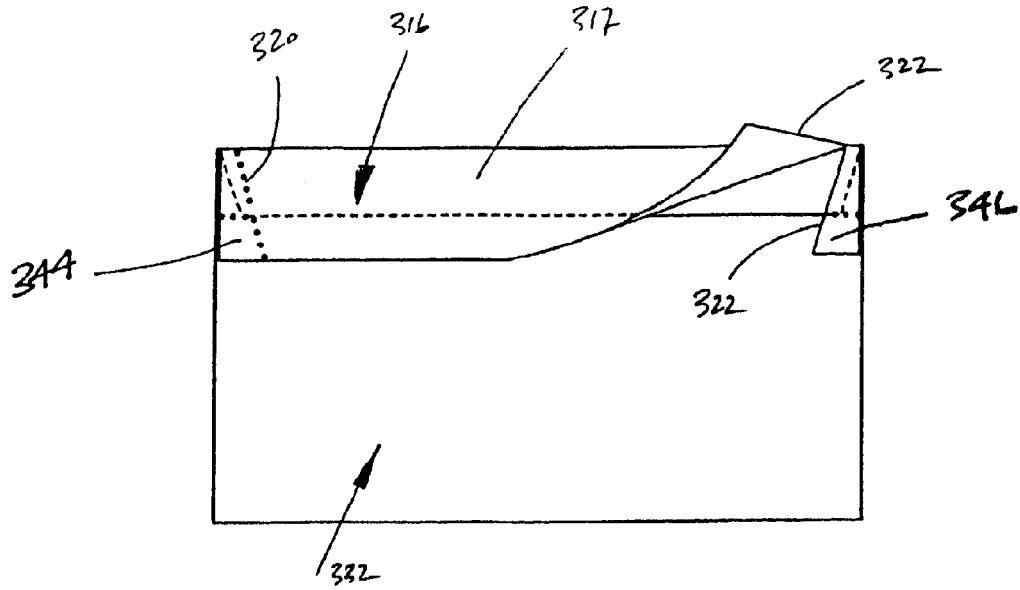
FIG. 24 is a rear view of the envelope of FIG. 23 showing a removable portion of the structure of FIG. 21 partially detached from the envelope in accordance with the present invention.
Figure 25:
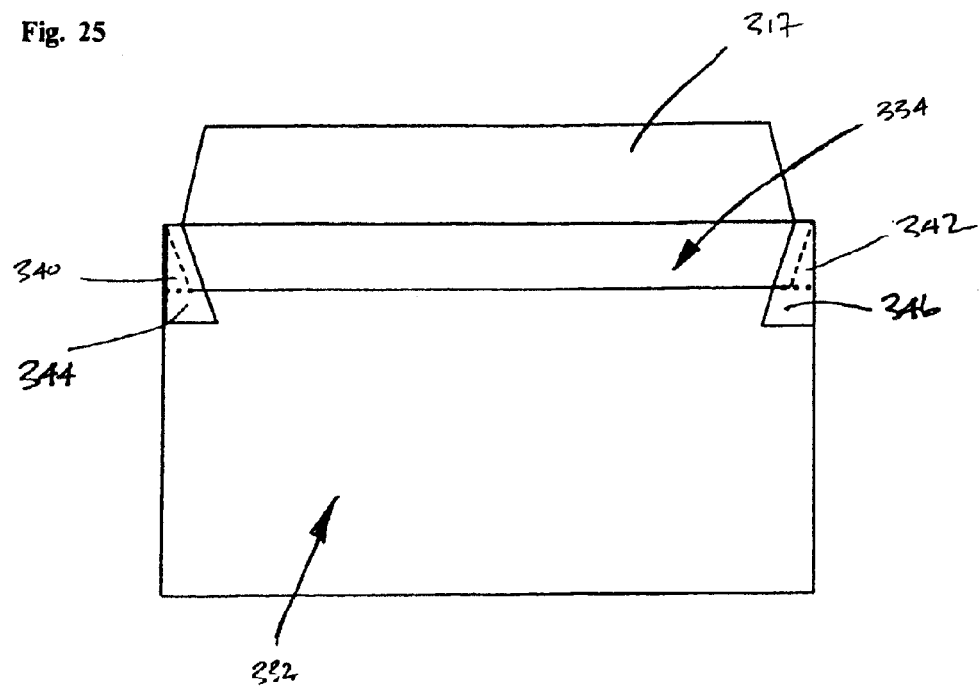
FIG. 25 is a rear view of the envelope of FIG. 24 showing the removable portion of the panel of FIG. 21 further detached from the envelope in accordance with the present invention.

In FIGS. 24, 25, 26, and 27 various stages of removing the removable portion 302 of the structure 300 from the envelope 332 are illustrated. Firstly, as shown in FIG. 24, the removable portion 317 of the flap 316 may be separated along perforations 320 and 322. As such, the removable portion 317 of the flap 316 may be separated from the flap 316 as shown in FIG. 25. It is noted that the sealing flap 334 of the envelope 332 is still at least partially held in place by portions 340 and 342 of the structure 300 and shown in FIG. 25.

Figure 27:
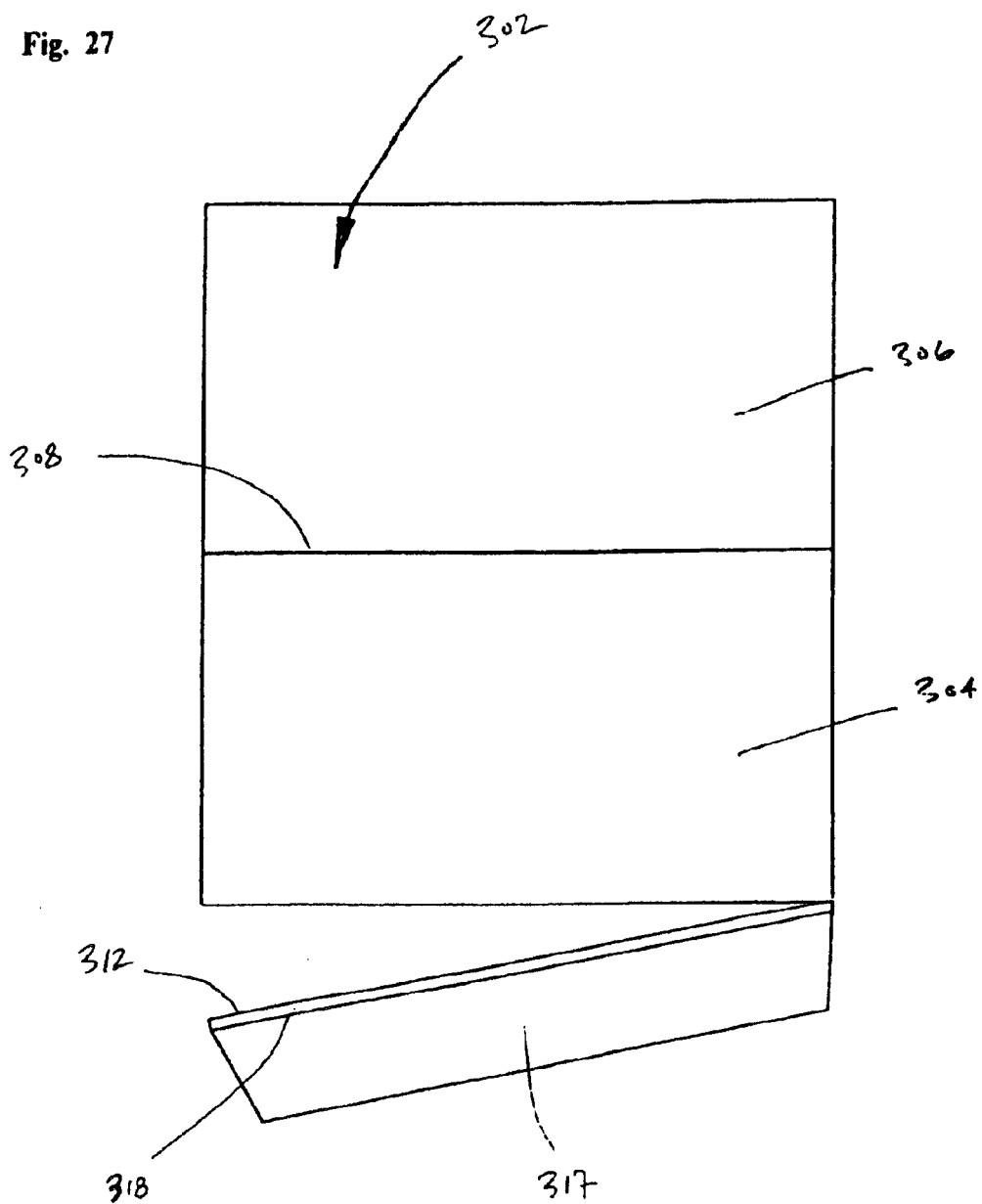
FIG. 27 is a front view of the removable portion of the panel of FIG. 21 completely detached from the envelope in accordance with the present invention.

Referring to FIG. 26 the removable portion 302 of the structure 300 is shown partially removed from the structure 300, which is attached to the envelope 332. Preferably the perforations 320 and 322 of the flap 316 joined to the perforations 310 and 314. That is, it is preferred that the removable portion 302 can be removed in one continuous motion by separating the removable portion 317 of the flap 316 and continuing to separate the first panel 304 from the structure 300. It is contemplated however that the removable portion 317 and the removable portion 302 may be separately removed from the structure 300. In FIG. 27 the removable portion 302 of the structure 300 shown having the removable portion 317 of the flap 316 partially removed therefrom.

Figure 28:
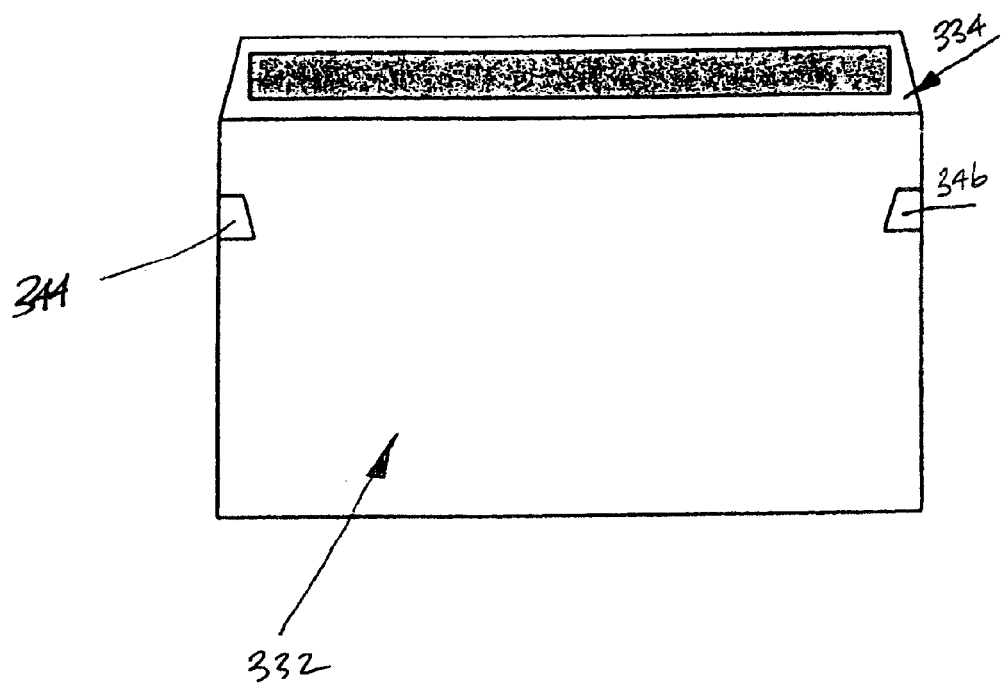
FIG. 28 is a rear view of the reusable envelope of FIG. 25 showing, in particular, a closure flap of the envelope ready for reuse in accordance with the present invention.
Figure 29:
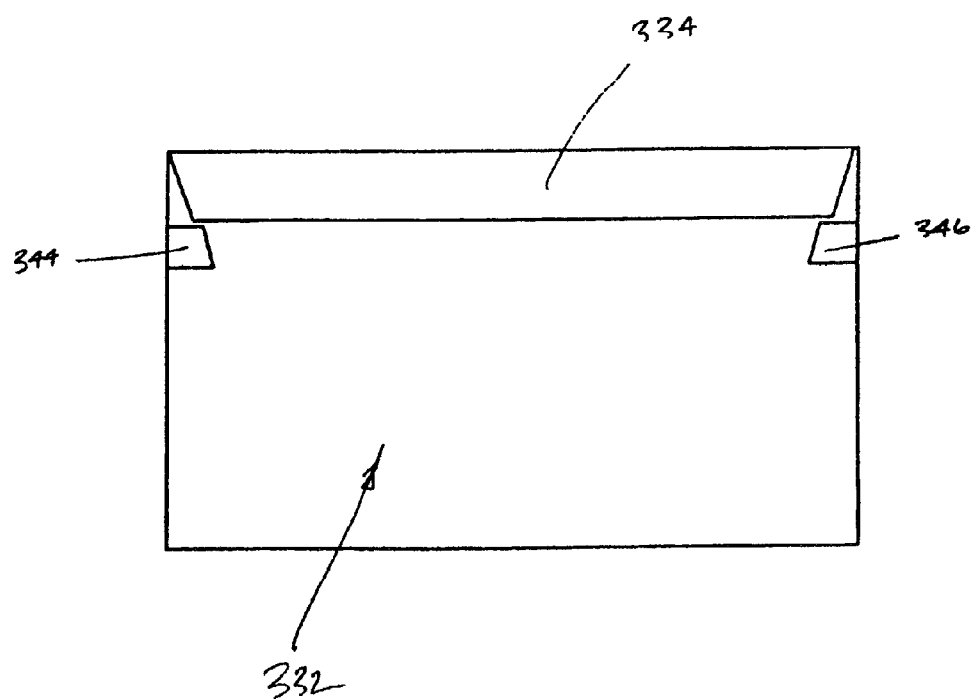
FIG. 29 is a rear view of the reusable envelope of FIG. 28 wherein the closure flap is sealed in accordance with the present invention.

After the removable portion 302 of the structure 300 is removed from the envelope 332 the sealing flap 334 of the envelope may be released by tearing away the portions 340 and 342. The envelope 332 with the sealing flap 334 released is shown in FIG. 28 and is ready to be reused. It is noted that portions 344 and 346 may remain attached to the envelope. Thus, if desired, the removable portion 302 or any other correspondence may be placed in the envelope 332 and may be returned to the sender or any other desired recipient by sealing the envelope 332 as is shown in FIG. 29 with the flap 334. It is contemplated, however, that the envelope 332 does not need to be preaddressed and may be a blank envelope that may be reused appropriately.

In FIGS. 30 through 45 another exemplary reusable envelope 400 of the present invention is illustrated. Methods of using envelope 400 are also illustrated. In FIG. 30, a front view of envelope 400 is shown. As illustrated, envelope 400 comprises a No. 10 size envelope but any size envelope may be used. Generally, as shown, envelope 400 comprises a body 402 which has an address window 404, a presort postage mark 406, and a flap 408 that includes inner and outer flap portions 410 and 412 substantially separated by a double perforation line 414 that defines a tear off portion 416 as described in further detail below.

Figure 33:
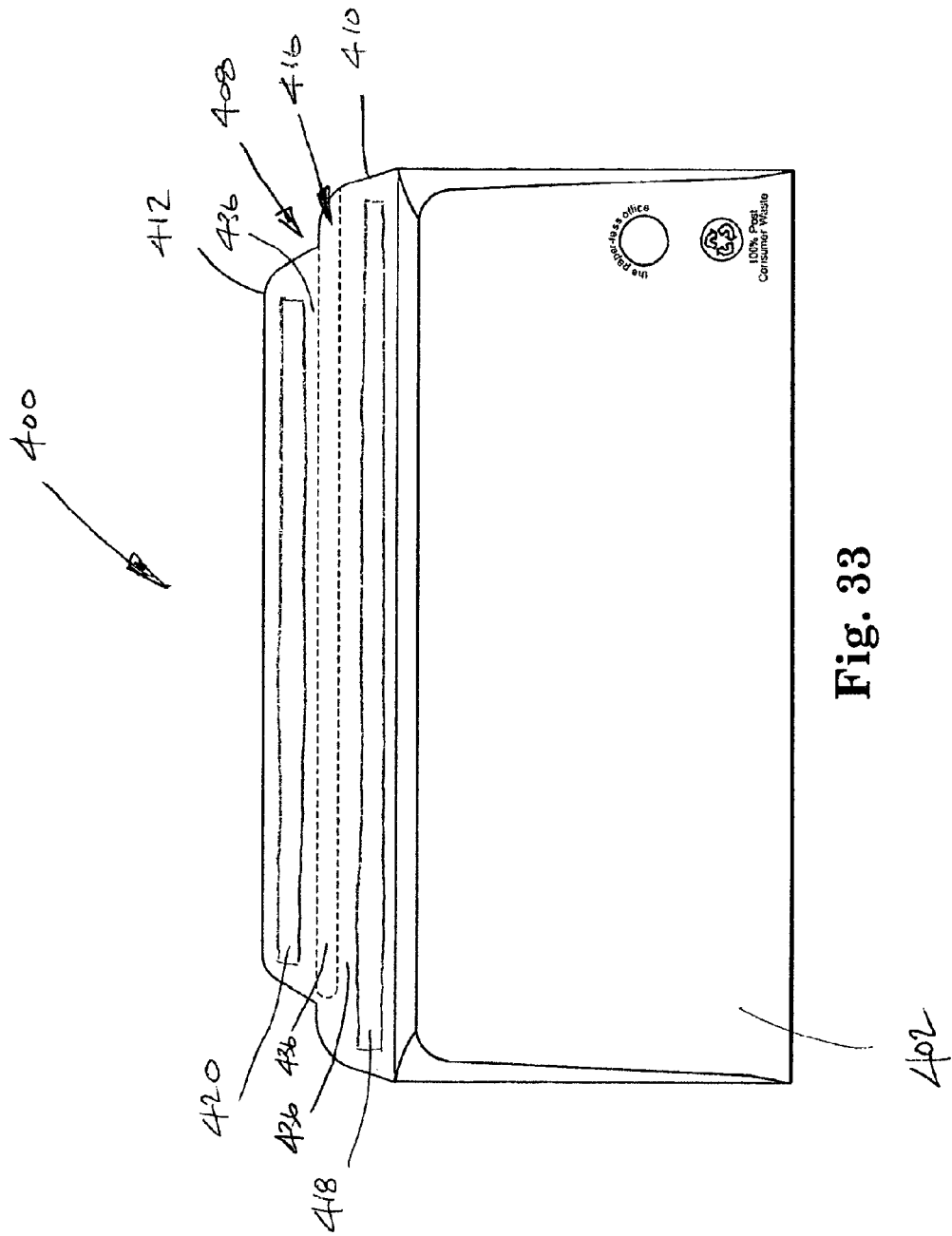
FIG. 33 is a rear view of the reusable envelope of FIG. 30.

Flap 408 preferably includes an adhesive region 418 on inner flap portion 410 that is preferably spaced apart from an adhesive region 420 on outer flap portion 412 as can be seen in FIG. 33. Alternatively, adhesive regions can be operatively positioned on envelope body 402. Moreover, adhesive regions are not required and an adhesive or the like can be provided at the time the envelope is sealed. Thus, in accordance with the invention, outer flap portion 412 can be used to seal envelope 400 a first time, then envelope 406 can be opened by removal of the tear off portion 416, and inner flap portion 410 can be used to reseal envelope 400 for a subsequent use. It is contemplated that the envelope flap structures described with respect to FIGS. 30-45 may be used with any of the envelopes and/or envelope features described above.

In FIG. 31, the flap 408 of envelope 400 of FIG. 30 is shown in greater detail. As illustrated, the left side of the envelope flap 408 of FIG. 30 comprises an opening side 422 for tear off portion 416, which represents the side that is manually grasped for tearing off the tear off portion. However, the opposite side of the envelope flap may be used as the opening side if desired. As can be seen in FIG. 31, outer flap portion 412 is preferably indented with respect to inner flap portion 410. It is noted that outer flap portion 412 can be the same length as inner flap portion 410, if desired. That is, as shown inner flap portion 410 preferably extends generally from one side of envelope body 402 to the other, while outer flap portion 412 is preferably indented or spaced in on each side.

Further referring to FIG. 31, the inner and outer flap portions 410 and 412 are preferably separated by spaced apart perforation lines 424 and 426 that preferably define tear off portion 416. As shown, tear off portion 416 has an end 428 that can be lifted and pulled away to remove tear off portion 416 and thereby open envelope 400 when outermost flap portion 412 is sealed to envelope body 402. Preferably, the end 428 of tear off portion 416 forms a lifting end or tab 430 that comprises a die cut portion that can be easily lifted away from envelope flap 408, such that it can be grasped and pulled to remove tear off portion 416. Also, the left end of tear off portion 416 is preferably spaced apart from the end 434 of envelope flap 408 such that a bridge portion 432 remains between the innermost and outermost flap portions 410 and 412. That is, preferably the innermost and outermost flap portions 410 and 412 remain at least partially connected to each other after tear off portion 416 is removed.

Bridge portion 432 can be used to help protect the end 428 of tear off portion 416 from accidentally becoming caught in mail processing equipment such as inserting and sorting equipment. For example, during processing in certain equipment such as sorting equipment or inserting equipment or the like, loose tabs or flaps or the like can become caught in such equipment. Bridge portion 432 can help to prevent tear off portion 416 from inadvertently being pulled or torn. Thus, bridge portion 432 can advantageously provide reusable envelope structures having tear off portions or tear strips that are compatible with automated mail processing and handling equipment.

As illustrated, the end 428 of tear off portion 416 can be spaced apart from the end 434 of envelope flap 408 by about 1/64 of an inch to about 1 inch, and more preferably about 1/16 of an inch to about 1/4 of an inch. In one preferred embodiment, the end 428 of tear off portion 416 is spaced apart from end 434 of flap 408 by about 1/8 of an inch. In any case, the end 428 of tear off portion 416 can be spaced apart from the end 434 of envelope flap 408 at any desired amount and is preferably spaced apart from the end of the envelope in order to maintain at least some connection between the innermost and outermost flap portions 410 and 412 even after tear off portion 416 is removed. Most desirably, this spacing between end 428 and end 434 is sufficient to maintain the integrity of bridge 432 for a given weight and intrinsic characteristic of envelope even when handled roughly during processing with automated sorting and handling equipment. As noted above, bridge 432 thereby helps to shield tear off portion 416 from accidental snags or removal, and also helps to maintain envelope 400 closed and intact through processing and delivery. As yet one more added benefit, bridge 432 additionally serves as an anchor, better facilitating the lifting and removal of tear off portion 416 along perforation lines 424, 426.

Preferably, the curved outer edge of flap 410 that transitions through the discontinuity adjacent bridge 432 will extend or generally wrap around tear off portion 416. While not limiting the present invention to a particular theory, for better understanding of design parameters as required under the statutes, this curve is designed to form a smooth transition that will help, even when an envelope is slightly creased, overstuffed, or otherwise less than ideally flat, to avoid tear off portion 416 and the remaining flap components from becoming entangled in the mail processing equipment. The curve is preferably designed to guide the envelope more smoothly through such equipment.

Also very desirably, the sharp discontinuity that occurs at the intersection between the outer edges of flap portions 410 and 412 provides a stress concentrator such that, upon removal of tear strip 416, flap 412 will be readily separated from flap 410 through this sharp discontinuity. In other words, appropriate spacing between end 428 and the corner formed at the intersection between flap portions 410 and 412 ensures integrity during mail processing, and the sharp discontinuity facilitates final and complete separation of flap 410 from flap 412 through a controlled and predictable region of envelope 400.

It is contemplated that bridge portion 432 may include another feature for assisting in tearing, breaking, or separating innermost flap portion 410 from outermost flap portion 412. For example, bridge portion 432 may include one or more perforations, die cuts, notches, weakened lines or regions for helping to tear or separate innermost flap portion 410 from outermost flap portion 412. For the purposes of the present disclosure, such feature will be referred to herein as a stress concentrator 433, wherein the function of such feature is to focus or concentrate the stress along a particular region or to provide a weakened region within the envelope, whereby a given stress will lead to focused failure. When sufficient force is applied, the bridge portion 432 will then be severed in a controlled and predictable manner along a region determined by the stress concentrator 433.

Preferably, the stress concentrator 433 will not extend from the edge of the envelope all the way to tear off portion 416, or, in an alternative, remain active during mail transit. In other words, the point of discontinuity between the edge of flap portion 410 and flap portion 412 is preferably most active as a stress concentrator after tear off portion 416 has been removed and flap portion 410 is lifted away from flap portion 412. At that moment, the narrowest portion of bridge 432 is not only the weakest, but the discontinuity tends to magnify stresses within the paper immediately adjacent to the discontinuity. Therefore, preferably when other techniques are used, such as perforations, die cuts, flaws in the paper that weaken it, specially designed water marks or treatments, or any other technique that will create localized weakness or stress concentration within the paper, such stress concentrators 433 will preferably not extend all the way to the envelope exterior edge. The stress concentrator 433 will instead preferably radiate from the tear off portion 416 or perforations 424, 426 only partially toward the edges of flap portions 410, 412.

In FIG. 32, flap 408 of envelope 400 of FIG. 30 is shown in greater detail. As shown, the perforation lines 424 and 426 that define the tear off portion 416 preferably extend to the end of the envelope flap such that tear off portion 416 can be used to separate the inner and outer flap portions 410 and 412, as described more in detail below. Alternatively, perforation lines 424 and 426 that define tear off portion 416 do not have to extend to the end of the envelope flap 408 and may define a bridge portion as described above. That is, a bridge portion between the innermost and outermost flap portions 410 and 412 can be used on either side or both sides of the envelope flap 408. Preferably perforation lines 424 and 426 extend linearly across flap 408 but may deviate from a linear line if desired. For example, one or both perforations can follow a curved or angular path in order to optimize a tear path for opening envelope 400. Where a bridge is provided on both sides of the envelope, the envelope will be resistant to snags regardless of the direction of orientation or travel through mail handling equipment.

In FIG. 33, a rear view of envelope 400 of FIG. 30 is shown. In FIG. 34, a rear view of the opening side of flap 408 is shown and in FIG. 35 a rear view of the opposite side of envelope flap 408 is shown. As shown, envelope flap 408 is in an open position and envelope 400 is ready to receive contents to be mailed. Also, as shown the inner and outer flap portions 410 and 412 preferably include adhesive regions 418 and 420 that can be used to seal envelope 400. Preferably, the adhesive regions 418 and 420 are spaced apart from each other to provide a non-adhesive region 436 between them but they do not need to be spaced apart. Also preferably, the double perforation lines 424 and 426 that define tear off portion 416 are positioned substantially, and more preferably entirely, in non-adhesive region 436. As such, the adhesive on outer flap portion 412 can be used to seal envelope 400 a first time and tear off portion 416 can then be used to open envelope 400. Therefore, it is desirable for tear off portion 416 to be substantially free of adhesive so that tear off portion 416 can be pulled away and the inner and outer flap portions 410 and 412 can be separated from each other.

Figure 36A:
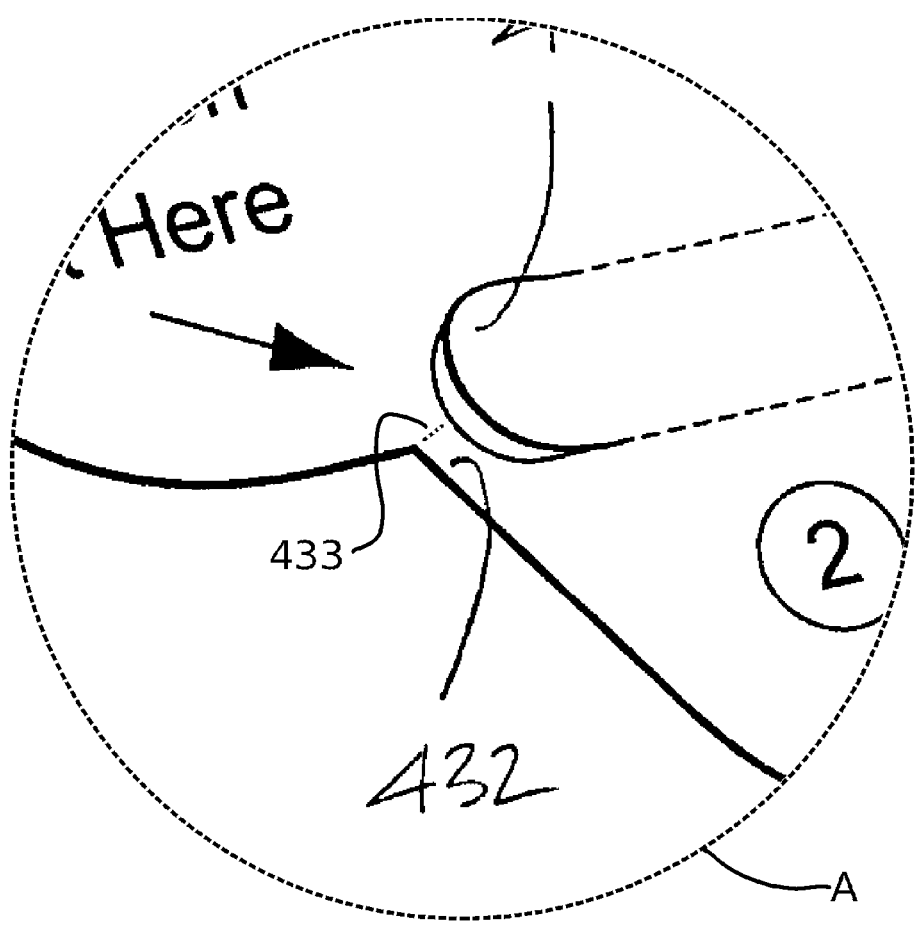
FIG. 36A is an enlarged rear view of the reusable envelope of FIG. 36, taken from the region defined by section line A in FIG. 36.

In FIG. 36, the opening side 422 of envelope flap 408 is shown with outer flap portion 412 sealed to envelope body 402 by adhesive region 420 of outer flap portion 412. That is, envelope 400 is shown sealed for a first use. In FIG. 37, the opposite side of envelope flap 408 is shown with outer flap portion 412 sealed to envelope body 402.

In use, envelope 400 can be sealed with outer flap portion 412 and mailed to a desired recipient. Envelope 400 can then be opened by removing tear off portion 416. Referring to FIG. 36, the opening end 428 of tear off portion 416 can be separated from envelope flap 408 so that a tab is available to be grasped and pulled. The end 428 of tear off portion 416 can be grasped by slightly bending envelope 400 so that end 428 of tear off portion 416 extends away from envelope flap 408, for example. Preferably, as shown, the opening end 428 of tear off portion 416 comprises a die cut rounded end. However, end 428 may be square, triangular, pointed, etc.

Figure 39:
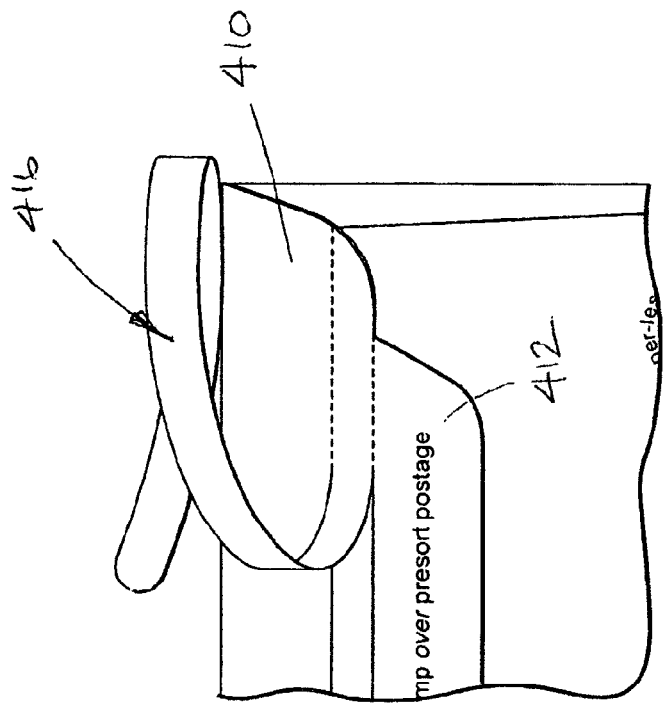
FIG. 39 is a rear view of the envelope of FIG. 38 showing the tear off portion further removed.
Figure 38:
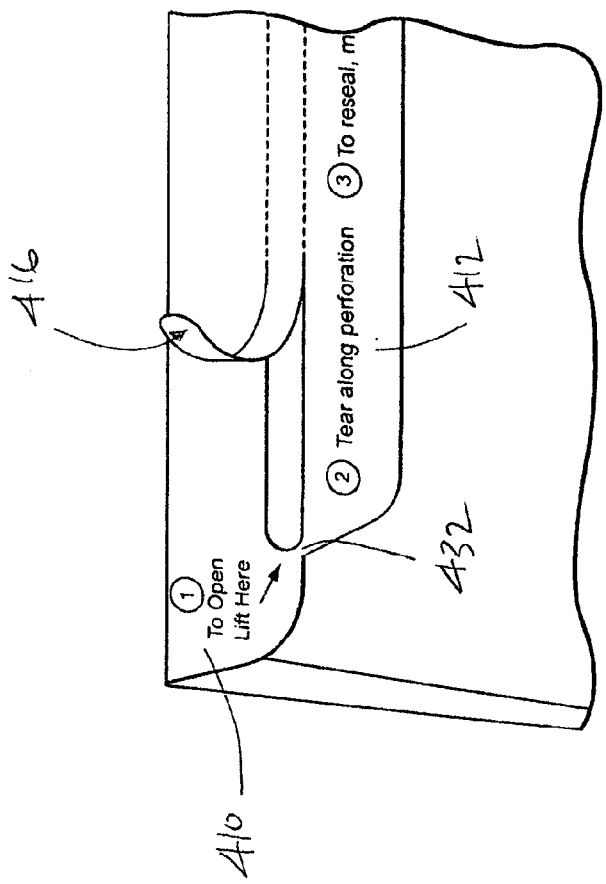
FIG. 38 is a rear view of a reusable envelope of the present invention that has been sealed by an outer flap portion for a first use of the envelope and showing in particular a tear off portion that is partially removed for opening the envelope.
Figure 41:
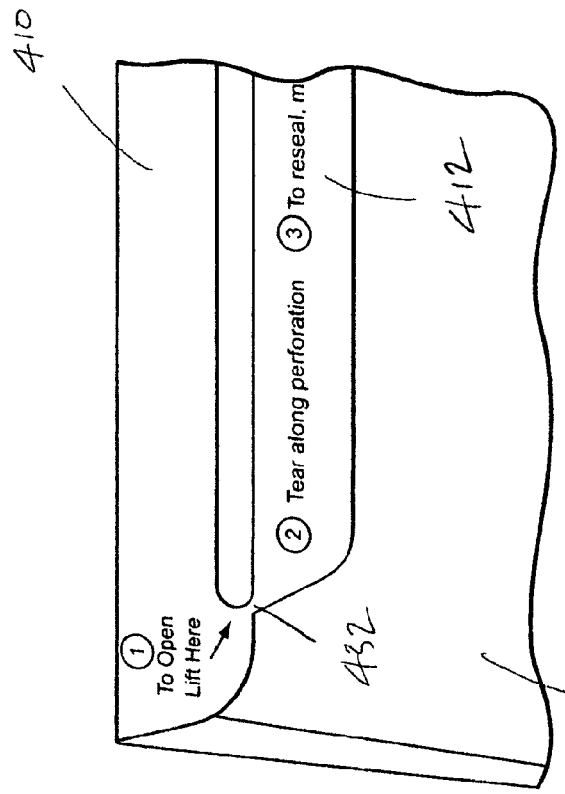
FIG. 41 is another rear view of the envelope of FIG. 38 after the tear off portion has been removed.
Figure 40:
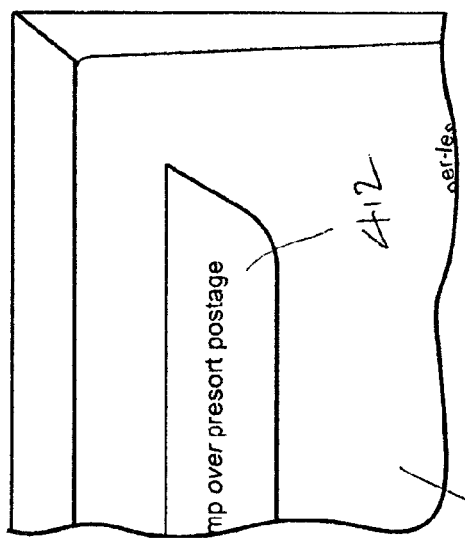
FIG. 40 is a rear view of the envelope of FIG. 38 after the tear off portion has been removed.
Figure 42:
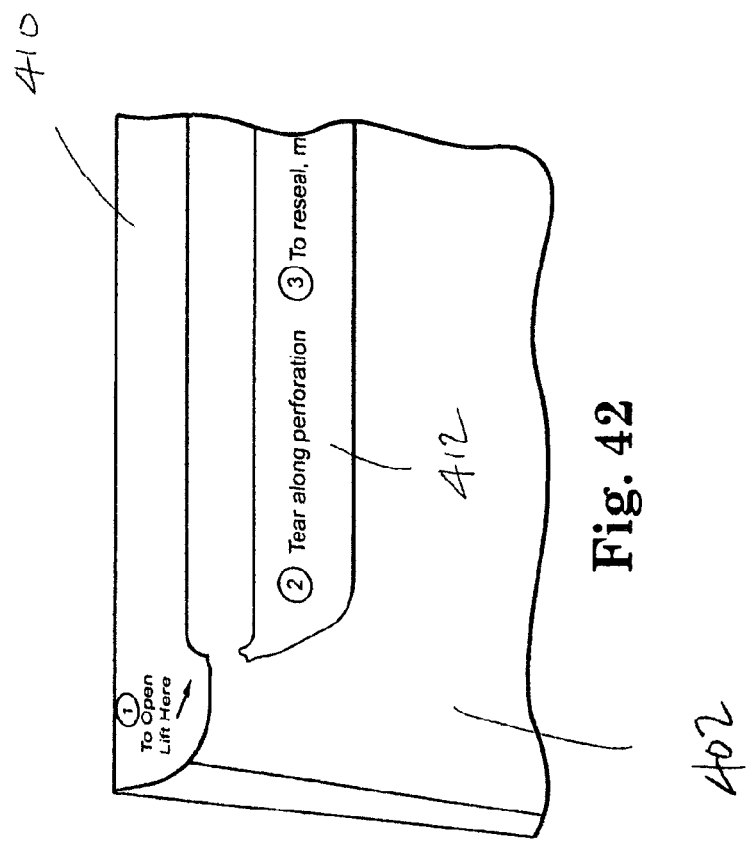
FIG. 42 is a rear view of the envelope of FIG. 38 after the tear off portion has been removed and showing a bridge portion that has been torn in order to separate the outer and inner flap portions of the envelope.

In FIG. 38, envelope 400 is shown sealed with outer flap portion 412 shown with tear off portion 416 partially pulled across envelope flap 408. As shown, bridge portion 432 connects outer flap portion 412 with inner flap portion 410. In FIG. 39, envelope 400 of FIG. 38 is shown where tear off portion 416 has been pulled farther across envelope 400 and is near the opposite end of the flap portion. In FIG. 40, envelope 400 of FIGS. 38 and 39 is shown where tear off portion 416 has been completely removed. As such, outer flap portion 412 remains sealed to envelope body 402 and inner flap portion 410 is free from envelope body 402 as shown in FIG. 40. Referring to FIG. 41, bridge portion 432 still connects the inner and outer flap portions 410 and 412. Thus, in order to open envelope 400 by inner flap portion 412, bridge portion 432 can be torn in order to more completely separate inner flap portion 410 from outer flap portion 412, as is illustrated in FIG. 42.

Figure 43:
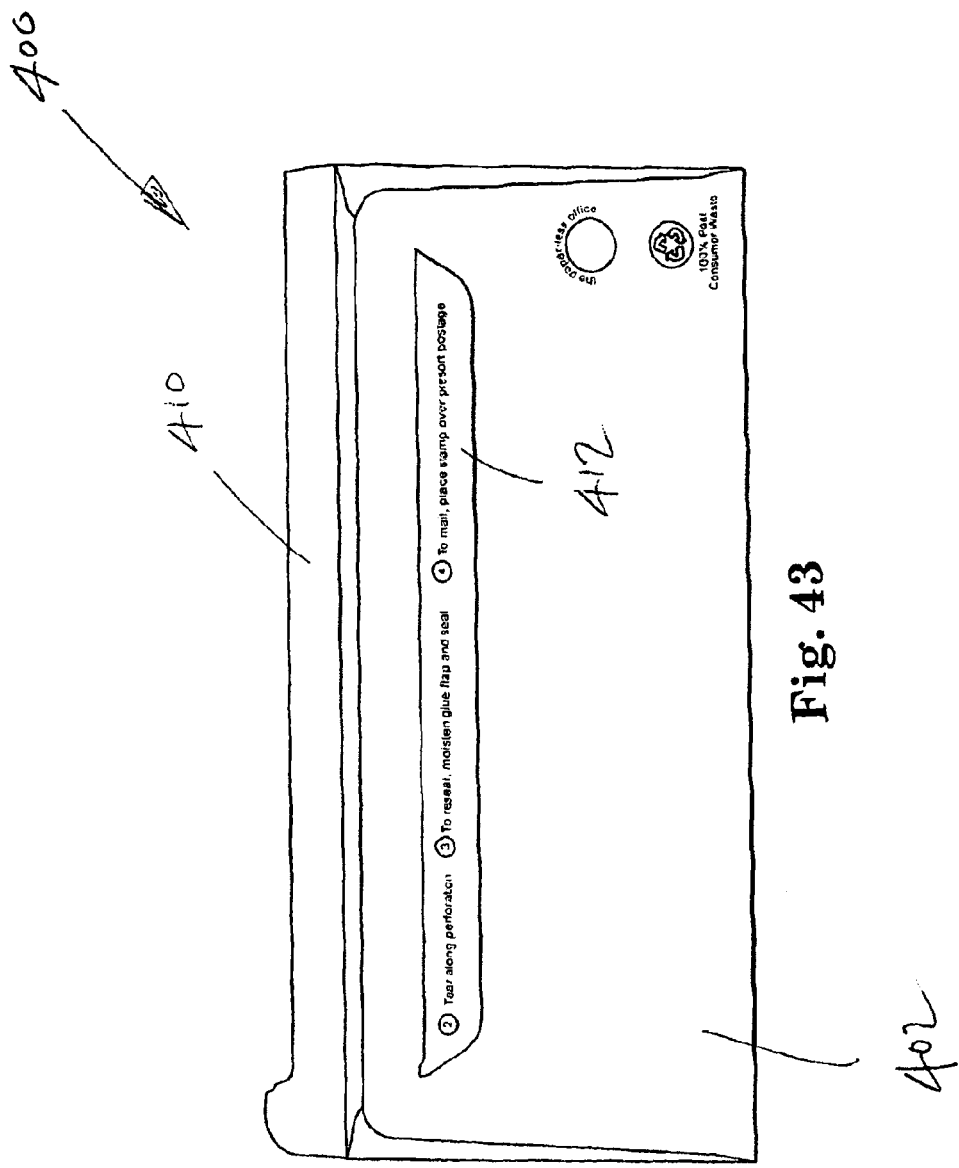
FIG. 43 is a rear view of the envelope of 38 after the tear off portion has been removed and the bridge portion has been torn and showing the inner flap portion in an open position.
Figure 44:
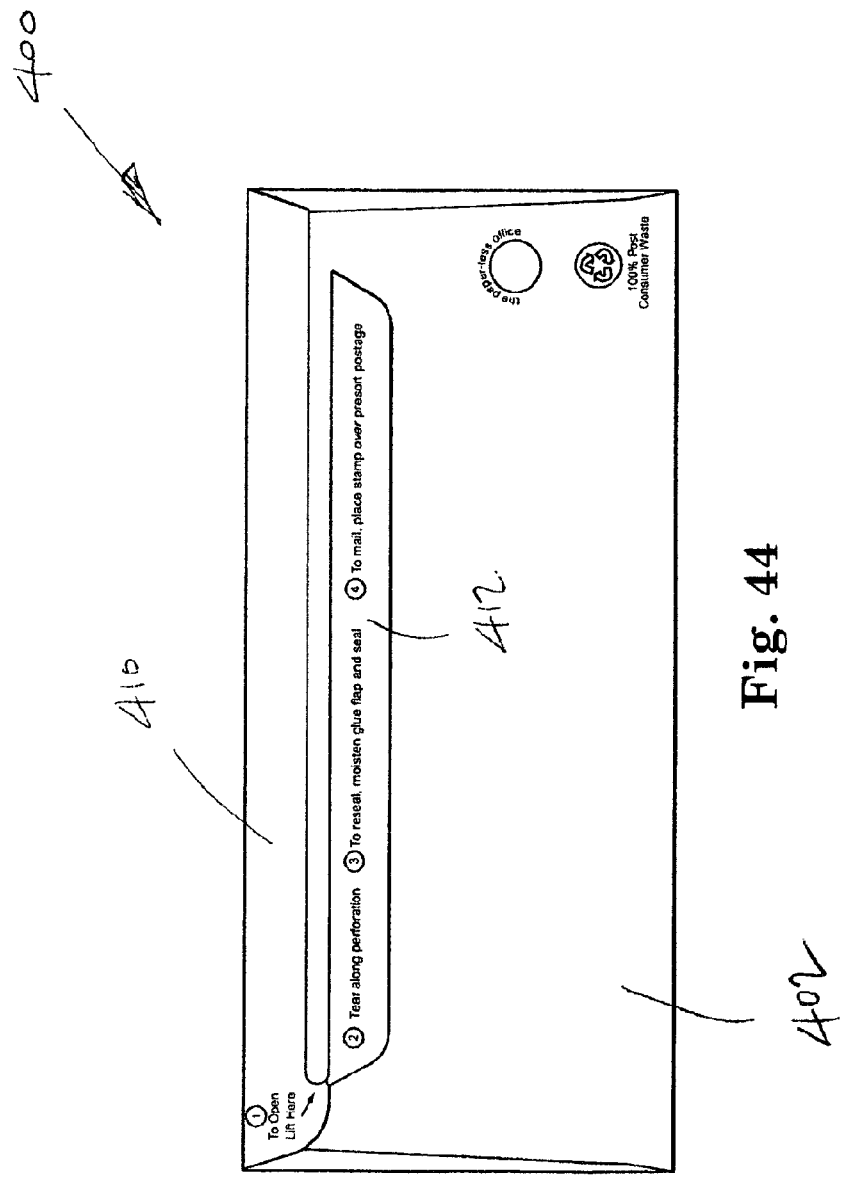
FIG. 44 is a rear view of the envelope of FIG. 43 that has been resealed by the inner flap portion.
Figure 45:
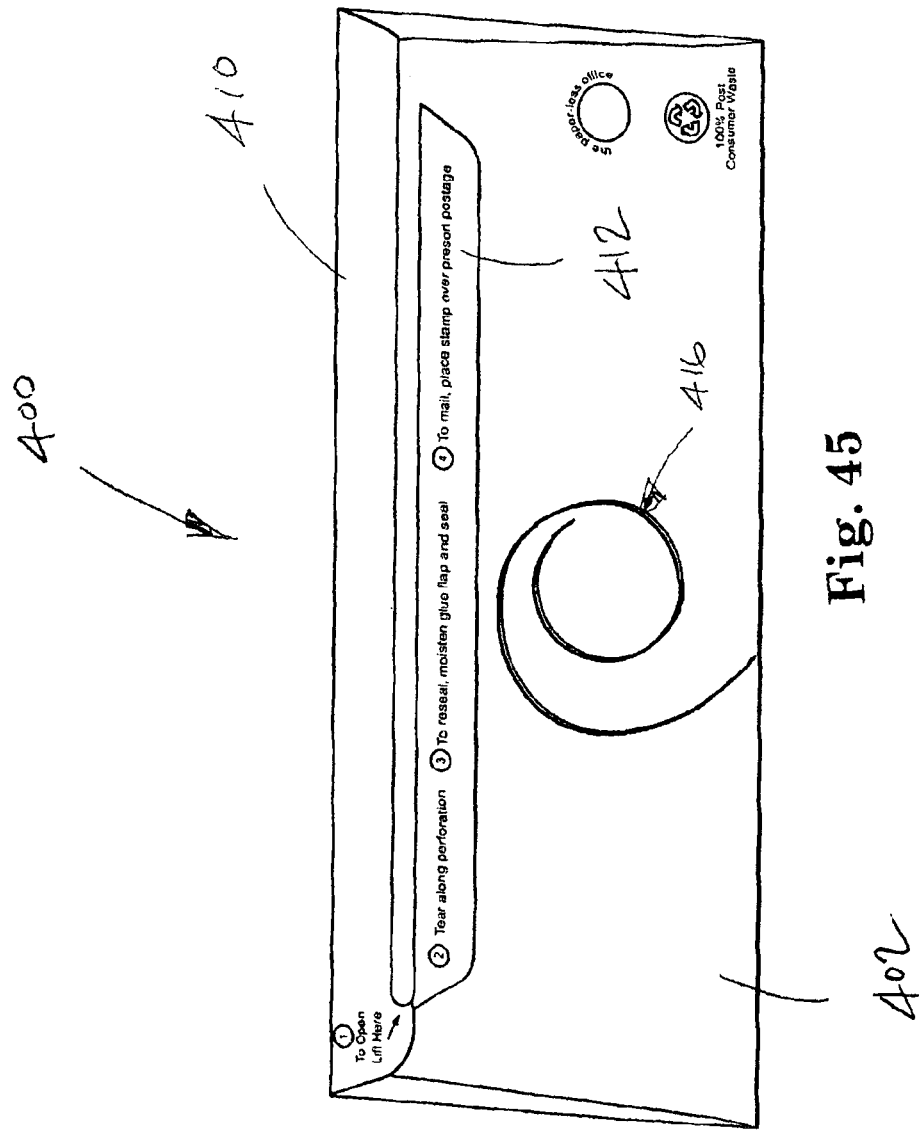
FIG. 45 is a rear view of the envelope of FIG. 44 also showing the tear off portion that has been removed.

In FIG. 43, envelope 400 of FIGS. 38 through 42 is shown after being opened by tear off portion 416. As shown, outer flap portion 412 is sealed to envelope body 402 and inner flap portion 410 is open such that the envelope interior can be accessed. Preferably, inner flap portion 410 includes adhesive that can be used to reseal envelope 400. For example, in FIG. 44, envelope 400 of FIG. 43 is shown with inner flap portion 410 sealed such that envelope 400 can now be used a second time. Also, in FIG. 45, envelope 400 is shown with tear off portion 416 removed to open envelope 400 after a first use.

Now referring to FIG. 46, another exemplary tear off portion 438 that can be used in accordance with the present intention is illustrated. As shown, the tear off portion 438 has an opening end 440 that has a pointed or triangular shape. The tear off portion 438 is preferably defined by spaced apart perforation lines, 442 and 444, that may comprise curved or "hockey stick" shaped perforations as is illustrated. It is contemplated however that any perforation or line of weakness may be used and that the opening end 440 of the tear off portion 438 can have any desired shape.

In FIG. 47, another exemplary structure that can be used as a tear off portion in accordance with the present invention is illustrated. As shown, an envelope flap 446 comprises a tear strip 448 that separates an inner flap portion 450 and outer flap portion 452. As illustrated, the tear strip 448 is shown behind the envelope flap 446 and the dashed lines are hidden lines and do not show perforations. That is, preferably the tear strip 448 is a separate structure that is glued or attach to the envelope flap 446 and may be used to tear the envelope flap 446 without the use of perforations. Preferably, the tear strip 448 has an end 454 that extends out from an end 456 of the envelope flap. As such, the envelope can be sealed by the outer flap portion 452 and reopened by tearing the tear strip 448 away to separate the inner and outer flap portions, 450 and 452, from each other.

In FIG. 48, a portion of an envelope flap 458 that includes inner and outer flap portions, 460 and 462 separated by a tear strip 464, is shown. As illustrated, the envelope flap 458 includes a window 466 that is spaced apart from an edge 468 of the envelope flap 458. Preferably, an end 470 of the tear strip 464 is positioned within the window 466 such that the tear strip 464 can be grasped and pulled away to separate the inner and outer flap portions, 460 and 462, from each other. Accordingly, the window 466 preferably defines a bridge portion 472 between the inner and outer flap portions, 460 and 462, such that after the tear strip 464 is torn away the bridge portion 472 connects the inner and outer flap portions, 460 and 462, and can be torn in order to open the envelope as described above. A bridge portion that has a thickness or width of between about {fraction (1/64)} of an inch and about 1 inch, more preferably between about {fraction (1/32)} of an inch and about 3/8 of an inch may be used, for example.

In FIG. 49, another exemplary reusable envelope flap 474 of the present invention is shown. As illustrated, the envelope flap 474 includes an inner flap portion 476 and an outer flap portion 478 that is separated by a single line of weakness 480. Preferably, the line of weakness 480 comprises alternating perforations 482 and open portions 484 such as the oval shaped openings that are illustrated. Such a flap 474 can be used to seal an envelope a first time with the outer flap portion 478 and then open the envelope by separating the inner flap portion 476 from the outer flap portion 478 along the line of weakness 480.

In FIG. 50, another exemplary reusable envelope flap 486 of the present invention is shown. As illustrated, the envelope flap 486 includes an inner flap portion 488 and an outer flap portion 490 that is separated by a perforation or line of weakness 500 or the like. Preferably, the outer flap portion 490 is sealed to the envelope body with a releasable adhesive 501 so that the entire outer flap portion 490 can be torn away from the inner flap portion 488 along the perforation 500.

In FIG. 51, another exemplary reusable envelope flap 502 of the present invention is shown. As illustrated, the envelope flap 502 includes an inner flap portion 504 and an outer flap portion 506 that is separated by a perforation or line of weakness 508. Preferably, the inner and outer flap portion has a self adhesive. The adhesive is preferably a repulpable adhesive so as to not interfere with the recycling of the envelope, but can be any suitable adhesive that will securely seal the envelope first with the outer flap portion 506 and second with the inner flap portion 504. Preferably, covering the adhesive is a release liner suitable for covering self adhesive strips. The release liner is removed on the outer flap on the initial mailing and removed on the second inner flap on the second mailing. The release liner is preferably made from a recyclable material, but any material that functions as a barrier for self adhesive strips can be used in accordance with the invention.

Figure 52:
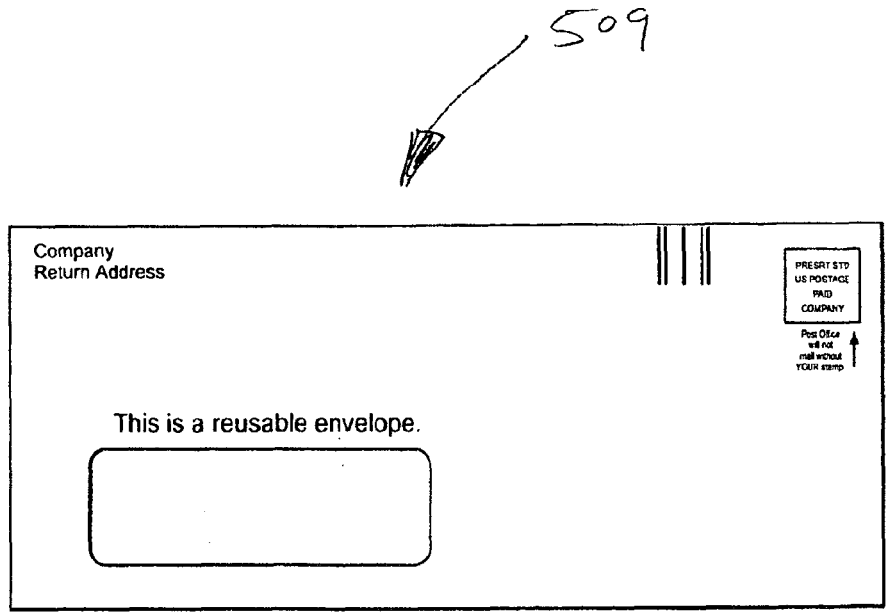
FIG. 52 is a front view of an envelope of the invention showing return address, address window, the words "This is a reusable envelope" above the window, FIMA, Permit Imprint Indicia, and the words "Post Office will not mail without your stamp" and an arrow pointing to the indicia. Through the window is a POSTNET barcode address intended for a customer. This illustrates how the envelope can look when it is sent originally.

The front face of an envelope 509 in accordance with the present invention is shown in FIG. 52. As shown, the envelope in FIG. 52 comprises a front panel, side and back panels and a seal flap (not visible) which are capable of forming an envelope structure having a body and a closure flap such as the closure flap described above with respect to FIGS. 30-45.

Figure 53:
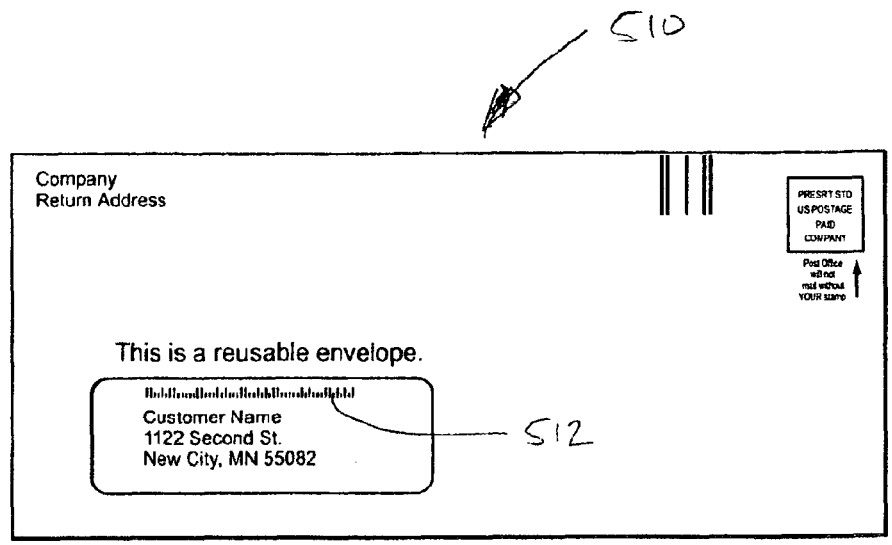
FIG. 53 is a front view of the envelope of FIG. 52 with POSTNET barcode address to a business visible through the window.

In FIG. 53, another envelope 510 in accordance with the present invention is shown wherein the address window, the return address, and the Permit Imprint Indicia are preferably standard Post Office approved features of sending a standard bulk presorted mail using a standard Permit Imprint Indicia to pay for postage. The FIM A, on outgoing presorted bulk mail, was allowed by the US Post Office in May 2002 (see Revision C010.6.5 of the Direct Mail Manual). This permits a Facing Identification Mark (FIM) A, used with Courtesy Reply Mail, to be on outgoing presorted bulk mailings. Because standard or First Class presort bulk mailings using the Permit Imprint Indicia do not pass through facer-canceller operations when sent out, the presence of a FIM A has no relevance until postage is affixed and the mailpiece is remailed.

Still referring to FIG. 53, shown through the window is a POSTNET delivery point barcode 512 in the address block of the contents of the envelope 510. In one preferred embodiment of the invention, the POSTNET barcode is preferably used to help ensure accurate delivery of a reusable envelope on its first use. Preferably, the POSTNET barcode is marked on the contents or correspondence to be sent. The correspondence is preferably placed in a reusable envelope, such as the reusable envelopes described herein, so that the POSTNET barcode is viewable through a window or the like of the envelope such as an address window. In this manner, the POSTNET barcode can help to ensure that the contents are accurately delivered to the second address.

The POSTNET (POSTal Numeric Encoding Technique) barcode was developed by the Postal Service to encode ZIP Code information on letter mail for rapid and reliable sorting by a barcode sorter (BCS). The POSTNET barcode can represent a five-digit ZIP code (32 bars), nine-digit ZIP+4 code (52 bars), or an eleven-digit delivery point code (62 bars). The delivery point (formed by the last 10 bars) represents two additional digits normally the last two digits of the street address, post office box, rural route, or highway contract route number.

The delivery point barcode was developed by the Postal Service to identify each of the 134 million delivery points in the United States. The POSTNET delivery point barcode (referred to as just POSTNET) system significantly reduces the time it takes carriers to sort letter mail before delivery.

The post office uses two methods of operations to process mail: manual and automated. Manual requires the address be read and sorted manually while automated requires the mail be fed into and removed from a machine that both reads and sorts. There are two types of automated systems: multiline optical character readers (MLOCR) and barcode sorters (BCS). A MLOCR scans the address block on each letter size mailpiece to determine the ZIP+4 code and the delivery point information. The MLOCR then converts this information to a POSTNET barcode. The MLOCR then prints the barcode on the envelope and performs the initial sorting.

A barcode sorter (BCS) "reads" POSTNET barcodes on letter-size pieces and sorts the mail accordingly. This machine does not read addresses, so it will missort a piece if an incorrect barcode is present. If a POSTNET barcode was not part of the address block showing through the window in accordance with the invention, the MLOCR would read the address and print a POSTNET barcode on the envelope in the barcode clear zone located at the bottom right of the envelope.

In other words, having the POSTNET barcode provided on the envelope (such as by printing, for example) is generally not preferred on a reusable envelope. If there is no barcode on the envelope when it arrives at the post office, the letter will go through the MLOCR and print a POSTNET barcode for delivery on the envelope so the BCS can sort the mail. The barcode will typically be printed on the lower right side of the envelope in the barcode clear zone. When a reusable envelope is sent the second time with a new address, if the barcode is printed on the reusable envelope, the mailpiece will skip the MLOCR and go directly to the original BCS. Although there is a new address, the BCS will only read the old barcode that was printed on the envelope. In this situation the POSTNET barcode printed on the envelope corresponds to the address of the original mailing, not the address of the second mailing. Thus, the BCS will read the original barcode from the original address and sort the mail to go to the original location not to the new address because the POSTNET barcode printed on the envelope was created using the original address.

As an example, if a mailing and billing entity such as a utility company did not have a POSTNET barcode with the customer's address on the statement and viewable through a window of the envelope, the address would be read by the MLOCR and a POSTNET barcode would be printed on the envelop to enable the BCS to sort the mail. This would be acceptable for the delivery but if the same envelope were used to send payment back to the utility company with the company's address now in the window (for example the statement from the utility company could be put back in the envelope so the utility company's address was visible through a window), the company's address would not be read and assigned a POSTNET barcode, only the barcode which was printed on the envelope corresponding to the customer's address would be read. Having the POSTNET appear with the address block of the contents of the envelope can eliminate having the mailpiece to go through the MLOCR, which would print a POSTNET barcode on the envelope thus preventing the envelope from being effectively reused. Having a POSTNET barcode that is preprinted for the address in the address block will be read by the BCS then sorted for the correct address location. The POSTNET barcode in the address block will therefore be the correct barcode for that address. Therefore, having the POSTNET barcode preprinted with the address can help guarantee correct delivery when resent. Having the POSTNET barcode in the address block and not printed on the envelope can eliminate the need to print a POSTNET barcode on the envelope thereby preventing the mail being sorted to the wrong location. Alternate methods to obscure the first printed POSTNET barcode are possible but are generally less preferable options for using the envelope. With a POSTNET barcode with the address, the whole MLOCR process can be skipped and the mailpiece can go directly to the BCS for sorting. This can save time and labor costs for the post office. This savings can then be passed on in the form of rate discounts and faster delivery of the mail. Preferably, in accordance with the invention, a POSTNET barcode address is used that is preferably printed or otherwise provided on the contents and shows through the window of a reusable envelope of the present invention.

With a POSTNET barcode in the address block of the contents of the envelope, no barcode needs to be printed on the envelope itself. For the purpose of using the reusable envelope of invention, having a barcode printed on the envelope could prevent the post office from delivering the mail back to the sender (such as the utility company described above) because the barcode could contain the customers ZIP+4 code and would be sorted to go back to the customer instead of to the utility company, for example. Additional benefits of providing a barcode in the address block that can show through a window before it arrives at the Post Office allows for automation-compatible rate discounts. Thus a POSTNET barcode in the address block of the contents may be desirable by both the post office and most businesses that send letter-size mail.

To further explain a method for repostaging reusable envelopes, such as those of the invention, FIG. 53 shows how the reusable envelope 510 could be originally delivered (a first use of the reusable envelope). A customer could receive the envelope 510 from a billing and mailing entity such as a utility company with a statement inside, e.g., a bill or invoice or the like. The customer's address would preferably appear in the window and the utility company's address would preferably be in the return address area (because they are provided on the contents and show through the windows). A FIM A and a Permit Imprint Indicia for postage would also preferably be printed on the envelope 510 itself. Upon receiving the contents (such as a bill, for example), the customer would open the envelope, take out the contents, review the statement, pay the bill at that time or wait until the bill was due and make the payment then. Typical in bill paying, a portion of the statement is detached from the body of the statement to return with payment. (Not shown) This portion generally contains the amount of the payment, the due date, specifics about a customer's bill and the company's address. Other information may also be on this return portion including a change of address, remittance coding, etc.

Often with billing statements the customer must put the return portion into a windowed courtesy reply envelope with the company's POSTNET barcode address block 514 showing through the window of the envelope 510. The company's POSTNET barcode address shows through the window for correct delivery back to the originator, such as a utility company, for example. FIG. 53 shows a barcode address block through the window. In accordance with the invention, generally the same method can be used to return a statement with payment using the envelopes of this invention. However, the difference is instead of putting the statement into a separate Courtesy Reply envelope, the customer can send the payment in the original envelope the bill was sent in, thus eliminating the need for a separate Courtesy Reply envelope.

For postage, the Courtesy Reply envelope that is generally included in a two-envelope mailing requires a stamp be placed on the envelope or the post office will not deliver the envelope. Generally there is a small box with the words, "Post office will not deliver without stamp," or "Place stamp here." The same method can be used with the reusable envelopes of this invention. For postage of the reusable envelope of the invention the customer places a stamp over the Permit Imprint Indicia. As long as the stamp covers the Permit Imprint Indicia, the post office will deliver the mailpiece because no evidence of prior postage will be visible. In other words, to pay for postage to send the statement with payment in accordance with the invention, the customer can use the same method as paying postage for a courtesy reply envelope by placing a stamp on the envelope. Instead of placing the stamp over the box that says place "Stamp here" the customer can put the stamp over the box that says "Standard Presort US Postage Paid, Permit No. 711." When received at the post office with the FIM A the envelope will be handled as a Courtesy Reply Envelope like other Courtesy Reply Mail. By using an envelope of the invention with a FIM A and Permit Imprint Indicia that can be covered by a postage stamp, companies can save money by eliminating the need for a Courtesy Reply envelope. Moreover, using this method to add postage to send the envelopes of the invention a second time meets all the requirements of the USPS and can save companies money by eliminating the additional envelope. In addition, less paper will be consumed, reducing the amount of pollution caused by making paper, and less waste will end up in our landfills.

The invention can also be used with meter mail. Meter mail included any mail class (except Periodicals) with postage printed by a USPS-approved postage meter. Postage Meters include postage printing machines or systems for your home, office or when envelopes are inserted at mailhouses. Meters typically print postage directly onto your mailpiece or onto an approved label, which you affix to your mailpiece. The flexibility provided for small batches of mailings or daily office mailings make postage meters convenient and popular to use. In addition, metered postage is often used for bulk mailings such as bill paying and direct mail mailings.

Regarding envelopes of the present invention, the typical meter indicia is too big to cover with a stamp to send the envelope again as described above with the Permit Imprint Indicia. However, postage meter indicia can be advantageously designed in accordance with the present invention to be a smaller size to allow an average sized stamp to cover the postage meter. That is, indicia can be printed on the envelope that includes the required meter information but is small enough to be covered by an average size stamp. Accordingly, the present invention provides a method of covering a postage meter printed on the envelope with a postage stamp thereby solving the problem of how to add postage to metered mail using reusable envelopes and meeting the requirements of the US Post Office.

Figure 54:
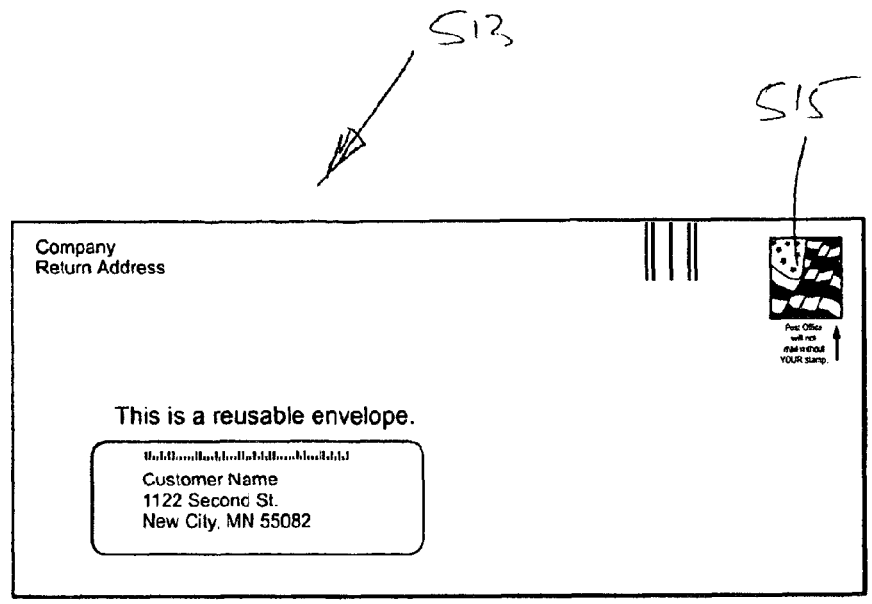
FIG. 54 is a front view of the envelope of FIG. 53, with a First Class postage stamp over the Permit Imprint Indicia. This illustrates a preferred method of repostaging the envelope to send the reply.
Figure 55:
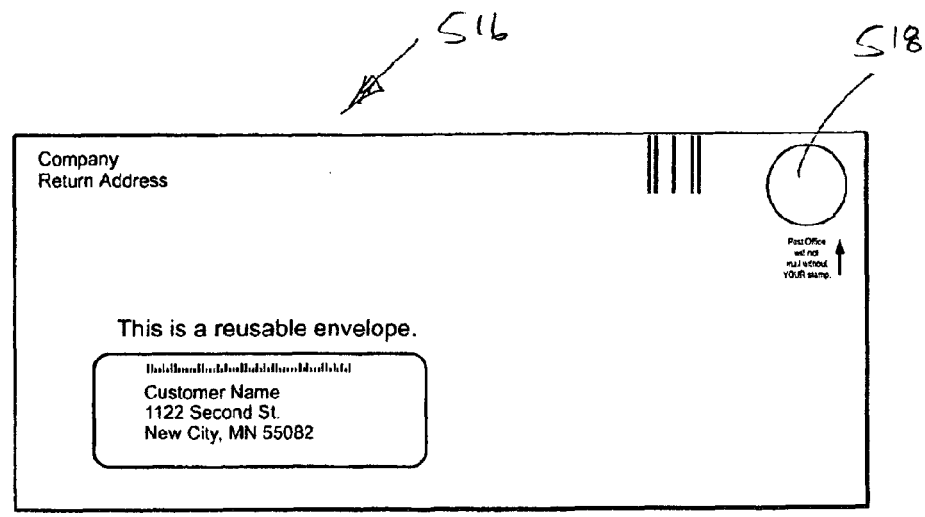
FIG. 55 is a front view of the envelope of FIG. 52, with a postage meter in a one inch diameter circle. The postage meter contains the amount of postage, the date, the meter number, the city and state and the words US Postage.

In FIG. 54 an envelope 513 with a stamp 551 is shown and in FIG. 55 a view of an envelope 516 of the invention is shown having a round postage meter indicia 518 instead of a Permit Imprint Indicia for postage. In this illustration the mail is being sent to a customer indicated by the POSTNET barcode address seen through the window, from a business as indicated by the return address.

Figure 56:
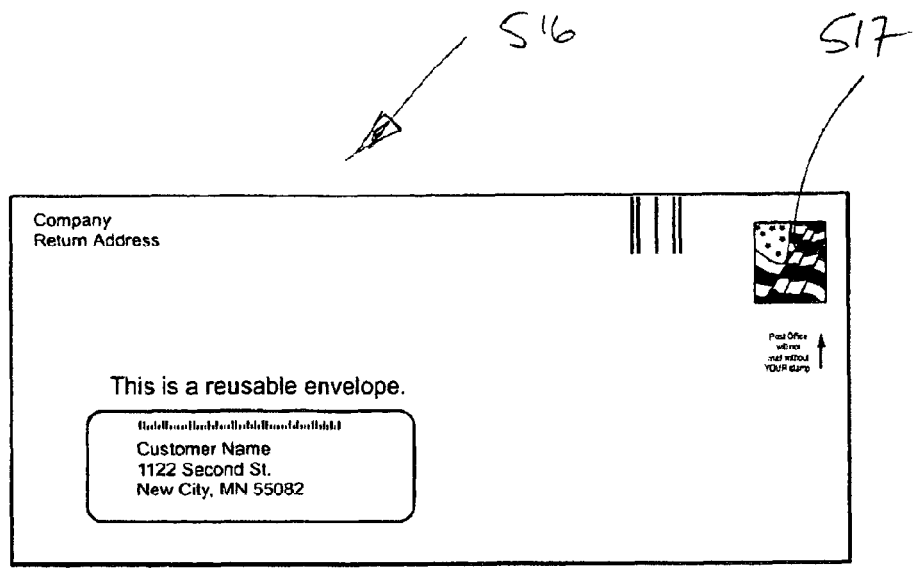
FIG. 56 is a front view of the envelope of FIG. 54, with a First Class postage stamp over the Postage Meter Circle. This is how the envelope can look with a postage stamp over the meter to pay for postage when the envelope is returned.

Preferably, as shown in FIG. 55, meter indicia 518 can be used instead of the Permit Imprint Indicia for bulk or Presorted First Class mail. For meter postage printed on an envelope the USPS for standard bulk mailings requires the indicia to include the postage amount, meter number, city and state of the post office where the permit is held, and rate marking. For First Class single piece and presort, the meter must show the date. To fulfill the requirements of the USPS for Presorted First Class mailings using metered postage, the Postage amount, the meter number, the date, city and state, and rate marking are enclosed in a circle. For purpose of illustration, a circle is used to carry over a recognizable element from standard meter postage. The shape is not limited to a circle, and can be a square, or any other shape that can accommodate the required information. To use this unique meter indicia 518 on the envelopes of the invention or other reusable envelopes it is preferred that the size be such that an average size postage stamp will cover the meter indicia 518. It is noted that methods to obscure conventional size indicia with tape or other obscuring or covering indicia in other ways is possible may not be commercially viable for large mailings. These methods for repostaging are usually discouraged by the post office and may interfere with proper reading of the FIM or ability to cancel postage properly. In FIG. 56 a postage stamp 517 is used to cover the meter indicia 518 to allow the postage for the envelope 516 to be mailed a second time.

Methods to protect the meter indicia 518 from fraudulent use can be incorporated by using a combination of phosphorescent and fluorescents inks that cannot be replicated via home based printer inks as known in the art. Other Information Based Indicia (IBI) information can be incorporated with invisible encrypted codes, or unique identifier tags, or visible or invisible marks that indicate postage evidence are methods that can be used to help eliminate postage from being counterfeited. For example, printing both visible and invisible marks can be used to signal the postage evidenced in postage indicia. The combination of the visible and invisible printed information makes it harder for the indicia to be copied. In addition, the visible and invisible marks can comprise Information Based Indicia (IBI), using for example a two dimensional bar code that allows the sender to incorporate security and mail processing information into the postage indicia. Additional methods to prevent copying postage can be incorporated in the meter indicia, in the printed area of the indicia or in an area in the vicinity of the indicia.

Figure 57:
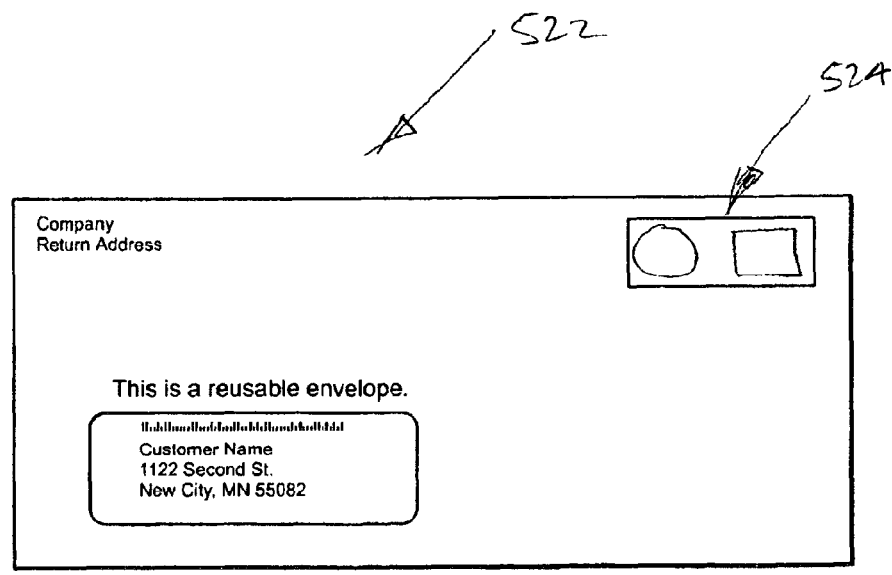
FIG. 57 is a front view of another envelope of the present invention with no FIMA and the postage meter has double the amount for First Class Postage and the words "2 WAY STAMPPAID" included with the meter on the bottom. This illustration shows how a 2 WAY STAMPPAID meter for First Class mail can look for sending the envelope a first time.

Yet another embodiment of how to use meter postage on the envelopes of the invention for send and reply is shown in FIG. 57. An envelope 522 comprising elements for sending the envelope 522 as automated First Class metered mail is shown. A unique 2 WAY POSTAGE meter indicia 524 preferably includes the requirements of a typical First Class meter indicia as required by the Post Office. What is different in the 2 WAY POSTAGE meter indicia 524, is the amount of the postage for sending the envelope 522 with First Class postage (37 cents, for example) and for returning the envelope 522 with First Class postage (an additional 37 cents, for example) can be prepaid as indicated in the postage amount 0.74. It is contemplated that any number of trips can be prepaid in accordance with the present invention. That is, the postage can be prepaid for sending the envelope 522 two times instead of paying postage to send one envelope one time. The amount for sending the envelope 522 is human readable in the indicia 524. To help identify that the postage is prepaid for two deliveries, the words "2 WAY POSTAGE" can be printed with the meter indicia 524. Other non-visible methods to identify the postage as prepaid for two mailings may be included.

USPS approved postage meters can provide different rate meter indicia. For example there is a First Class Mails, Priority Mail®, Express Mail®, Packaged Services, International Mail, and Presorted First-Class Mail Services. When using an envelope of the invention a rating can be established for permitting postage on one meter indicia to prepay for plural trips. A new rating can be established for reusable envelopes, if desired. That is, the amount to send the envelope two times is added together to determine the postage amount printed on the meter. Combinations of ratings can be introduced for bulk mailing when originating the mailing and sending a reply. For example if a mailing qualifies for Presorted First Class mail using a meter indicia, the rate for presorted mail, could be for example, 25 cents. For sending the envelope as a reply, the mailing would cost the First Class Mail rate 37 cents, making the total amount for the mailing 62 cents. In addition, without the need for the second envelope, either the overall weight of the package could be reduced possibly saving additional postage dollars, and/or an additional item can be included in the mailing for revenue generation.

Figure 58:
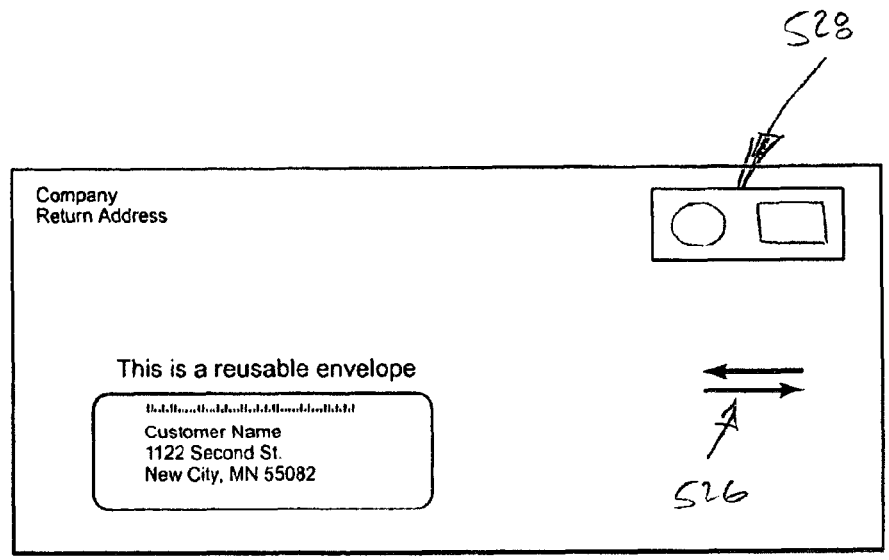
FIG. 58 is a front view of the envelope of FIG. 57, with the addition of a set of horizontal arrows positioned below the 2 WAY STAMPPAID meter. One arrow points to the left and the other arrow points to the right. Arrow are symbolic of 2 WAY STAMP of the invention.

FIG. 58 shows a symbol 526 having two horizontal arrows pointing in opposite directions located below the meter indicia 528. This symbol 526 can be used as a visual identifier for postal personnel that the envelope is a reusable envelope with prepaid postage for delivering the mail two times. Any symbol can be used that is approved by the USPS however.

Like Courtesy Reply Mail (CRM), Business Reply Mail (BRM) is sent in a carrier envelope commonly containing printed material. Business Reply Mail envelopes are similar to the Courtesy Reply Mail envelopes in that they are included in mailings for the customer to send a reply. The difference between the Courtesy Reply envelope and the Business Reply Envelope is the Business Reply Envelope comes with prepaid postage whereas the Courtesy Reply requires the customer to place a stamp on the envelope for delivery.

BRM gives the customer a little extra inducement to reply by paying the postage and pre addressing the return envelope Millions and millions of pieces of mail used for direct mail marketing are sent every day using a carrier envelope with a BRM envelope included.

Using envelopes and methods of the invention with the 2 WAY MAIL indicia can help reduce the paper waste of two envelopes without reducing the response ratings of direct mail campaigns. In addition companies can save costs by not needing a second envelope for reply and all the associated costs with providing a second envelope, such as storing, inserting, and labor costs. By using the envelopes of the invention response could increase in certain markets. For example, environmental organizations whose mission is to save natural resources might find a higher response to their mailings if they mailed a reusable envelope showing their commitment to reduce cutting our forests to make paper. Another example would be waste removal companies who send out bills. What better way for a waste removal company to support waste reduction than by sending a reusable envelope that helps reduce waste. In addition, the amount of mail sent through the Post Office is not lessened, or slowed, or delayed using the reusable envelopes of the invention eliminating the fear of responses to direct mail campaigns getting lost or delayed. Eliminating a second envelope for sending a reply will save companies financial resources also.

The US Post Office requires 6 basic design elements on BRM as described in the Publication 25, Designing Letter and Reply Mail of the USPS. These elements are: No Postage Necessary if Mailed in the US endorsement in upper right corner, Horizontal Bars positioned below the Postage Endorsement to help visually identify the mailpiece as BRM, Facing Identification Mark (FIM) B or C (FIM B if there is no barcode for the BRM, and FIM C if the BRM is barcoded), Business Reply Legend with Permit No. and Postage Payment Endorsement, First Class rating and issuing post office name (city and state), complete business address with or without the POSTNET barcode, if the barcode is not in the address block the final element would be the barcode clear zone positioned at the bottom right of the mailpiece.

Figure 59:
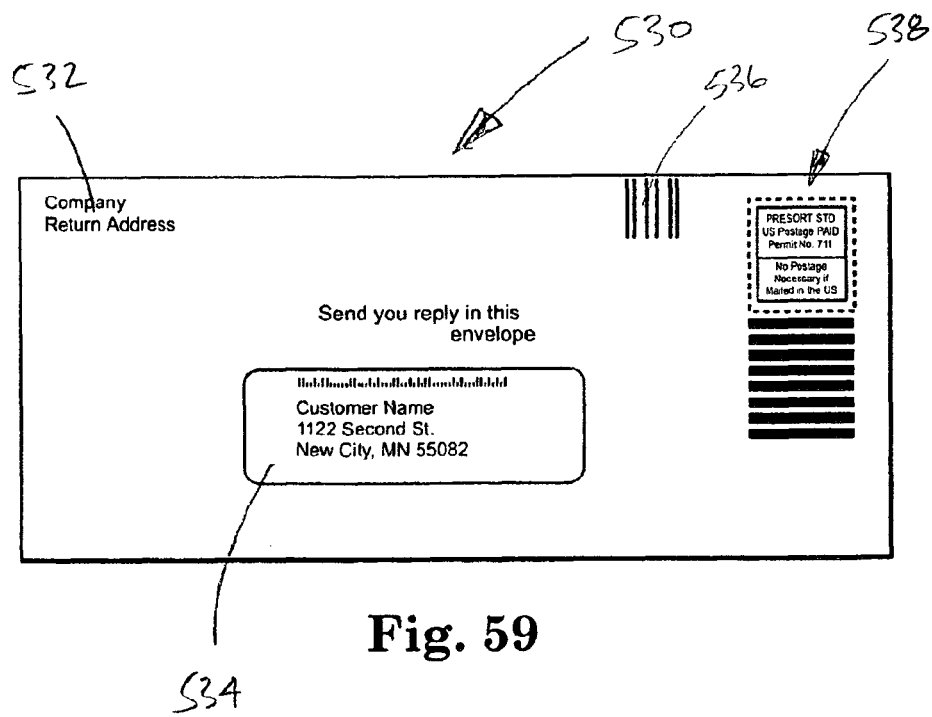
FIG. 59 is a front view of another envelope of the invention showing a return address, a oversized address window, a FIM C and a 2 WAY MAIL indicia of the invention, which preferably combines a Permit Imprint Indicia over a No Postage Necessary Endorsement for Business Reply Mail. The two indicia are shown boxed in a dashed line box. Underneath are horizontal bars customary in Business Reply Mail. Through the window is a POSTNET barcode address intended for a customer. Above the barcode address block are the words "Send your reply in this prepaid reusable envelope." In this illustration the envelope can be sent to the customer and can utilize the Permit Imprint portion of the indicia.

Illustrated in FIG. 59 is an envelope 530 of the invention including a return address 532 in the upper left corner, a single address window 534, a FIM C 536, and a 2 WAY MAIL indicia 538 created by putting a standard Permit Imprint Indicia together with a No Postage Necessary Endorsement, a dashed line around the two indicia, as a new visual identification for the combination of the two indicia (optional), horizontal bars for visual recognition of the envelope as BRM when the envelope is remailed with a reply.

The envelope 530 as shown in FIG. 59 is ready to be mailed from a business to a customer. For example, a magazine or other entity that uses BRM may send a mailing for a special offer for a subscription to the magazine. The magazine company, for example, may send the mailpiece as a presort standard or First Class bulk mailing in one envelope with the hopes of getting a response using the second inserted envelope, the Business Reply envelope, which pays the postage if the customer responds to the offer.

As shown, the POSTNET barcode address of the customer is visible through the window 534. In this embodiment the address window 534 is preferably larger than a typical address window for reasons that will be explained later. For the outgoing mail, the oversized window 534 can offer an opportunity to include a message above the barcode address block, if desired. For purposes of illustration the words printed on the insert showing through the window are "Send your reply in this reusable envelope." In addition a FIM C for BRM and the unique 2 WAY MAIL indicia is shown with horizontal bars underneath.

By using the reusable envelopes of the invention a unique opportunity is presented. With the 2 WAY MAIL indicia, the envelope can be mailed first as standard or first class presort bulk mail using the Permit Imprint Indicia for presort standard or first class mail postage with the FIM C on the outgoing delivery. FIM C can be allowed on the outgoing delivery similar to the FIM A described earlier for Courtesy Reply mail. Both FIM A and FIM C can be used on reusable envelopes for bulk mailings because with presort bulk mail the mailpiece does not go through a facer-canceller before being mailed.

To send a reply using this method of prepaid postage as described using the 2 WAY MAIL indicia, the customer simply opens the envelope using the unique methods described earlier (the reusable envelope flap of the invention described above) takes out the contents from the envelope, when sending a reply the customer puts back into the envelope the response device so the POSTNET barcode business address and the Business Reply Legend are visible through the window. Because the addressee pays the postage, typical of BRM, the customer does not have to provide postage. That is the customer can open the envelope, take the contents out, when ready to reply to the mailing put the response device (or any desired correspondence) back in the envelope with the correct address showing through the window, seal the envelope and mail using the same envelope that was delivered to the customer originally.

By having the FIM C, the POSTNET barcode address, the Business Reply legend, and the Postage Endorsement Indicia together, the Post Office can identify the mail as Business Reply Mail mechanically by the use of the FIM C and visually by the horizontal bars (or other mark(s)) around and under the indicia. Postage will be paid by the addressee for Business Reply Mail the same as conventional BRM when a reply is sent from the customer back to the company.

Figure 60:
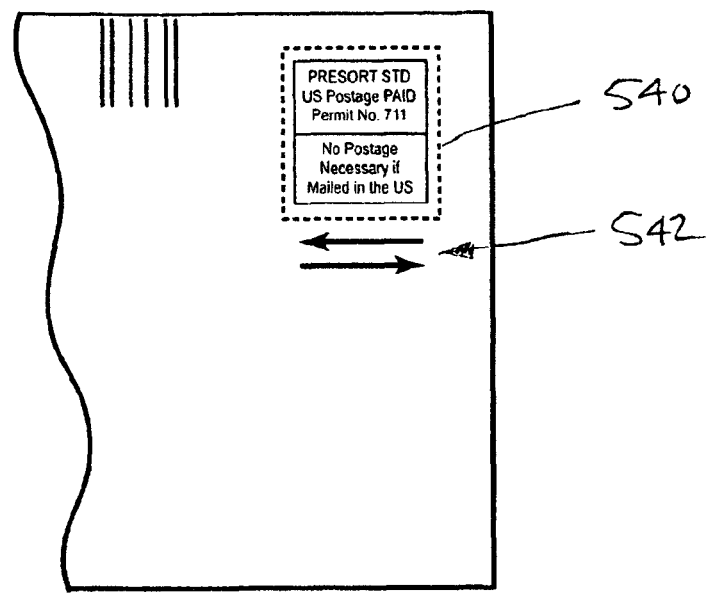
FIG. 60 is a front view of another envelope of the invention, showing FIM C with 2 WAY MAIL indicia and a set of horizontal arrows positioned below the 2 WAY MAIL indicia. One arrow points to the left and the other arrow points to the right. Symbolic of 2 WAY STAMP of the invention.
Figure 61:
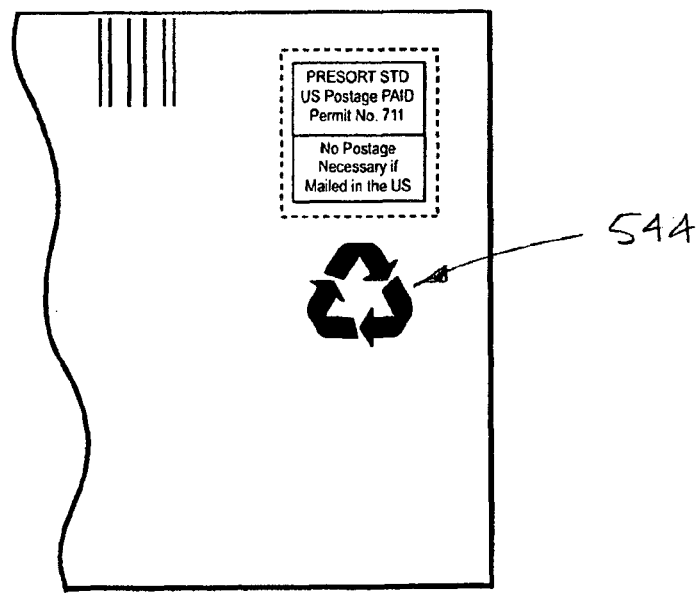
FIG. 61 is a front view of another envelope of the invention showing a recycle symbol below the 2 WAY MAIL indicia of the invention.

In FIGS. 60 and 61 new ways to help post office personnel visually identify a mailpiece as business reply mail utilizing a 2 WAY MAIL indicia of the invention are shown.

By creating a new visual identifier the post office personnel can visually identify the mailpiece as a reusable envelope with prepaid postage for delivery two times. The first mailing as prepaid uses a Permit Imprint indicia on the top portion of the new indicia and the second mailing as Business Reply uses the No Postage Endorsement indicia on the bottom of the new 2 WAY MAIL indicia. To explain further, the post office relies on the horizontal bars located below the No Postage Endorsement to visually identify the mailpiece as conventional BRM, as an established method for identifying this class of mail, it is important to maintain this method of visually identifying BRM. But because the mailpiece is a reusable envelope with a new configuration for postage, Permit Imprint with Postage Endorsement indicia together, a new visual identifier(s) could be used to distinguish it from conventional BRM. The advantage of this would be less confusion and clear identification of the new prepaid postage for sending and reply using a reusable envelope. Another advantage is that, no changes need to be made in how the mail is processed, nor are there any requirements for different scanning methods, or new technology.

Preferably when 2 WAY MAIL indicia of the invention is used, a different visual identifier other than the horizontal bars, is used to identify the envelope as BRM using a reusable envelope. As shown in FIG. 60 a dashed line 540 or any graphic line or symbol or the like can be used around the combined postage indicia to help accentuate some visual difference around the indicia. Traditionally a solid rule box has been used for purposes of isolating/containing postage indicia information on the envelope. For purposes of illustration to bring attention to the new 2 WAY MAIL indicia, a dashed line is shown around the indicia. In addition, it is preferred that the horizontal bars be replaced with a new visual identifier as described earlier. Referring again to FIG. 60 a symbol 542 having two arrows is shown and in FIG. 61 the universal recycle symbol 544 is used. Although the dashed line or graphic around the indicia is optional, a new visual identifier mark below the No Postage Necessary endorsement indicia would be important to assist the Post Office in identifying that the postage is paid for by the addressee using an envelope that originated the mailing and is being used for the reply having the FIM C with a POSTNET barcode, the Business Reply Legend, the No Postage Necessary endorsement and the new identifier mark around the indicia and the new marks that replace the horizontal bars will signal that carrier is a reusable envelope, and postage is paid for by the addressee for a reply.

Figure 62:
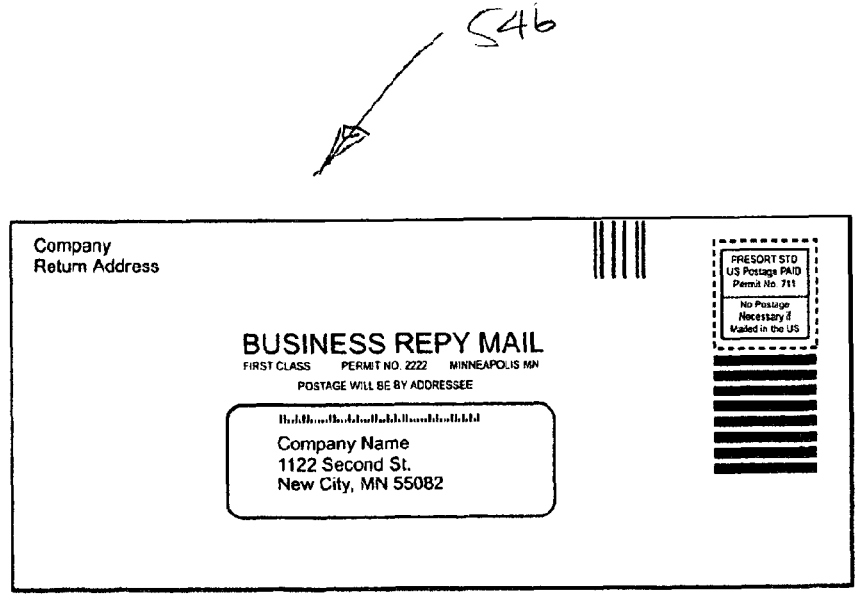
FIG. 62 is a front view of another envelope of the invention showing a POSTNET barcode address to the company and above is the Business Reply Mail Legend including the words BUSINESS REPLY MAIL all in caps, the postage rating, permit number, city and state of permit holder, and the postage endorsement, "POSTAGE WILL BE PAID BY ADDRESSEE." In this mode the envelope can be sent back to the business with a reply. Sending the reply in this manner utilizes the No Postage Necessary Endorsement for Business Reply Mail. In this mode the postage will preferably be paid by the address as in typical Business Reply Mail.

In FIG. 62, another envelope 546 of the invention and a method for remailing the envelope as BRM is illustrated. The return address, the address window, the FIM C and the 2 WAY MAIL indicia can be preprinted on the envelope prior to inserting and mailing and will be the same on the envelope 546 through the cycle of send and reply. After the envelope 546 has been opened using a flap of the invention as described earlier, for example, the contents can be removed from the envelope 546. If a customer chooses to respond to the correspondence (such as an offer from a magazine, for example), the portion that is typically mailed back to the magazine can be placed back in the envelope 546. A common method to insert the reply portion is to put the reply portion back into the envelope 546 with the business POSTNET barcode address showing through the window as shown in FIG. 62. Preferably, what shows through the oversized window as viewed in FIG. 62, is a Business Reply Legend, with the First Class postage rating, the Permit No., the city and state, and the Postage Endorsement. In addition the POSTNET bar code address for the business is visible under the BRM legend, is shown. The Business Reply elements that appear in the window are required by the Post Office for Business Reply Mail as detailed earlier. By having these elements show through the window for the reply, the No Postage Necessary endorsement on the envelope in the upper right corner, and the new visual identifiers around—dashed rule (optional) and under the 2 WAY MAIL indicia—the double arrows, fulfills the Post Office requirements for Business Reply Mail.

Figure 63:
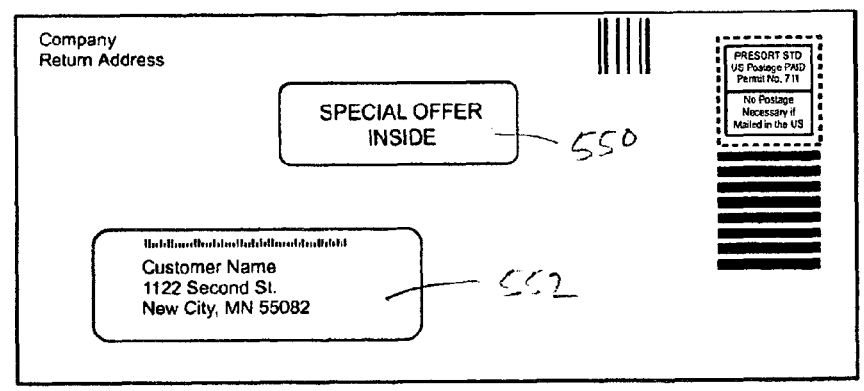
FIG. 63 is a front view of another envelope of the invention showing return address, an address window, with a smaller window above the address window and to the center, a FIM C and the 2 WAY MAIL indicia of the invention with horizontal bars underneath. In the smaller window above the address window are the words "SPECIAL OFFER INSIDE." In the address window a POSTNET barcode address to a customer is provided through the window.
Figure 64:
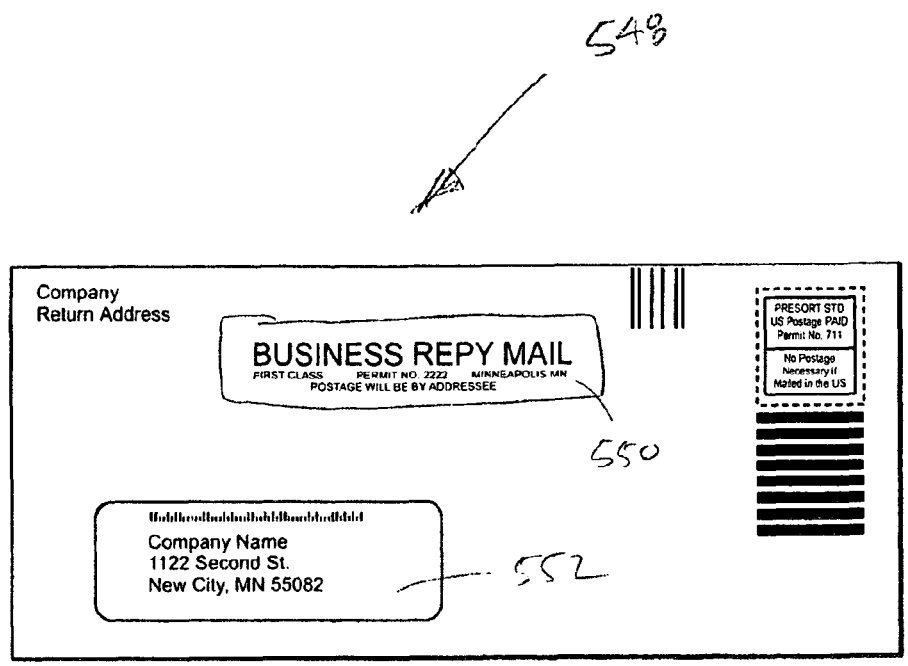
FIG. 64 is a front view of another envelope of the invention showing a business reply legend in the smaller window, and in the address window a POSTNET barcode address to a company is showing through. In this view the envelope can be mailed back to the company.

FIG. 63 shows another embodiment of this same idea using a two window envelope 548 of the invention. As shown, the return address is in the upper left corner, there is an upper window 550 and a lower window 552. A FIM C is shown along the upper fold to the right of the 2 WAY MAIL indicia. Printed on the insert inside the envelope and showing through the upper window 550 the words "Special Offer Inside" are shown. In the lower window 552 is the POSTNET barcode address of the customer. FIG. 64 illustrates after opening the envelope 548, if the customer chooses to reply to the offer, the reply portion can be inserted back into the envelope 548 with the BRM elements showing through the upper window 550 and the POSTNET barcode address of the business in the lower window 552. The customer can then seal the envelope 548 in accordance with the invention and mail.

Placement, shapes and numbers of windows may vary depending on the requirements of the inserted form(s) or preferred design features.

In FIGS. 65 through 74 show other exemplary methods for postaging envelopes in accordance with the present invention are shown.

Using a stamp for postage on a mailpiece is not new. Currently one envelope with the correct prepaid postage stamp will deliver your mail anywhere the USPS delivers mail. One envelope, one stamp, one delivery sums up the current method of most mail delivered in the United States. This method of sending correspondence through the mail could be more resourceful by using a reusable envelope and postage that prepays for the delivery two or more times. In accordance with the invention, a stamp can comprise any device that provides a means to pay for postage for purposes of sending articles through the mail one or more times that is affixed to, printed on or incorporated into an article sent through the mail. This includes devices such as smart cards, magnetic strips and magnetic inks used to provide evidence of postage.

There are many benefits provided when a reusable envelope has a stamp that prepays postage for using the envelope plural times. That is, when the reusable envelope of the present invention is mailed a first time, a stamp that pays for sending the envelope two or more times can be purchased, and affixed to the envelope prepaying for the envelope to be delivered twice. In this way, only one stamp, and one envelope are needed to send a mailpiece two or more times.

Expanding the reuse of paper products, such as envelopes, reduces the pressure to cut more trees, reduces demand on over burdened waste disposal systems and cuts energy use and pollution. Reusing 1000 envelopes saves the paper to make 1,000 additional envelopes which is far more efficient than using a new envelope every time a bill is paid or a business correspondence is sent through the mail. The pulp and paper industry is the fifth largest consumer of energy, accounting for 4% of all the world's energy use, 40% of office paper products still end up in overburdened landfills. Business and government play a pivotal role in reshaping the future of waste reduction and paper consumption. Reusable envelopes of the invention coupled with 2 WAY STAMPS and methods of use of the invention that prepay the postage for sending the envelope plural times can reduce waste in our mail.

Another benefit of a 2 WAY STAMP of the invention is the post office would receive up front the amount of money for two stamps vs. the cost of one stamp or a single stamp. The revenue potential for the post office could be substantial if a 2 WAY STAMP and reusable envelope were institutionalized as a way to save resources. For example, the cost to mail a first class 9.times.12 flat envelope 3 oz. or under is presently 0.83 cents. The purchase of a 2 WAY STAMP would be $1.63 allowing a second delivery of the envelope weighing the same as the original mailing. The second mailing would be pre-paid and the same envelope could be used again. In addition, to up front revenue from selling a 2 WAY STAMP, the Post Office could become an advocate for reusing envelopes to reduce waste. That is the post office could market a product that addresses the problem of paper waste without decreasing the amount of mail going through the postal system. The person or business using the reusable envelope with the 2 WAY STAMP can provide a more efficient, timesaving, cost efficient way to send the envelope again or return the envelope prepaid. For example, a mortgage company or other business or individual may have documents or other items for a new homeowner to sign and return. Using a reusable envelope with prepaid postage for sending and returning the signed document will save time, money, and reduce landfill waste. Having a reusable envelope with a prepaid 2 WAY STAMP of the invention may encourage more mail to be sent because the postage has been paid for a second mailing and the envelope can easily be reused whether it is a response mailing or not. Introducing this kind of postage in accordance with the invention also lends itself to encouraging reusing paper products for personal use. It may be the case that someone may want to send a picture to a relative for example, and chooses to purchase a reusable envelope with prepaid postage as a way to support less waste and encourage reusing in addition to recycling. In other words, products that are designed to be reused, such as the reusable envelope of the present invention, can and are desirable for people who care about the environment and reducing waste. Although there is encouragement for reducing waste by reusing products there are not enough new products that are designed to be reused more than one time. The envelopes of the present invention along with the methods to pay for postage of the invention help to address the problem of reducing paper waste by providing a product designed to reduce paper waste in our mail stream for both business and individual use.

Figure 65:
FIG. 65 shows an exemplary 2 WAY STAMP of the invention with 2 dimensional barcode tags.

For the purposes of illustration a 2 WAY STAMP 554 of the invention is shown in FIG. 65. The exemplary 2 WAY STAMP 554 preferably has a front face and a pressure sensitive backing with a release liner or remoistened glue back or other adhesive, substance, or device for attaching the stamp to the envelope common to stamps (not visible in drawing) and a characteristic stamp border. Other features of the 2 WAY STAMP 554 shown in FIG. 65 preferably include: postage denomination and the country of issue common to postage stamps. The words 2 WAY STAMP and Cancel Twice preferably form the main graphics of the stamp 554 as shown. In addition there are illustrated two exemplary barcodes for preferably tagging or triggering cancellation on two areas of the stamp 554. That is, in order to cancel the stamp 554 twice it is necessary to direct where the cancellation marks will cross over (cancel) the stamp 554. It is also important that the postmark is not obscured or illegible. Having the postmarks cancel the top and bottom of the stamp 554 can help prevent human readable information from being obscured. For example, in the first cancellation the cancellation marks can cross (cancel) the stamp 554 at the top, above half way. On the second cancellation the marks can cross over (cancel) the stamp 554 at the bottom, preferably below halfway. The barcodes can serve a variety of functions one of which can be as a tagging device for directing the placement of the marks. In this way the marks cancel the stamp twice but will not cross over each other.

As shown the 2 WAY STAMP 554 is vertical in orientation, but can be any orientation to allow two cancellation marks to cancel the stamp 554. For this discussion, the stamp 554 can be cancelled twice using known methods of canceling a stamp. Typically, a cancellation mark is applied by bringing an inked cancellation die into contact with the stamp 554. The ink cancellation mark provides a visual indication that the stamp 554 has been used to pay for postage. In operation, the cancellation machine utilizes a photoelectric scanning device to detect postage stamps having phosphorescent material or fluorescent material incorporated therein. That is, the photoelectric scanning devices illuminates the luminescent material in the stamp 554 so that in turn, the luminescent material emits light back to the photoelectric scanning devices. The presence of a stamp is indicated if the photoelectric scanning devices sense the light emitted by the stamp. If a stamp is detected, the mailpiece is transported to the cancellation die where the cancellation mark is applied in a known manner. Because the 2 WAY STAMP 554 of the invention is cancelled twice a tagging mechanism for placement of the cancellation marks is preferably used. In addition, human readable methods of identifying the stamp 554 as having 2 WAY prepaid postage can be used for post office personnel to identify the mailpiece as being a reusable envelope with prepaid postage for mailing two times. In other words, the words 2 WAY STAMP and CANCEL TWICE help identify the stamp 554 as having postage prepaid for two mailings. The tagging mechanism can be in the form of a unique single or multi-dimensional barcode (visible or invisible) UPC codes, watermarks, unique ink identifiers, phosphorescent and/or fluorescent coatings or marks (visible or invisible), patterned or marked adhesives, dot matrix patterns, triggered by light or heat, the use of standard colored inks, colored imaging, graphic images, and/or characters, methods that embeds a digital signature into the stamp or magnetic strips or magnetic inks. One or more of the tagging mechanisms may be used.

The tag or tags employed to direct the cancellations can also be used to guard against fraudulent use of the stamp 554. The tags can serve as unique identifiers that can be stored in a data bank of unique identifiers for postage stamps used by the USPS to detect fraudulent stamp usage. In addition the tags can include the postage amount, and post office origination. For the purpose of discussion two-dimensional barcodes are used as exemplary tags are illustrated.

In accordance with the invention, a reusable envelope with a 2 WAY STAMP of the invention can enter the postal office and be handled the same as all mixed mail. Mail sorting equipment like the Advanced Facer Canceling System (AFCS), manufactured by Siemons (Electrocom), are being used at Postal Incoming Mail Processing Stations to detect, sort and then cancel the stamps that have been affixed to mail pieces. The AFCS faces (arranges mail so all addresses and indicia are facing the same way), cancels the stamp bearing mail and then sorts letter mail into three mail streams: pre-bar coded mail, OCR readable (typed/machine imprinted) mail and hand written or script mail. The facer canceller may be set to recognize a tag on a stamp for positioning a cancellation mark. In this example a 2 dimensional barcode can be embedded with specific information that directs the first cancellation. Later when the envelope is sent using the additional prepaid postage for the second mailing the AFCS can read the tag for placing the cancellation marks in a different location on the stamp. The tags can indicate where the cancellation marks could be placed allowing both cancellation marks to be clearly readable. The tag(s) may be one device on the stamp using methods mentioned above or more than one device, and may be in another area of the stamp or in an area in the vicinity of the stamp.

Figure 66:
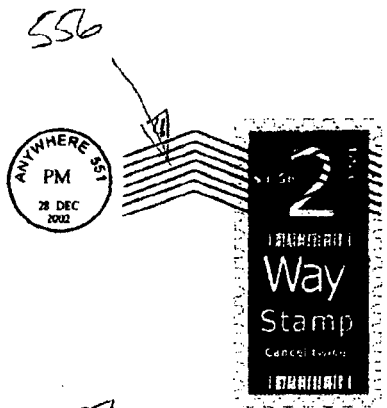
FIG. 66 show the 2 WAY STAMP cancelled once using current markings for canceling postage stamps.
Figure 67:
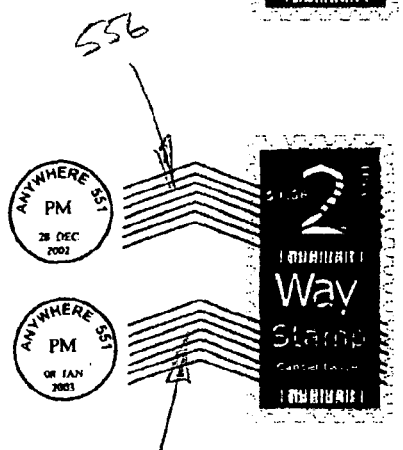
FIG. 67 shows the 2 WAY STAMP cancelled a second time using current markings for canceling postage stamps.

For purposes of illustration, FIG. 66 shows a first cancellation of the 2 WAY STAMP 554. As shown, a mark 556 with series of horizontal lines with a postmark typical of stamp cancellations is positioned on the upper part of the stamp. The wavy lines, cross over the stamp thereby canceling the stamp and may extend over portions of the envelope. The postmark indicates the location and date of a cancellation. FIG. 67 illustrates the 2 WAY STAMP cancelled the second time by the facer-canceller that applies the second set of cancellation bars 558 over the lower face of the stamp. Although this is the current appearance of a cancellation mark, other methods to cancel a stamp may be used. This could also include deducting postage from a device that vaults postage that is affixed to an envelope, printed on the envelope, or incorporated in the envelope that allows payment of more than one delivery of an article through the mail.

Figure 68:
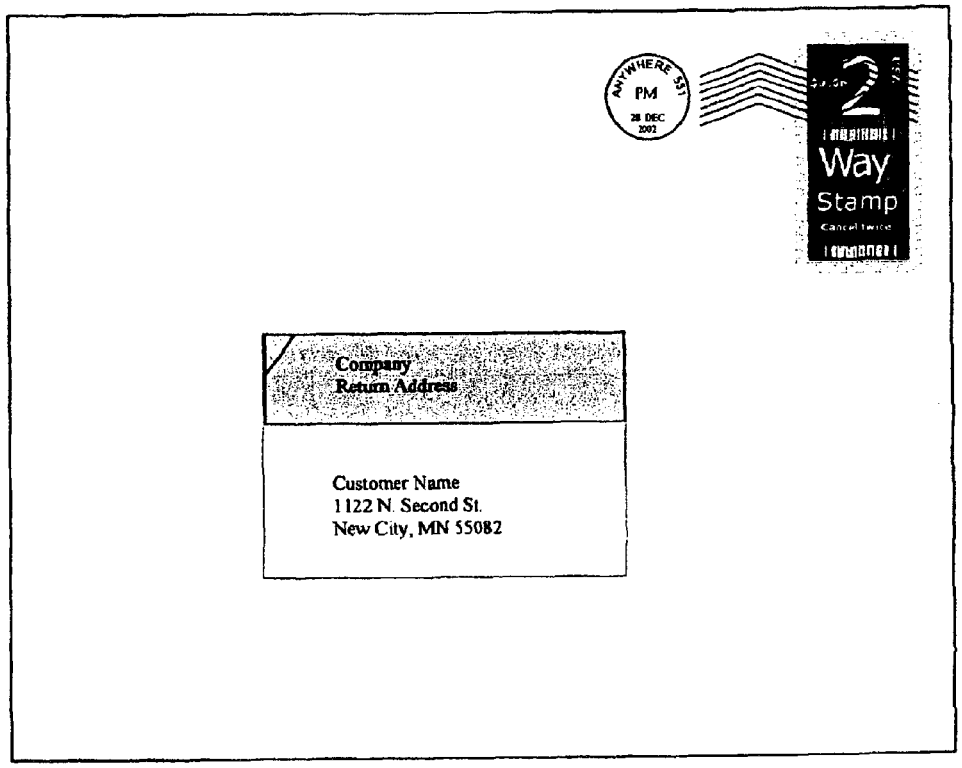
FIG. 68 presents the 2 WAY STAMP affixed to a 9.times.12 envelope of the present invention.
Figure 69:
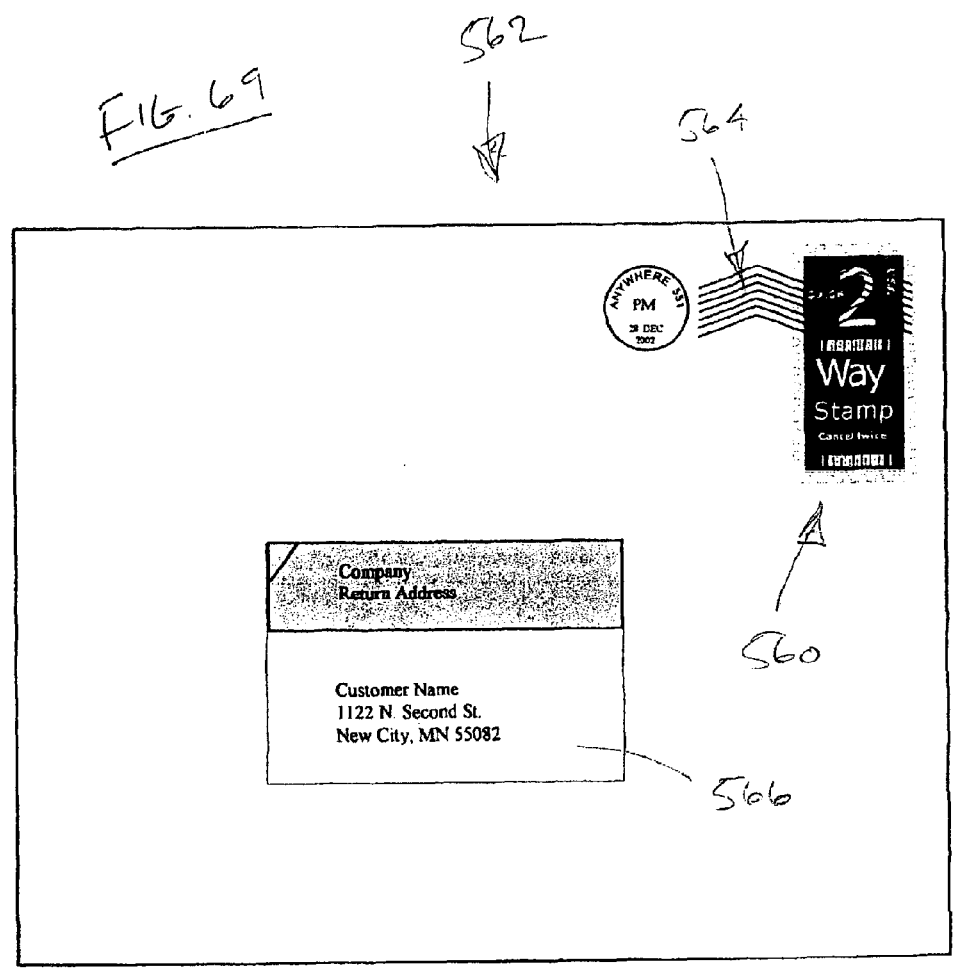
FIG. 69 illustrates the 2 WAY STAMP on the 9.times.12 envelope cancelled the first time using known cancellation marks.
Figure 70:
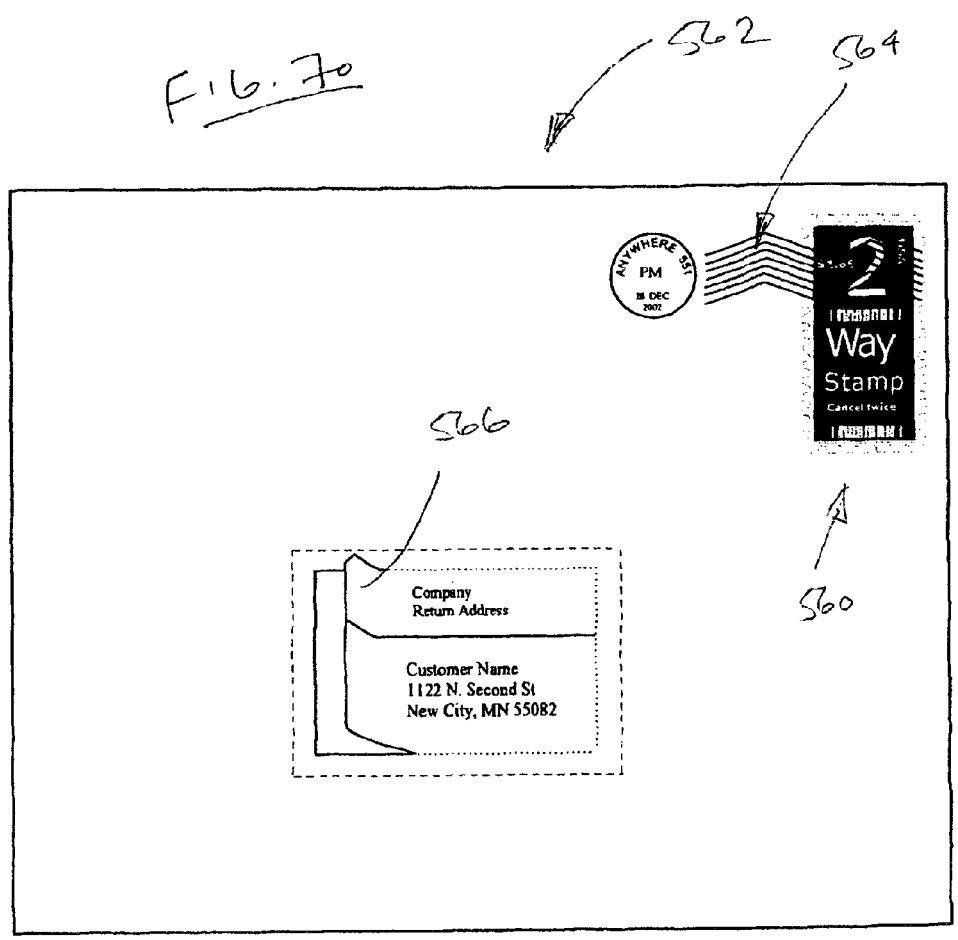
FIG. 70 is a front view of the 9.times.12 reusable envelope of the invention with the 2 WAY STAMP with one cancellation. In this view the address tear off portion of the envelope is being removed to allow the envelope to be readdressed and mailed again.
Figure 71:
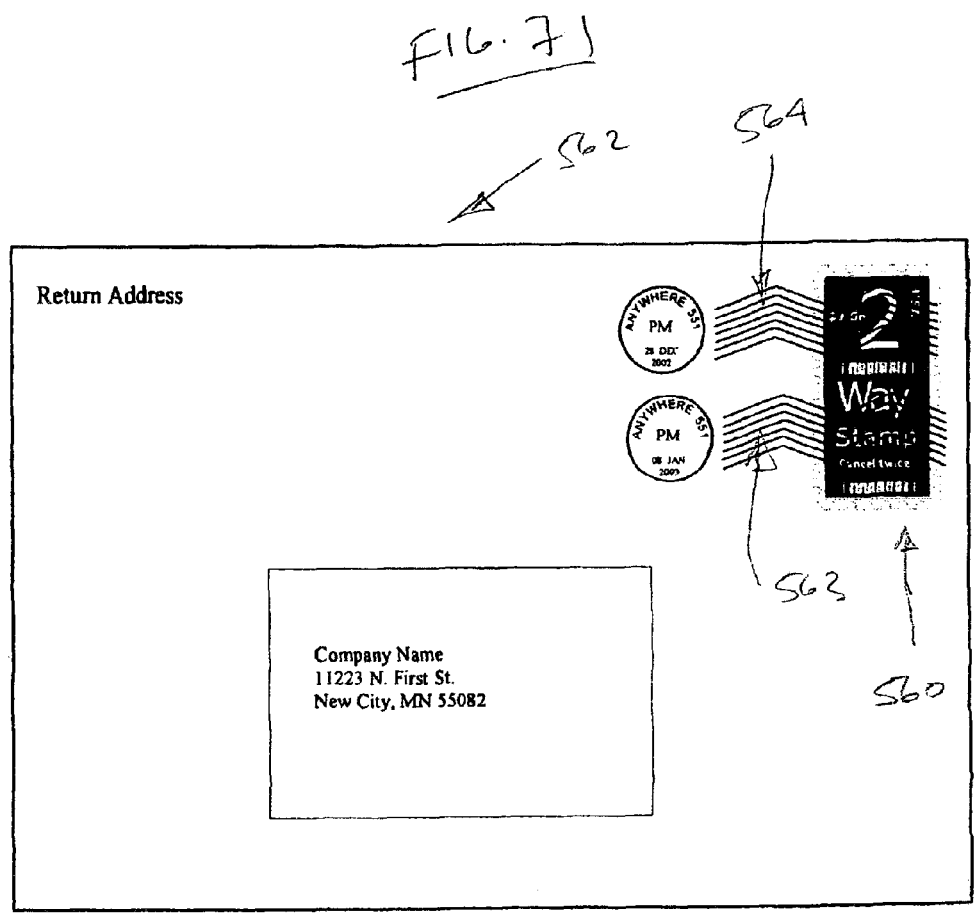
FIG. 71 is a front view of the envelope with new address and the stamp cancelled twice indicating the reusable envelope has been delivered a second time.

FIG. 68 shows a 2 WAY STAMP 560 affixed to a reusable 9".times.12" envelope 562 in accordance with the invention. FIG. 69 illustrates the 2 WAY STAMP 560 cancelled a first time with cancellation bars 564 over the face of the top portion of the stamp. To send the envelope 562 through the mail again using a reusable envelope, FIG. 70 shows address tear off portion 566 as removed revealing the second face of the envelope 562 for purposes of readdressing the envelope 562 to send the envelope 562 again. FIG. 71 illustrates the new address 568 on the reusable envelope 562 and 2 WAY STAMP 570 cancelled a second time illustrated by the cancellation bars 563 on the face of the lower portion of the stamp.

Figure 72:
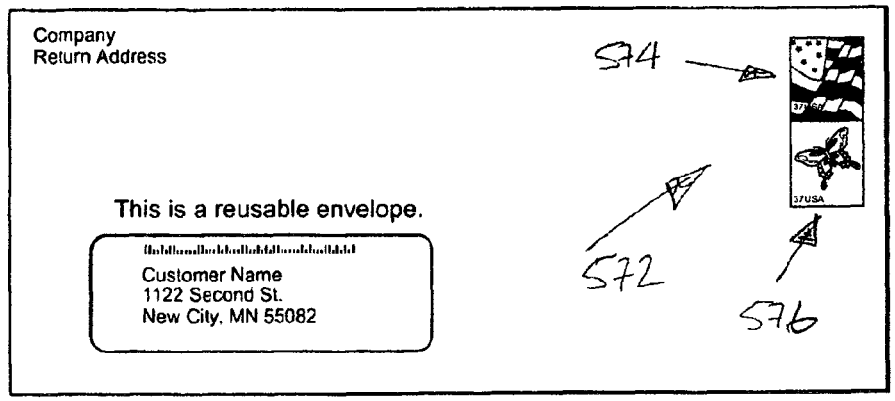
FIG. 72 is a No. 10 envelope of the present invention with a 2 WAY STAMP created by combining a prepaid pre cancelled standard bulk rate stamp with a First Class stamp. With this combination of postage the reusable envelope of the present invention can be sent out bulk rate and returned prepaid First Class.

FIG. 72 shows a different embodiment of a 2 WAY STAMP 572 of the invention using a precancelled portion 574 and a First Class portion 576 for prepaying postage on a bulk mailing and the reply. Through direct mail research it is known that having a stamp on an envelope elicits a higher chance the mailpiece will be opened. A postage stamp has a more personal feel to it than a meter or permit imprint, because it is assumed that it has to be affixed on the envelope by a person. In addition, it is also known that prepaying postage for a customer to send a response also provides a higher chance that the customer will respond. The present 2 WAY STAMP 572 preferably combines these two aspects into one stamp. A precancelled standard bulk rate stamp and a First Class stamp combined can elicit opening the envelope and can pre pay postage for a response using a reusable envelope. An example of how this could be used is as follows: A financial institution needs to send out a survey to it's clients. The size of the mailing qualifies the mailing for bulk rates. Ordinarily, a pre canceled bulk rate stamp would be placed on the mailpiece for delivery and a First Class stamped envelope could be included in the mailing for sending the survey back to the financial company. Using the 2 WAY STAMP with a pre canceled stamp and a First Class stamp together with the envelope of the invention, when the client receives the mailing in the envelope of the present invention, the client can open the mailing, fills out the survey and return the survey in the reusable envelope of the invention with postage prepaid. In other words, the postage for delivering the survey is paid for by the pre canceled stamp portion. When the client returns the survey, the survey is put back into the reusable envelope and mailed. Postage is prepaid by the First Class portion of the stamp and can be processed as a First Class mailpiece. No additional postage is needed, and no additional envelope is needed to send the survey back.

Figure 73:
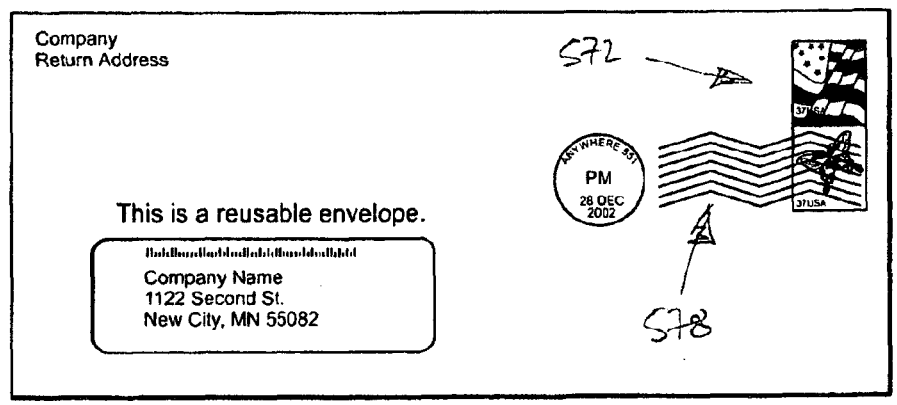
FIG. 73 is a front view of the No. 10 envelope of the invention with the 2 WAY STAMP cancelled for mailing a reply First Class.
Figure 74:
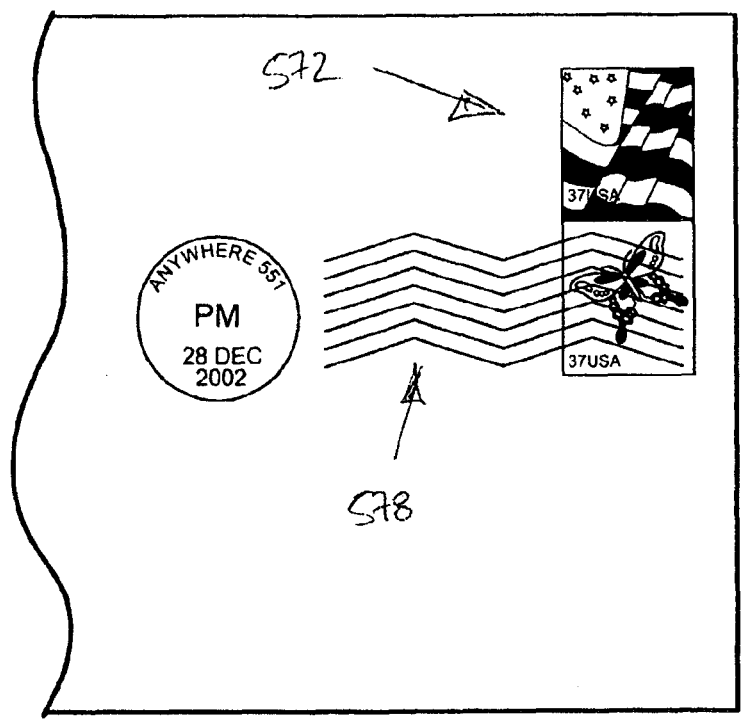
FIG. 74 is a detail of the 2 WAY STAMP composed of a presorted standard pre cancelled stamp and a First Class stamp that has been cancelled.

FIG. 72 shows the 2 WAY STAMP 572 of the invention with the top portion of the stamp having a pre canceled stamp and the bottom portion having a First Class Stamp. For the first delivery using the reusable envelope with this embodiment of the 2 WAY STAMP mail is preferably sent bulk rate with a prepaid precancelled stamp allowing the mailpiece to by pass the facer canceller machine, thereby eliminating the need to cancel that portion of the stamp. As shown in FIG. 73, when the survey is returned using the reusable envelope with the second portion of the 2 WAY STAMP that is a First Class stamp the mailpiece goes through the AFCS which cancels the First Class portion of the stamp with a mark 578. (Detail shown in FIG. 74). In this case the precancelled stamp would not require a tag for cancellation only an identifier to prevent fraudulent use. The First Class stamp would carry the cancellation tag and thereby receive a cancellation mark exhausting the prepaid postage for the reusable envelope.

The multiple use stamp can be provided in any convenient fashion such as singly, on a roll or a sheet with adhesive backing or glue backing and through USPS approved PC postage companies.

The 2 WAY STAMPs of the invention can be preprinted on the reusable envelope of the present invention and sold with the envelope as one unit available through Post Offices and office supply stores. In this way the cost and materials required to create the stamp would be eliminated saving additional resources both monetarily and environmentally. By having a preprinted prepaid postaged reusable envelope in a retail setting could inspire people to participate in helping to reduce waste. Many people are willing to pay a little more upfront to protect the environment because they realize it may save paying more money later to clean up the environment.

As described above reusable envelopes of the present invention may be used to send and return correspondence such as bills, statement, documents, and the like. It is contemplated that reusable envelopes and methods of the present invention may also be used to deliver products to customers, such as those that are intended to be used by the customer and then returned to the sender. Such products can include, for example, samples or other items or products that are temporarily used. Such products may also include music media, movie or video medial, or other entertainment media such as books and the like. For example, a business may rent a movie (such as a DVD) to a customer and send the movie to the customer in a reusable envelope of the invention. The customer can watch the movie and return in to the business in the same envelope in accordance with the present invention.

Reusable envelopes and methods that may be used in accordance with the present invention are disclosed in Applicant's co-pending Non-Provisional U.S. patent application, assigned to the assignee of the present invention, entitled "Environmentally Friendly Reusable Envelope Structures" to DeLaVergne, and having Ser. No. 10/632,489, the disclosure of which is fully incorporated by reference herein.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

While the foregoing details what is felt to be the preferred embodiment of the invention, no material limitations to the scope of the claimed invention are intended. Further, features and design alternatives that would be obvious to one of ordinary skill in the art are considered to be incorporated herein.

The scope of the invention is set forth and particularly described in the claims hereinbelow.

The invention claimed is:

1. A reusable envelope, comprising:
    an envelope body having a width; and
    a reusable sealing flap, said sealing flap comprising at least:
        a first flap portion proximal to said envelope body and extending along said envelope body for a length;
        a second flap portion extending from said first flap portion distal from said envelope body;
        a side flap edge at least partially corresponding with at least one of said first and second flap portions;
        a boundary comprising a tear off portion and a bridge portion, said tear off portion extending partially longitudinally along said sealing flap so said tear off portion comprises an end spaced inwardly from said side flap edge and spaced from said side flap edge wherein said bridge portion comprises material between said inwardly spaced end of said tear off portion and said side flap edge adjacent an intersection of said first and second flap portions so that said bridge portion at least partially connects said first and second flap portions and so said bridge portion is structurally capable of at least partially maintaining the connection between said first and second flap portions after said tear off portion is at least partially removed from said reusable sealing flap;
        first and second adhesive regions formed on said first and second flap portions, respectively, each spaced apart from said boundary along which said first portion of said sealing flap can be separated from said second flap portion; and
        a stress concentrator within said bridge portion material and extensive between an edge of said bridge portion material adjacent to said tear off portion and said side flap edge that facilitates severing of said second flap portion from said first flap portion;
        wherein said second adhesive region can be used to seal said envelope a first time, said second portion of said sealing flap can be separated from said first flap portion to open said envelope, and said first flap portion and said first adhesive region can together be used to close and seal said envelope a second time.

2. The reusable envelope of claim 1, wherein said stress concentrator further comprises a weakened region within said bridge portion.

3. The reusable envelope of claim 1, wherein said stress concentrator terminates at a first end prior to said side flap edge.

4. The reusable envelope of claim 3, wherein said stress concentrator terminates at a second end in contact with said edge of said bridge portion material adjacent to said tear off portion.

5. The reusable envelope of claim 1, wherein said stress concentrator is located within a narrowest part of said bridge portion.

6. A method for reusing an envelope, comprising the steps of:
    providing an envelope comprising an envelope body and a reusable sealing flap, the sealing flap comprising at least a first flap portion proximal to the envelope body and extending along the envelope body for a length, a second flap portion extending from the first flap portion, a side edge comprising a first edge portion at least partially corresponding with said first flap portion and intersecting a second edge portion at least partially corresponding with said second flap portion, a bridge portion of substantially planar material at least partially connecting said first and second flap portions, a tear off portion adjacent to said bridge portion to facilitate separation of said first flap portion from said second flap portion other than through said bridge portion, and a stress concentrator within and extending generally between edges of said bridge portion substantially planar material to facilitate separation of said first flap portion from second flap portion through said bridge portion;

attaching said second flap portion of said sealing flap to said envelope body to close said envelope a first time;

removing said tear off portion while said second flap portion of said sealing flap is attached to said envelope body;

separating said first flap portion of said sealing flap from said second flap portion of said sealing flap by tearing said bridge portion substantially planar material through said stress concentrator subsequent to said removing; and attaching said first flap portion of said sealing flap to said envelope body to close said envelope a second time.

7. The method for reusing an envelope of claim 6, wherein said attaching step further comprises fully covering said second flap portion with said first flap portion.

8. The method for reusing an envelope of claim 6, wherein said stress concentrator further comprises a weakened region within said bridge portion.

9. The method for reusing an envelope of claim 6, wherein said stress concentrator terminates at a first end prior to said side flap edge.

10. The method for reusing an envelope of claim 9, wherein said stress concentrator terminates at a second end in contact with said edge of said bridge portion material adjacent to said tear off portion.

11. The method for reusing an envelope of claim 6, wherein said stress concentrator is located within a narrowest part of said bridge portion.

12. An envelope, comprising:
an envelope body;
a reusable sealing flap fabricated from a planar sheet of material and having a first sealing flap portion and a second sealing flap portion;
said first sealing flap portion proximal to said envelope body and extending along said envelope body for a length;
said second sealing flap portion extending from said first sealing flap portion and distal from said envelope body;
first and second side edges, said second side edge comprising a first flap edge portion at least partially corresponding with said first sealing flap portion and intersecting a second flap edge portion at least partially corresponding with said second sealing flap portion;
a tear off portion positioned between said first and second sealing flap portions and operatively at least partially removable to operatively at least partially separate said first and second sealing flap portions during opening of said envelope, said tear off portion extending from said first side edge and ending before intersecting said second side edge thereby at least partially defining an end of said tear off portion spaced inwardly from said second side edge;
a bridge region of said reusable sealing flap planar sheet material extending between said end of the tear off portion and said second side edge operative to protect said sealing flap against unintentional opening during processing of the envelope in automated mail processing equipment; and
a line of weakened planar sheet material that is relatively weaker than adjacent planar sheet material and that is located within said bridge region generally between a first edge of said bridge region planar sheet material adjacent said end of the tear off portion and a second edge of said bridge region planar sheet material adjacent said second side edge through which a tear in said planar sheet material is operatively selectively guided so that said first and second sealing flap portions may operatively be completely separated in a controlled and predictable manner subsequent to removal of said tear off portion wherein said line of weakened planar sheet material terminates at a first end prior to said second edge of said bridge planar sheet material adjacent said second side edge.

13. The envelope of claim 12, further comprising first and second adhesive regions formed on said sealing flap, said first adhesive region provided on said first sealing flap portion and spaced apart from said tear off portion, said second adhesive region provided on said second sealing flap portion and spaced apart from said tear off portion.

14. The envelope of claim 12, wherein said line of weakened planar sheet material terminates at a second end in contact with said first edge of said bridge region planar sheet material adjacent said end of the tear off portion.

15. The envelope of claim 12, wherein said line of weakened planar sheet material is located within a narrowest part of said bridge portion.

* * * * *